United States Patent [19]
Tabeta

[11] Patent Number: 6,085,079
[45] Date of Patent: Jul. 4, 2000

[54] STORAGE DEVICE WIRELESSLY CONNECTED TO COMMUNICATION TERMINAL AND COMMUNICATION CONTROL APPARATUS, AND SYSTEM HAVING STORAGE DEVICE

[75] Inventor: Hideya Tabeta, Kawasaki, Japan

[73] Assignee: Canon Kabushiki Kaisha, Tokyo, Japan

[21] Appl. No.: 08/570,597

[22] Filed: Dec. 11, 1995

[30] Foreign Application Priority Data

Dec. 13, 1994 [JP] Japan ................................. 6-332707

[51] Int. Cl.$^7$ ............................... H04Q 7/38; H04Q 7/22
[52] U.S. Cl. ........................... 455/403; 455/413; 455/420; 455/426; 455/418; 379/88; 379/89; 370/225; 370/228; 370/226; 370/227
[58] Field of Search ..................... 455/411, 412, 455/413, 420, 435, 403, 331, 330, 332, 333, 414, 426, 418, 419; 379/88, 89; 348/825.01; 370/225, 228, 226, 227

[56] References Cited

U.S. PATENT DOCUMENTS

| | | |
|---|---|---|
| 4,468,813 | 8/1984 | Burke et al. .......................... 455/412 |
| 5,220,594 | 6/1993 | Ohnishi et al. ........................ 455/403 |
| 5,317,624 | 5/1994 | Obana et al. .......................... 455/412 |
| 5,321,739 | 6/1994 | Higashiyama ......................... 455/412 |
| 5,490,201 | 2/1996 | Moberg et al. ........................ 455/403 |
| 5,592,532 | 1/1997 | Koizumi ................................. 455/412 |

*Primary Examiner*—Wellington Chin
*Assistant Examiner*—Keith Ferguson
*Attorney, Agent, or Firm*—Morgan & Finnegan LLP

[57] ABSTRACT

A voice storage device monitors wireless signals from a plurality of fixed terminals and a plurality of mobile terminals, which are connected to a main unit. When a channel establishment signal is generated by one mobile terminal, the voice storage device detects this signal, and prepares for recording the contents of a speech communication. Subsequently, the fixed terminal generates a channel assignment signal. Thereafter, the voice storage device detects a call setup signal (an ID signal and control information) exchanged between the mobile and fixed terminals, and waits for detection of a response signal which is generated by the mobile terminal and indicates that the call is answered. Upon detection of the response signal, the voice storage device starts a storage operation of voice data at a corresponding one of different storage positions in units of mobile terminals, which position is specified by the call setup signal.

244 Claims, 41 Drawing Sheets

STORAGE DEVICE WIRELESSLY CONNECTED TO COMMUNICATION TERMINAL AND COMMUNICATION CONTROL APPARATUS, AND SYSTEM HAVING STORAGE DEVICE

BACKGROUND OF THE INVENTION

The present invention is connected to a storage device wirelessly connected to a communication terminal and a communication control apparatus, and a system having the storage device.

Conventionally, a storage device, which is accommodated in a radio communication system and stores communication contents, is incorporated in a communication terminal or a communication control apparatus, and stores information sent from the transmitting side in a special mode.

However, when storage devices are arranged in units of communication terminals, the size of each communication terminal undesirably increases, and it becomes difficult to attain movements as the advantageous feature of radio communications.

When a storage device is arranged in a communication control apparatus, a user must go to the place of the communication control apparatus and must operate the communication control apparatus so as to reproduce stored information. As a result, the advantageous feature of radio communications cannot be utilized.

In order to solve the above-mentioned problems, in an automatic answering telephone system described in U.S. Pat. No. 5,220,594, a storage device is arranged to be independent from the communication terminal and the communication control apparatus.

However, in this automatic answering telephone system, if there are a plurality of communication terminals, these terminals cannot share a single storage device.

SUMMARY OF THE INVENTION

It is an object of the present invention to allow a storage device wirelessly connected to a communication terminal and a communication control apparatus to be shared by a plurality of communication terminals.

It is another object of the present invention to store information in a storage device in areas assigned in units of communication terminals.

Other objects of the present invention will become apparent from the following description of the embodiments.

DESCRIPTION OF THE PREFERRED EMBODIMENTS

Figure 1:
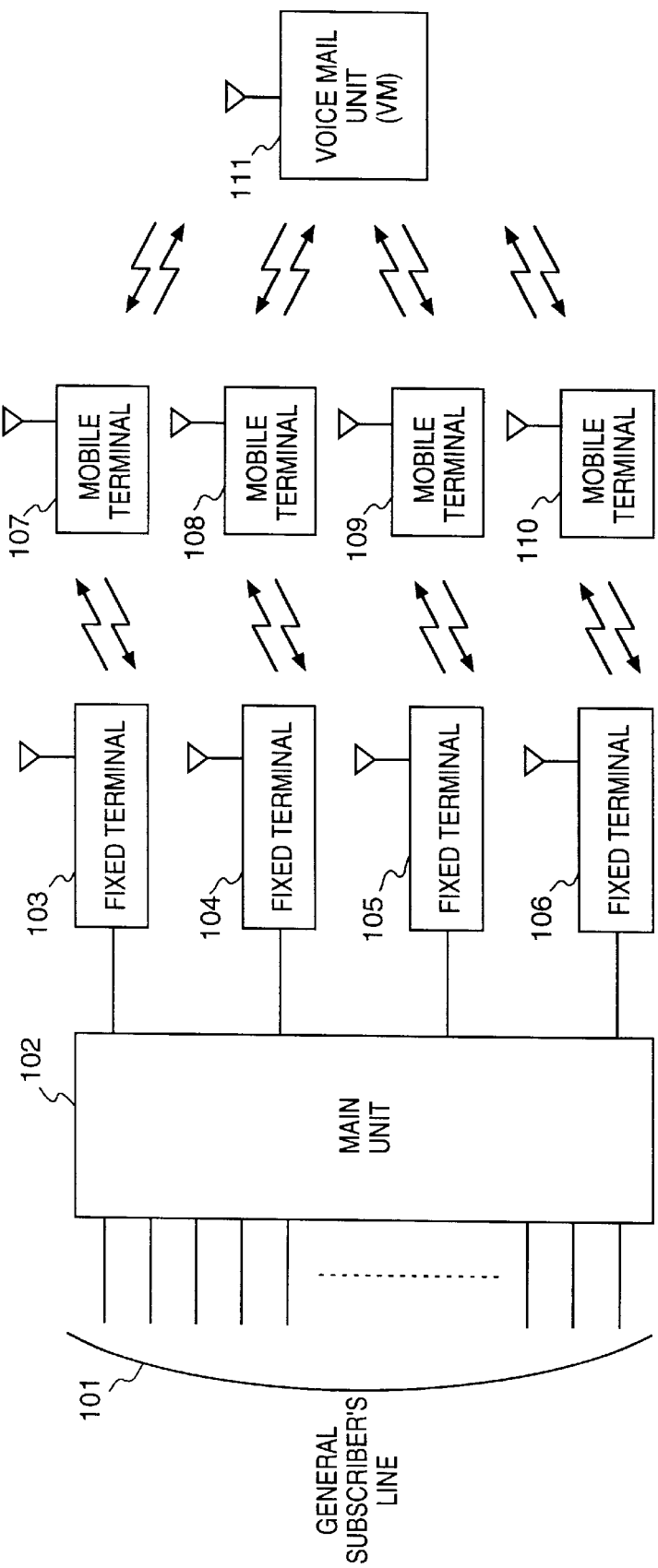
FIG. 1 is a block diagram showing the arrangement of the first embodiment to which the present invention is applied to a digital cordless key telephone system.

FIG. 1 is a block diagram showing the arrangement of the first embodiment in which the present invention is applied to a digital cordless key telephone system.

A main unit 102 of the key telephone system accommodates general subscriber's lines 101 in outside lines, and fixed terminals 103 to 106 for performing communications with mobile terminals 107 to 110 using time-divisional digital signals in extensions. The mobile terminals 107 to 110 are digital cordless mobile terminals which are capable of radio communications with the fixed terminals 103 to 106, and a voice storage (voice mail: VM) unit 111, and among the mobile terminals.

The VM unit 111 is a digital cordless voice storage unit (to be also referred to as a voice storage unit) for recording the contents of a speech communication and outputting a recorded voice message on the basis of time-divisional digital signals from the fixed terminals 103 to 106 and the mobile terminals 107 to 110.

In the above-mentioned arrangement, when a call to outside line 1 is received from the general subscriber's line 101, a ringing tone is generated by an extension terminal corresponding to the incoming call. In this case, if extension 1 corresponds to outside line 1, the fixed terminal 102 of extension 1 informs the mobile terminal 107 that the incoming call is received from outside line 1. Upon detection of the incoming call from outside line 1, the mobile terminal 107 performs processing for generating a ringing tone, i.e., turns on an LED indicating a predetermined outside line and generates a ringing tone.

At this time, the VM unit 111 monitors signals from the fixed terminals 103 to 106 and the mobile terminals 107 to 110 via an antenna. Upon detection of a channel establishment signal (an ID signal and an informing signal) from the mobile terminal 107, the VM unit 111 prepares for recording the contents of a speech communication (e.g., changes an IC and a hard disk from a standby state to an idle state).

Subsequently, the VM unit 111 detects a channel assignment signal (an ID signal and a speech communication channel assignment signal) from the fixed terminal 103. Thereafter, upon detection of a call setup signal (an ID signal and control information) from the mobile terminal 107 and the fixed terminal 103, the VM unit 111 monitors the ringing state of the mobile terminal 107. Upon detection of a response signal indicating that a user answered the call using the mobile terminal 107 during the ringing operation of the mobile terminal 107, the VM unit 111 performs processing for storing a subsequently transmitted voice signal at a predetermined address.

Upon call origination from the mobile terminal 107, when the VM unit 111 detects a link establishment request signal (an ID signal and off-hook information) from the mobile terminal 107 by antenna 1, it prepares for recording the contents of a speech communication (e.g., changes an IC and a hard disk from a standby state to an idle state).

Subsequently, the VM unit 111 detects a channel assignment signal (an ID signal and speech communication channel assignment information) from the fixed terminal 103. Thereafter, upon detection of a call setup signal (an ID signal and control information) from the mobile terminal 107 and the fixed terminal 103, the VM unit 111 monitors the ringing state of the mobile terminal 107, and detects a dial tone from the fixed terminal 103.

Thereafter, when a call originating signal (an ID signal and dial information) is output from the mobile terminal 107, dial information is supplied to the main unit 102 via the fixed terminal 103.

Based on this dial information, the main unit 102 originates a call to an extension or outside line. When a response to the call is returned from the extension or outside line, the main unit 102 detects the response information, and transfers the response to the fixed terminal 103. Upon detection of the response signal, the fixed terminal 103 outputs, a signal indicating that a predetermined response is returned, to the mobile terminal 107 and the VM unit 111.

Upon reception of the response signal, the VM unit 111 performs processing for storing voice data output thereafter.

Figure 2:
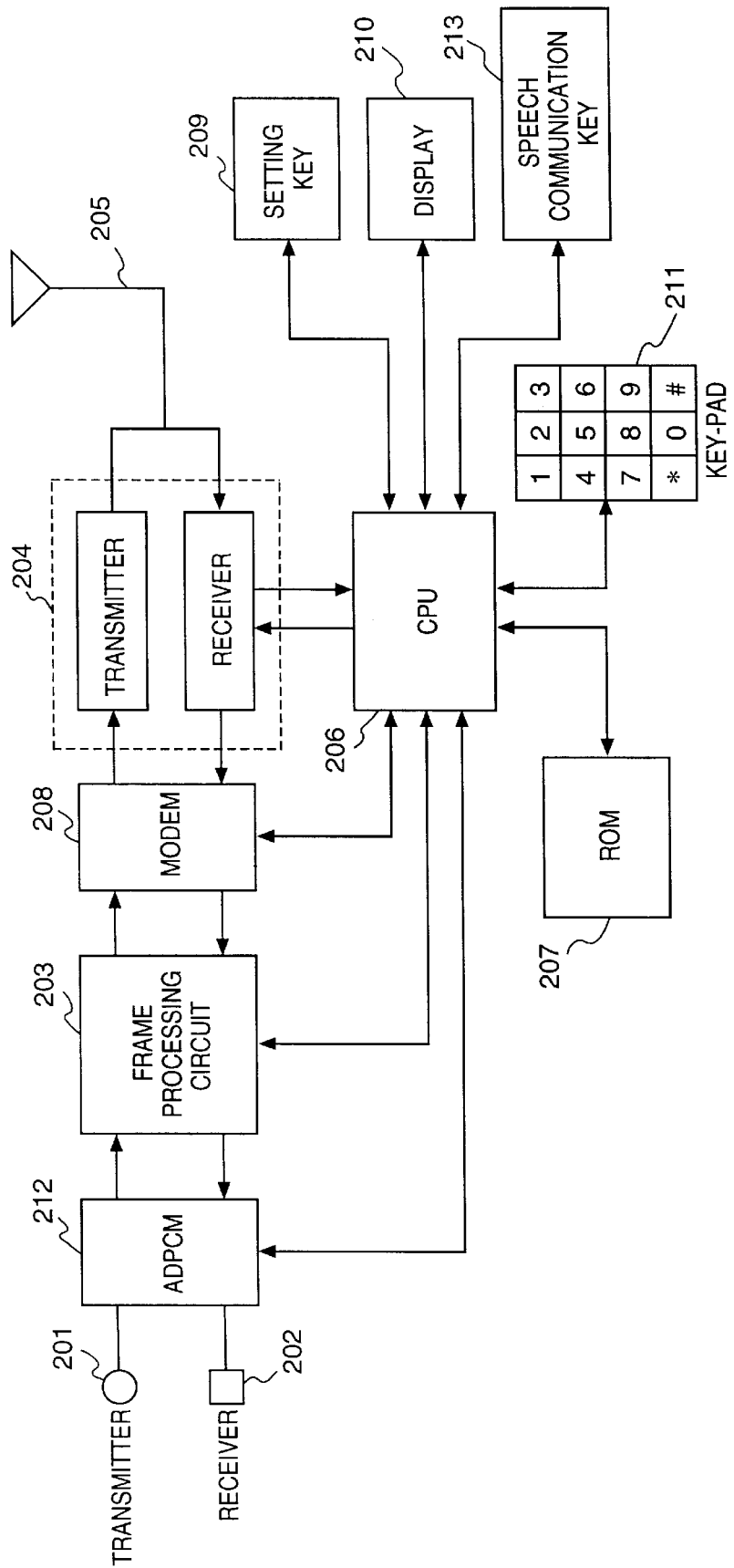
FIG. 2 is a block diagram showing the arrangement of a mobile terminal in the first embodiment.

FIG. 2 is a block diagram showing the arrangement of the mobile terminal in this embodiment.

The mobile terminal in this embodiment comprises a transmitter 201 for converting a voice into an electrical signal, and transmitting the electrical signal to an ADPCM codec 212, a receiver 202 for converting an electrical signal received from the ADPCM codec 212 into a voice, and the ADPCM codec 212 for compressing a voice signal from the transmitter 201 and outputting the compressed signal as a digital signal to a frame processing circuit 203, and for expanding a digital signal from the frame processing circuit 203, and outputting the expanded signal as a voice signal to the receiver 202.

The mobile terminal also comprises the frame processing circuit 203 for superposing the digital signal output from the ADPCM codec 212 on a predetermined frame and outputting the digital signal to a modem 208, and for outputting control data in received data to a CPU 206, the modem 208 for modulating the digital signal from the frame processing circuit and outputting the modulated signal to a transmitter/receiver 204, and for demodulating the modulated signal from the transmitter/receiver 204 and outputting the demodulated signal to the frame processing circuit 203, the transmitter/receiver 204 for outputting the modulated signal from the modem 208 via an antenna 205, and transmitting the received signal from the antenna 205 to the modem 208, and the antenna 205 for transmitting/receiving signals with the fixed terminal.

Furthermore, the mobile terminal comprises the CPU 206 for controlling the mobile terminal, a memory 207 for storing a control program, various kinds of setting information, ID information, and the like, a setting key 209 used for performing various setting operations for outputting a readout signal to the VM unit 111, a display 210 for displaying various kinds of information, a key-pad 211 for converting information indicating depression of a predetermined key into an electrical signal, and a speech communication button 213 used for starting a call originating operation or for answering an incoming call.

In the mobile terminal with the above-mentioned arrangement, in call setup processing with the fixed terminal, when the speech communication button 213 of the mobile terminal is depressed, the CPU 206 outputs a predetermined link establishment request signal to the fixed terminal via the frame processing circuit 203, the modem 208, the transmitter/receiver 204, and the antenna 205. Note that the link establishment request signal is output while being superposed on a frame for a first control signal.

Upon detection of a channel assignment signal from the fixed terminal via the antenna 205, the transmitter/receiver 204, the modem 208, and the frame processing circuit 203, the CPU 206 performs call setup processing using a communication frame in a channel designated by the channel assignment signal. In this case, the CPU 206 informs the VM unit 111 of the address information of an extension being used using a second control signal.

When the CPU 206 determines establishment of a call, it detects whether or not dial information is input from the key-pad 211. Upon detection of the dial information input from the key-pad 211, the CPU 206 informs the fixed terminal of the dial information via the frame processing circuit 203, the modem 208, the transmitter/receiver 204, and the antenna 205.

Upon detection of a response signal from the fixed terminal, the CPU 206 outputs a command to the frame processing circuit 203 to output voice data information on the frame to the ADPCM codec 212, and outputs a command to the ADPCM codec 212 to perform voice processing with the transmitter 201 and the receiver 202. In this manner, the CPU 206 sets a busy state to start a speech communication.

A voice signal supplied from the fixed terminal in the busy state is received by the receiver of the transmitter/receiver 204 via the antenna 205, and is converted into a digital signal by the modem 208. The digital signal is output to the frame processing circuit 203. The frame processing circuit 203 extracts voice data and control data in predetermined slots in the input digital signal. The circuit 203 outputs the voice data to the ADPCM codec 212, and outputs the control data to the CPU 206. The ADPCM codec 212 expands the input voice data, and supplies the expanded data to the receiver 201 as an analog signal.

In order to read out voice data stored in the VM unit 111, a read-out mode is set by depressing the setting key 209 of the mobile terminal. Upon detection of the read-out mode by depression of the setting key 209, the CPU 206 sends a request signal (an ID signal and a link establishment request) used for accessing the VM unit to the frame processing circuit 203. The ADPCM codec 212 modulates this signal into an analog signal, and outputs the analog signal to the frame processing circuit 203. This signal is converted by the frame processing circuit 203 into a frame signal on a predetermined slot, and the frame signal is digital-modulated by the transmitter/receiver 204 via the modem 208. The digital signal is transmitted to the VM unit 111 via the antenna 205.

Upon reception of a response signal from the VM unit 111 via the antenna 205, the transmitter/receiver 204, the modem 208, and the frame processing circuit 203 after the above-mentioned signal is output, the CPU 206 outputs a command to the frame processing circuit 203 to execute processing for hearing a voice signal from the VM unit 111.

The processing for hearing the voice signal is attained by performing a dial operation indicating a predetermined storage address (e.g., a number indicating an address after depression of "#" and "*" keys) using the key-pad 211 on the mobile terminal.

Upon completion of hearing of voice data at the mobile terminal side, the read-out processing of the VM unit 111 side is completed by performing a predetermined dial operation indicating the end of the operation (e.g., a specific number after depression of "#" and "*" keys) using the key-pad 211. Also, upon depression of the setting key 209 on the mobile terminal side, the CPU 206 completes the read-out processing on the mobile terminal side. Upon re-depression of the setting key 209, the voice message hearing processing and the read-out processing of the VM unit 111 can also be completed.

By operating the setting key 209 and the key-pad 211, a voice storage mode of speech communications via extensions, a voice storage mode of speech communications via outside lines, a voice storage mode of speech communications via predetermined lines (extensions or outside lines), a voice storage mode of all speech communications, or the like can be set. The contents of a speech communication designated by this setting operation are stored in the VM unit 111.

Note that the frame processing circuit 203 used in this embodiment is constituted by a limiter, compandor, and the like, and these are known to those who are skilled in the art. As the modulation method of the modem 208, digital modulation methods such as ASK, PSK, QAM, BPSK, QPSK, MSK, and the like can be adopted.

Figure 3:
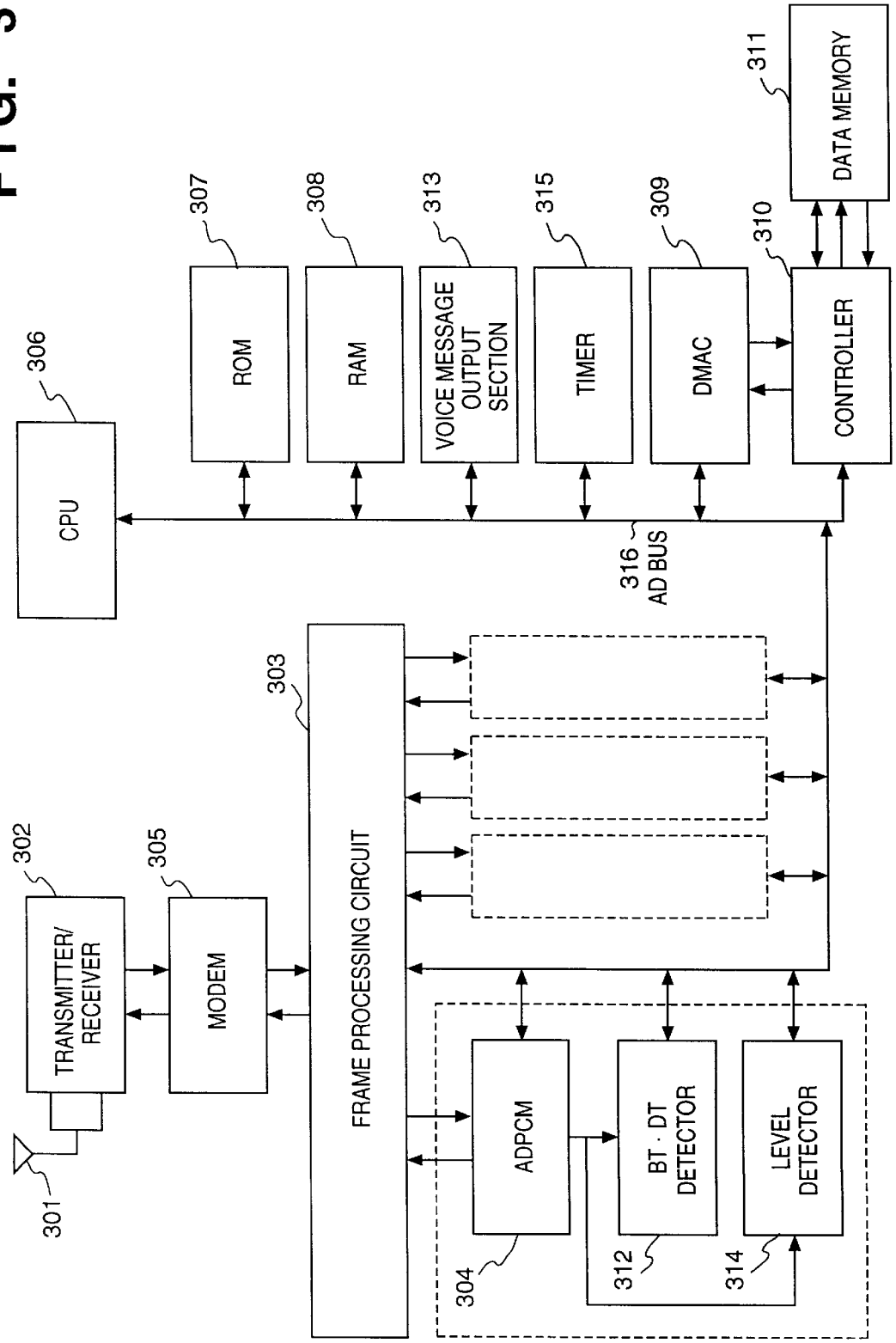
FIG. 3 is a block diagram showing the arrangement of a voice storage unit in the first embodiment.

FIG. 3 is a block diagram showing the arrangement of the VM unit 111 of this embodiment.

The VM unit 111 comprises an antenna 301 for transmitting/receiving signals to/from the mobile terminals and the fixed terminals, a transmitter/receiver 302 for outputting a modulated signal from a modem 305 via the antenna 301, and transmitting a received signal from the antenna 301 to the modem 305, and the modem 205 for modulating a digital signal from a frame processing circuit 303 and outputting the modulated signal to the transmitter/receiver 302, and for demodulating a modulated signal from the transmitter/receiver 302 and outputting the demodulated signal to the frame processing circuit 303.

The VM unit 111 also comprises the frame processing circuit 303 for superposing a digital signal from an ADPCM codec 304 on a predetermined frame and outputting the digital signal to the modem 305, for extracting a voice signal in the digital signal from the modem 305 and outputting the voice signal to the ADPCM codec 304, and for outputting control data in data received via the modem 305 to a CPU 306, and the ADPCM codec 304 for compressing a voice data signal from the frame processing circuit 303 and outputting the digital signal onto an AD bus as a communication path of data, for converting a voice data signal into an analog signal and outputting the analog signal to a BT•DT (busy tone•dial tone) detector 312 and a level detector 314, and for expanding a digital signal from the AD bus and outputting the expanded data as a voice data signal to the frame processing circuit 303.

In this embodiment, the ADPCM codec 304 compresses voice data. Alternatively, received voice data may be directly output from the frame processing circuit onto the AD bus.

Furthermore, the VM unit 111 comprises the CPU 306 for controlling the entire VM unit, a ROM 307 for storing a control program and ID information of the VM unit, a RAM 308 used as a voice data buffer and as an area for storing various kinds of setting information, a DMA (Direct Memory Access) controller 309 (incorporating at least two DMA controllers) for controlling the AD bus for performing DMA transfers between the ADPCM codec 304 and the RAM 308 and between the RAM 308 and a controller 310.

Moreover, the VM unit 111 comprises a data memory 311 for storing voice data, the controller 310 for controlling data read/write accesses to the data memory 311, the BT•DT detector 312 for detecting a BT (busy tone) or a DT (dial tone) from an office line, a voice message output section 313 for outputting a predetermined voice guidance message to the mobile terminal, the level detector 314 for detecting the output level from the ADPCM codec 304, a timer 315 for performing a predetermined time measurement operation on the basis of the output from the level detector 314, and a bus 316 for connecting the respective components via the AD bus.

Of the above-mentioned components, the ADPCM codec 304, the BT•DT detector 312 and the level detector 314 constitute a block for one channel. For example, when the VM unit 111 has four channels, four blocks including these components are required, as indicated by broken lines in FIG. 3.

In this embodiment, recording/reproduction processing using one block constituted by the ADPCM codec 304, the BT•DT detector 312, and the level detector 314 will be explained.

Voice recording processing will be explained below.

Assume that a signal (an ID signal, a call termination request, and a link establishment request) indicating an outgoing or incoming call from a mobile terminal or fixed terminal is received by the antenna 301, and the CPU 306 confirms this outgoing/incoming call signal via the transmitter/receiver 302, the modem 305, and the frame processing circuit 303, and detects a coincidence with ID data stored in its own terminal and information indicating storage processing. The CPU 306 then activates the data memory 311 via the DMA controller 309 and the controller 310. Note that this processing is executed when the data memory 311 comprises a memory device such as a hard disk, a magneto-optical disk, or the like that requires control. Therefore, this processing is not required when the data memory 311 comprises a semiconductor memory.

After this processing, upon detection of a channel assignment signal from the fixed terminal, the CPU 306 monitors signals exchanged between the mobile terminal and the fixed terminal in a predetermined channel via the frame processing circuit 303. When the CPU 306 detects establishment of a call between the mobile terminal and the fixed terminal during this processing, and detects a response signal from the mobile or fixed terminal, the CPU 306 outputs a command to the frame processing circuit 303 to extract a voice data signal from the mobile and fixed terminals on a predetermined channel.

Upon reception of this command, the frame processing circuit 303 extracts compressed voice data from the mobile and fixed terminals from frames on the predetermined channel, and converts the extracted data into single voice data by digitally mixing the extracted data. Upon completion of this conversion, a DMA request is output to the DMA controller 309. At the same time, the compressed voice data extracted by the frame processing circuit 303 is output to the ADPCM codec 304. As means for mixing digital data, as described above, software means using a ROM and hardware means are available.

Since only one speech communication channel is used between fixed and mobile terminals in a speech communication via an outside line, voice data in the channel can be extracted. However, when speech communications are performed via extensions in the system, two channels, i.e., a channel between the fixed and mobile terminals on the call originating side, and a channel between the fixed and mobile terminals on the call terminating side, are used in speech communications. For this reason, it is preferably determined in advance whether voice data of the channel on the call originating side or voice data of the channel on the call terminating side is to be extracted.

The ADPCM codec 304 converts received compressed data into an analog signal, and outputs the analog signal to the BT•DT detector 312 and the level detector 314. The BT•DT detector 312 detects a BT•DT signal or the like from an input signal, and outputs the detection information to the CPU 306 via the AD bus 316. On the other hand, when the level of the received voice signal is low, the level detector 314 outputs the level information to the CPU 306 via the AD bus 316.

Upon reception of the DMA request from the frame processing circuit 303, the DMA controller 309 requests the CPU 306 to release a bus. Upon reception of this request, the CPU 306 returns a signal indicating that the bus is released to the DMA controller 309 by checking the state of the bus, and also supplies control information to the DMA controller 309.

Upon detection of the information indicating acquisition of the right of use of the bus, the DMA controller 309 performs a DMA transfer between the ADPCM codec 304 and the RAM 308 to store voice data in a first storage area in the RAM having a predetermined size. When the CPU 306 detects that the first storage area becomes full of data, it performs processing for storing a voice signal in a second storage area.

Parallel to the storage operation in the second storage area, storage processing from the first storage area to the data memory 311 is performed. The storage processing in the data memory 311 ends before the second storage area becomes full of data. When the second storage area becomes full of data, the CPU 306 starts the storage operation in the first storage area again, and executes voice storage processing in the data memory 311 by repeating the above-mentioned operation. In this storage processing, when a specific storage area is not designated by the mobile terminal, data is stored in an area on the data memory 311 corresponding to the extension number of the mobile terminal itself. On the other hand, voice data may be stored in an area corresponding to an outside line number.

In order to suspend such voice storage processing, processing for completing the storage processing is executed when the CPU 306 detects a disconnection request signal from the mobile or fixed terminal via the modem 305 and when the CPU 306 detects a DT signal indicating the end of a speech communication for a predetermined period of time from the BT•DT detector 312 via the ADPCM codec 304.

Upon completion of the storage processing, when a signal indicating a change in storage area is received from the mobile terminal by the antenna 301, and the CPU 306 confirms this signal via the transmitter/receiver 302, the modem 305, and the frame processing circuit 303, the CPU 306 outputs a command to the controller 310 to transfer data to the area indicated by the change request signal.

Upon reception of this command, the controller 310 transfers data from the storage area corresponding to the mobile terminal in the data memory 311 to the region indicated by the change request signal. Upon completion of this data transfer, the controller 310 informs the CPU 306 of the end of transfer. Upon reception of this information, the CPU 306 informs the mobile terminal of the end of transfer.

Subsequently, voice reproduction processing will be explained below.

When a signal (an ID signal and a link establishment request) indicating reproduction is received from the mobile terminal by the antenna 301, and the CPU 306 confirms this signal via the transmitter/receiver 302, the modem 305, and the frame processing circuit 303, the CPU 306 checks if this request is acceptable. If the request is acceptable, the CPU 306 outputs a response signal to the frame processing circuit 303, and the response signal (an ID signal and channel assignment information) is transmitted to the mobile terminal via the modem 305 and the antenna 301.

The CPU 306 monitors a call setup request signal from the mobile terminal in a predetermined channel via the frame processing circuit 303. Upon detection of the call setup request signal from the mobile terminal during this processing, the CPU 306 outputs a response signal to this request signal, thus setting a busy state with the mobile terminal.

Upon detection of establishment of the busy state, the CPU 306 outputs a command to the voice message output section 313 to output a predetermined guidance. Upon reception of this command, the voice message output section 313 outputs the predetermined guidance stored in its internal memory onto the AD bus 316.

The CPU 306 inputs the guidance data to the frame processing circuit 303. Upon reception of this voice signal, the frame processing circuit 303 inserts this voice signal in a predetermined slot to form a predetermined frame, and outputs the frame to the modem 305. The voice guidance is then output to the mobile terminal via the transmitter/receiver 302 and the antenna 301.

In this embodiment, a voice guidance is output. Instead, a tone signal of a predetermined frequency that can be confirmed by the mobile terminal side may be used.

Upon detection of the end of the voice guidance, the CPU 306 performs processing for detecting the address information of voice data from the mobile terminal.

Upon detection of dial information from the mobile terminal via the antenna 301, the transmitter/receiver 302, the modem 305, and the frame processing circuit 303 during this processing, the CPU 306 performs processing for reading out a message corresponding to this dial information and stored in the data memory 311, via the controller 310.

In this processing, the CPU 306 outputs a command to the controller 310 to output voice data in a predetermined area on the basis of extension/outside line information. Upon reception of this command, the controller 310 stores voice data in the predetermined area in the data memory 311 in its internal buffer.

When this buffer becomes full of data, the controller 310 outputs a DMA transfer request of the voice data in the buffer to the DMA controller 309. When this request is accepted, the DMA controller 309 performs a DMA transfer between the controller 310 and the RAM 308.

When the CPU 306 detects that the transfer of data to the first storage area of the RAM 308 has been completed, the CPU 306 outputs a command to the frame processing circuit 303 to issue a DMA transfer request. Upon reception of this command, the frame processing circuit 303 issues a DMA transfer request to the DMA controller 309.

When this request is accepted, the DMA controller 309 performs a DMA transfer between the RAM 308 and the frame processing circuit 303. Parallel to the DMA transfer from the first storage area of the RAM 308, voice data from the controller 310 is stored in the second storage area of the RAM 308 by the DMA transfer.

Upon completion of the DMA transfer of the voice data from the first storage area of the RAM 308 to the frame processing circuit 303, the DMA transfer of data from the second storage area to the frame processing circuit 303 is subsequently started. By repeating this operation, voice data stored in the data memory 311 can be read out.

Note that the frame processing circuit 303 used in this embodiment is constituted by a limiter, compandor, TDMA, and the like, and these are known to those who are skilled in the art.

On the other hand, the conversion method of the codec for A/D-converting voice data is not particularly limited as long as a PCM (Pulse Code Modulation) method, ADPCM (Adaptive Differential Pulse Code Modulation) method, or the like is used. The bus arrangement is not particularly limited, either. For example, the bus may have an 8-, 16-, 32-, 64-bit width, or the like.

Figure 4:
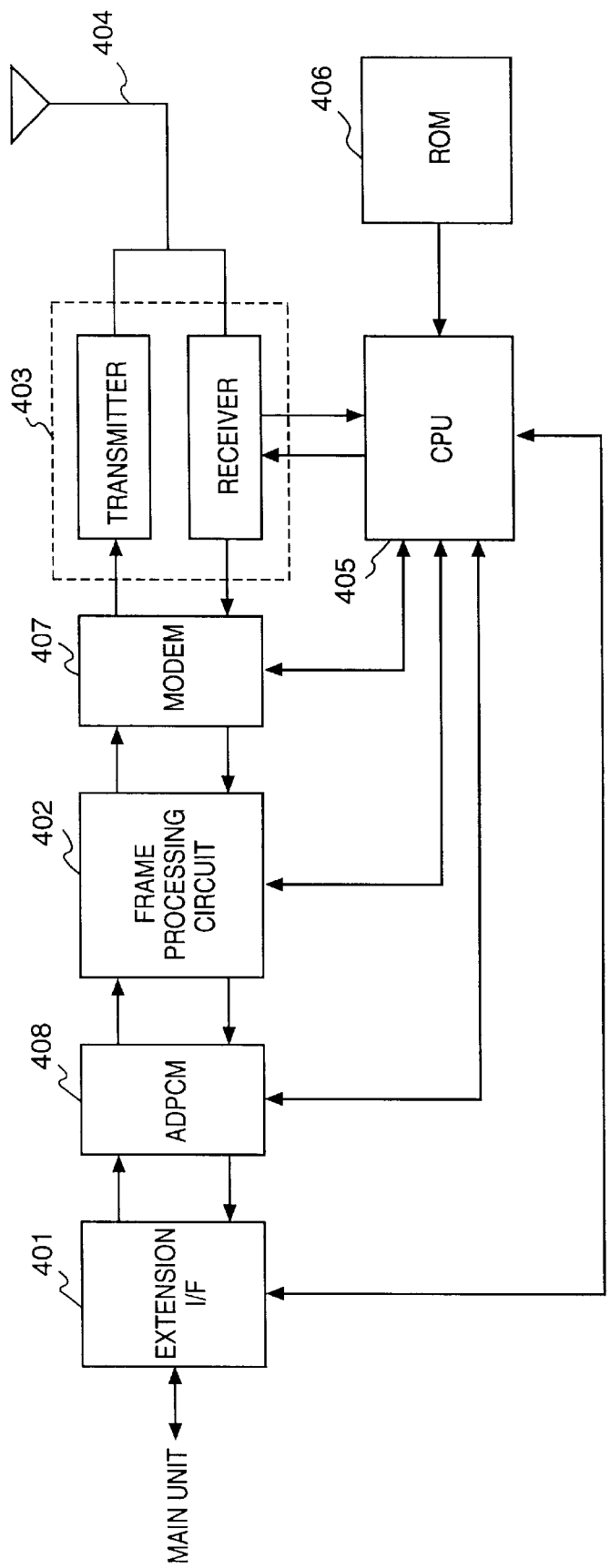
FIG. 4 is a block diagram showing the arrangement of a fixed terminal in the first embodiment.

FIG. 4 is a block diagram showing the arrangement of the fixed terminal in this embodiment.

The fixed terminal comprises an extension interface 401 for transmitting/receiving control data and voice data to/from the main unit, and transmitting/receiving voice data to/from an ADPCM codec 408, and the ADPCM codec 408 for converting a PCM voice signal from the extension interface 401 into an ADPCM signal by compressing the PCM voice signal and outputting the ADPCM signal to a frame processing circuit 402, and for expanding an ADPCM signal from the frame processing circuit 402 to a PCM signal, and outputting the PCM signal to the extension interface 401.

The fixed terminal also comprises the frame processing circuit 402 for superposing a digital signal from the ADPCM codec 408 on a predetermined frame and outputting the digital signal to a modem 407, for extracting a voice signal from a digital signal from the modem 407 and outputting the voice signal to the ADPCM codec 408, and for outputting control data in received data to a CPU 405, and the modem 407 for modulating a digital signal from the frame processing circuit 402 and outputting the modulated signal to a transmitter/receiver 403, and for demodulating a modulated signal from the transmitter/receiver 403 and outputting the demodulated signal to the frame processing circuit 402.

Furthermore, the fixed terminal comprises the transmitter/receiver 403 for outputting a modulated signal from the modem 407 via an antenna 404, and transmitting a received signal from the antenna 404 to the modem 407, the antenna 404 for transmitting/receiving a signal to/from the mobile terminal, the CPU 405 for controlling the fixed terminal, and a ROM 406 for storing a control program of the fixed terminal.

In the fixed terminal with the above-mentioned arrangement, upon detection, via the extension interface 401, of a message from the main unit indicating that an outgoing call is answered from an extension or outside line, the CPU 405 outputs a predetermined response signal to the frame processing circuit 402. The frame processing circuit 402 outputs the response signal on a predetermined frame in a predetermined slot to the modem 407 in accordance with control information from the main unit. With this operation, the modem 407 sends a control signal to the transmitter/receiver 403, and the transmitter/receiver 403 outputs the control signal indicating the presence of the response to the mobile terminal and the VM unit 111 via the antenna 404.

Figure 5:
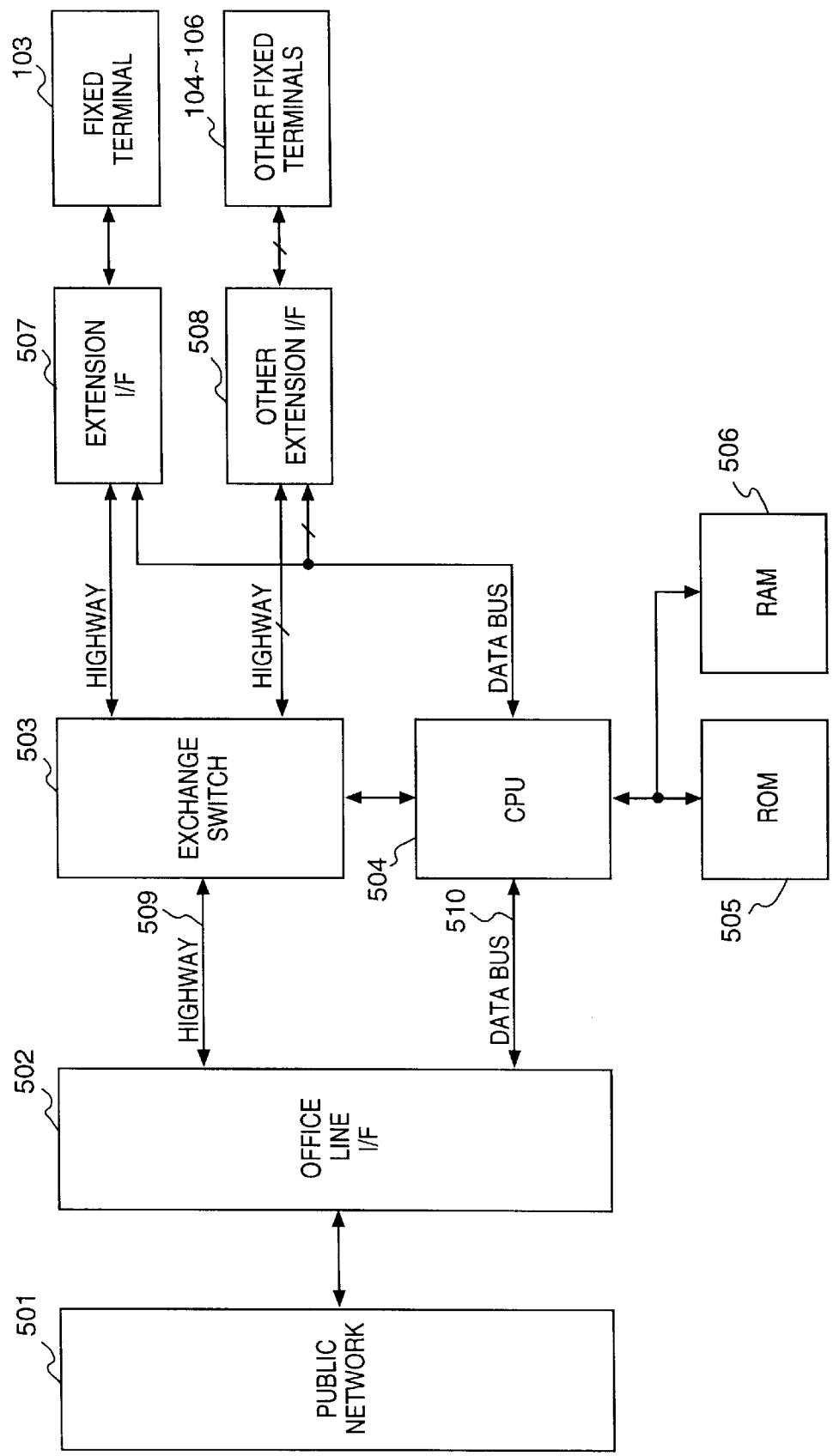
FIG. 5 is a block diagram showing the arrangement of a main unit in the first embodiment.

FIG. 5 is a block diagram showing the arrangement of the main unit in this embodiment.

The main unit comprises an office line interface 502 which accommodates a public network 501, and detects a response reverse from the public network 501, an exchange switch 503 for performing connection control of lines, a CPU 504 for controlling the entire main unit, a ROM 505 for storing a control program and information such as ID data, a RAM 506 for storing various data, extension interfaces 507 and 508 which accommodate the fixed terminals 103 to 106, highways 509 for connecting among the interfaces 502, 507, and 508, and the exchange switch 503, and data buses 510 for connecting the CPU 504 and the respective sections.

Upon reception of a signal indicating call origination from the mobile terminal 107 via the fixed terminal 103 and the extension interface 507, the CPU 504 controls the exchange switch 503 to perform processing for connecting the highway 509 to the office line interface 502 or the other extension interface 508. At the same time, the CPU 504 monitors the states of the mobile terminals which are being currently used to detect idle radio time slots, and outputs idle channel information to the fixed terminal. After this processing, call originating processing to a destination indicated by a dial number input from the mobile terminal is performed from the fixed terminal.

Upon completion of the call originating processing, the CPU 504 detects a response signal from the extension interface 508 or the office line interface 502. Note that a response signal from each of other mobile terminals 108 to 110 is considered as depression information of the speech communication button for an incoming call, and when the other extension interface 508 receives this information, it outputs a predetermined response signal to the CPU 504.

When a response reverse is received from the public network 501, the office line interface 502 detects it using its internal response reverse detector (constituted by a photocoupler, operational amplifier, one-shot multivibrator circuit, and the like), and outputs a signal indicating that the partner answered the call, to the CPU 504.

When each of other fixed terminals 104 to 106 detects a response made at a corresponding one of other mobile terminals 108 to 110 as the extensions, the fixed terminal informs the CPU 504 of a signal indicating the presence of a predetermined response via the extension interface 508.

Upon reception of the response signal, the CPU 504 sends a command to the fixed terminal 103 via the extension interface 507 to output a predetermined response signal to the mobile terminal 107 and the VM unit 111.

In this embodiment, responses from the extension and outside line interfaces are directly detected by the CPU 504. Alternatively, processing for scanning predetermined external ports using interrupt processing may be performed.

Figure 6:
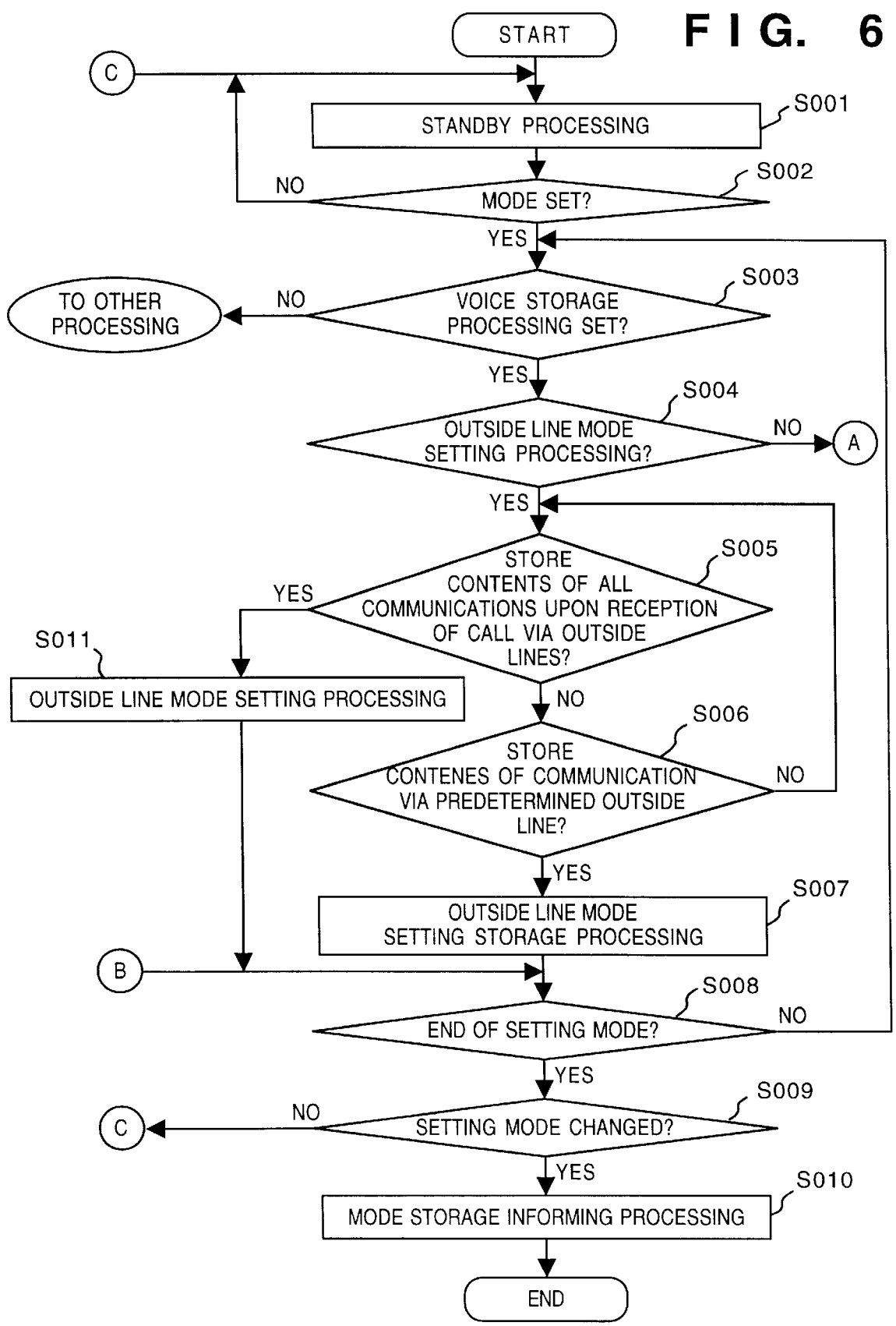
FIG. 6 is a flow chart showing the mode setting operation of the voice storage unit in the first embodiment.
Figure 7:
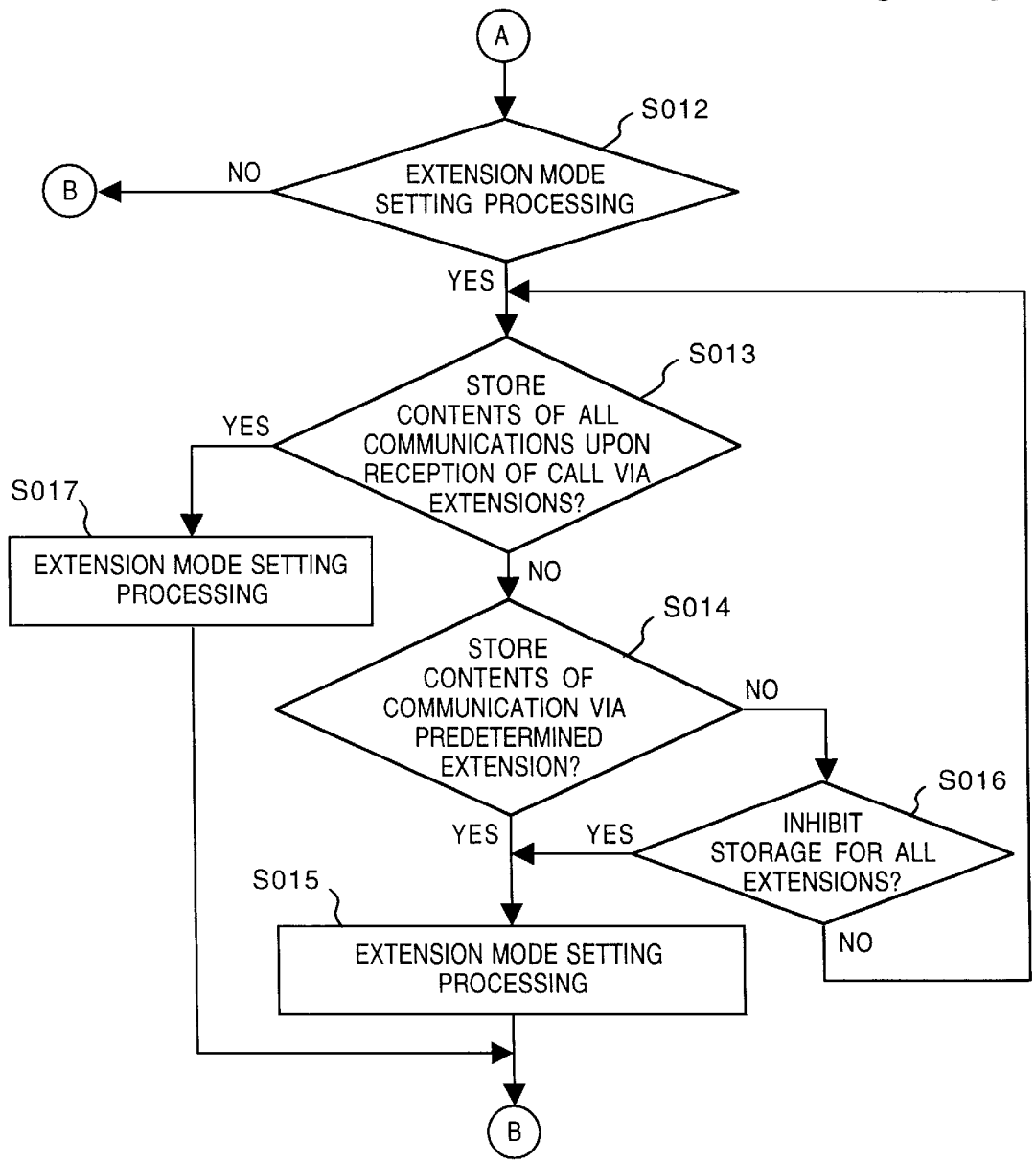
FIG. 7 is a flow chart showing the mode setting operation of the voice storage unit in the first embodiment.

FIGS. 6 and 7 are flow charts showing the operations for setting a voice storage mode in the main unit of this embodiment.

If mode setting is performed by a mobile terminal in step S002 while standby processing is being performed in step S001, it is checked in step S003 if the mode is a voice storage processing setting mode. If NO in step S003, the control advances to other processing. If it is determined in step S003 that the voice storage processing setting mode is selected, it is checked in step S004 if an outside line mode is set. If YES in step S004, it is checked if a mode for storing the contents of all speech communications corresponding to outgoing and incoming calls to and from outside lines is selected.

If YES in step S005, a setting operation for storing the contents of all the speech communications via outside lines is performed in step S011. It is then confirmed in step S008 if the setting mode is to end. If NO in step S008, the flow returns to step S003 to select the setting processing again.

On the other hand, if it is determined in step S005 that the mode for storing the contents of all the outgoing and incoming calls to and from outside lines is not selected, it is checked in step S006 if processing for storing the contents of speech communications via only a predetermined outside line designated by the mobile terminal is performed. If NO in step S006, the flow returns to step S005. On the other hand, if YES in step S006, i.e., the voice storage processing via only the predetermined outside line is set (e.g., speech communications corresponding to incoming calls from only outside line 1 are subjected to voice storage processing, and speech communications corresponding to outgoing and incoming calls using other lines are not subjected to voice storage processing), processing for storing the setting information is performed in step S007. It is checked in step S008 if the setting mode is to end.

If it is determined in step S004 that the outside line setting mode is not selected, it is checked in step S012 if extension mode setting processing is selected. If YES in step S012, it is checked in step S013 if a mode for storing the contents of all the outgoing and incoming calls via extensions is selected. If YES in step S013, the extension mode setting processing is performed in step S017. If it is determined in step S013 that the mode for storing the contents of all the outgoing and incoming calls via extensions is not selected, it is checked in step S014 if a mode for storing the contents of speech communications corresponding to outgoing and incoming calls via a predetermined extension designated by the mobile terminal is selected. (For example, the speech communication storage processing is performed for outgoing calls via the extensions and outside lines using extension 1 and incoming calls to extension 1, and the processing is not performed in other terminals. Only when a user inputs a request, the speech communication storage processing is performed in other terminals.) If NO in step S014, it is checked in step S016 if a mode for inhibiting automatic recording of the contents of speech communications corresponding to outgoing and incoming calls via all the extensions is selected. If NO in step S016, the setting operation for the recording processing in speech communications via extensions is continued in step S013. On the other hand, if YES in step S016, the extension mode setting processing is performed in step S015.

Upon completion of this processing, it is confirmed in step S008 if the setting mode is to end. If YES in step S008, it is checked in step S009 if the setting mode has been changed. If NO in step S009, the control advances to normal standby processing. On the other hand, if YES in step S009, the setting information is stored and change information is supplied to the changed mobile terminal in step S010. Upon completion of this processing, the control advances to standby processing.

Figure 8:
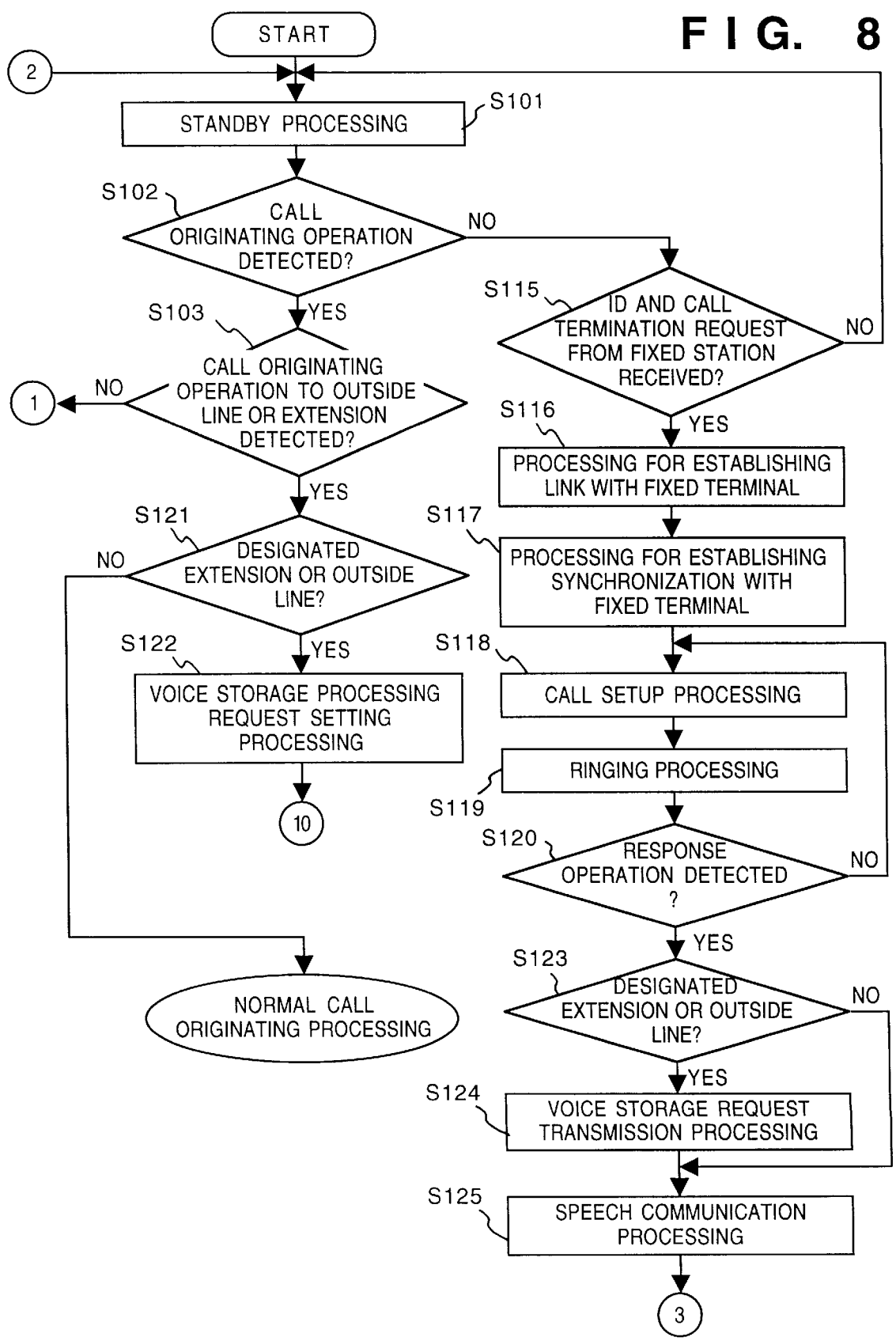
FIG. 8 is a flow chart showing the operation of the first embodiment from when a user originates a call from a mobile terminal to an extension or outside line until he or she starts a speech communication.
Figure 9:
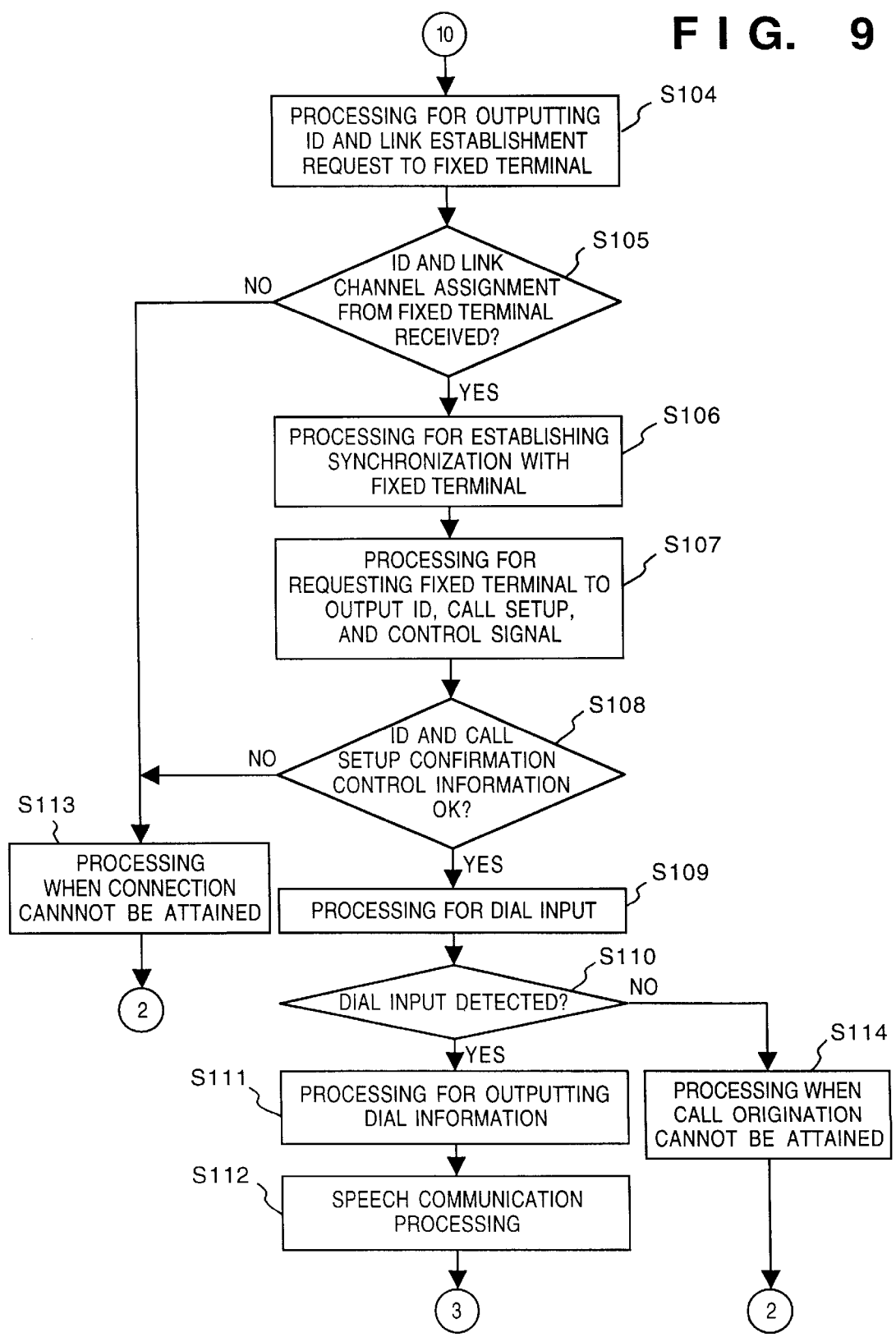
FIG. 9 is a flow chart showing the operation of the first embodiment from when a user originates a call from a mobile terminal to an extension or outside line until he or she starts a speech communication.

FIGS. 8 and 9 are flow charts showing the operation in this embodiment from when a user originates or places a call to an extension or outside line using a mobile terminal until he or she starts a speech communication.

If a call originating operation is performed by depressing the speech communication button or removing the mobile terminal from a charging base in step S102 while standby processing is being performed in step S101, it is checked in step S103 if a call originating operation to an outside line or extension is to be performed. If NO in step S103, it is checked if the VM unit 111 is called. Note that this processing will be described later.

On the other hand, if YES in step S103, it is checked in step S121 if the call originating operation is performed using an extension which is set in the speech communication recording mode or an outside line which is designated in the speech communication recording mode. If NO in step S121, normal call originating processing is performed. On the other hand, if YES in step S121, processing for outputting a signal for requesting a control signal indicating that voice storage processing is performed is executed in step S123. Upon completion of this processing, an ID signal and a link establishment request are output to the fixed terminal using an arbitrary slot in step S104. A response from the fixed terminal to this signal is monitored in step S105. Upon detection of an ID signal and a channel assignment signal from the fixed terminal, processing for establishing synchronization using the assigned channel with the fixed terminal is performed in step S106. Upon completion of this processing, an ID signal, a call setup request, and a control signal indicating that predetermined voice storage processing is performed are requested to the fixed terminal in step S107. In step S108, an ID signal, a call setup confirmation signal, and a control signal indicating permission of the voice storage processing from the fixed terminal are detected.

If the ID signal, the call setup confirmation signal, and the voice storage permission signal cannot be detected in step S105 or S108, processing (for generating a warning tone or displaying, on the display, a message indicating that a call originating operation cannot be performed) when a connection to the fixed terminal cannot be attained is performed in step S113, and the flow returns to standby processing in step S101.

If the ID signal, the call setup confirmation signal, and the voice storage processing permission signal are detected in step S108, processing for inputting a dial signal is performed in step S109. This processing corresponds to processing for outputting a DT upon call origination via an extension or outside line. After this processing, if a dial signal is input in step S110, a signal indicating a response from the partner is detected, and a predetermined response signal is output in step S111. After the response signal is output, processing for performing a speech communication with the fixed terminal is performed and a normal speech communication is performed in step S112.

If a dial signal is not confirmed in step S110, processing when a call originating operation cannot be performed is executed in step S114, and the flow returns to normal standby processing in step S101.

On the other hand, if a call originating operation on the mobile terminal is not confirmed in step S102, an ID signal and a call termination request signal, which indicate an incoming call on a control slot from the fixed terminal, are monitored in step S115. If neither the ID signal nor the call termination request signal on the control slot are detected in step S115, normal standby processing is performed in step S101.

If the ID signal and the call termination request signal, which indicate an incoming call from the fixed terminal on the control slot, are detected in step S115 in FIG. 8, processing for establishing a link with the fixed terminal is performed in step S116, and channel assignment is performed. Upon completion of the link establishment processing, processing for establishing synchronization with the fixed terminal using the designated channel is performed in step S117. Upon completion of this processing, call setup processing with the fixed terminal is performed in step S118. Upon completion of the call setup processing, the mobile terminal generates a ringing tone in accordance with a command from the fixed terminal in step S119.

If no response operation is performed on the mobile terminal in step S120 while the mobile terminal is generating a ringing tone in step S119, ringing processing of the mobile terminal is continued in step S118.

If a response operation is performed in step S120, it is checked in step S123 if a communication is performed using an extension or outside line which is designated for voice recording. If NO in step S123, speech communication processing is performed in step S125; otherwise, voice storage request transmission processing is performed in step S124, and thereafter, speech communication processing is performed in step S125.

Also, when a call termination request is received from the fixed terminal, a phase ID and a voice storage processing permission signal are exchanged.

Figure 10:
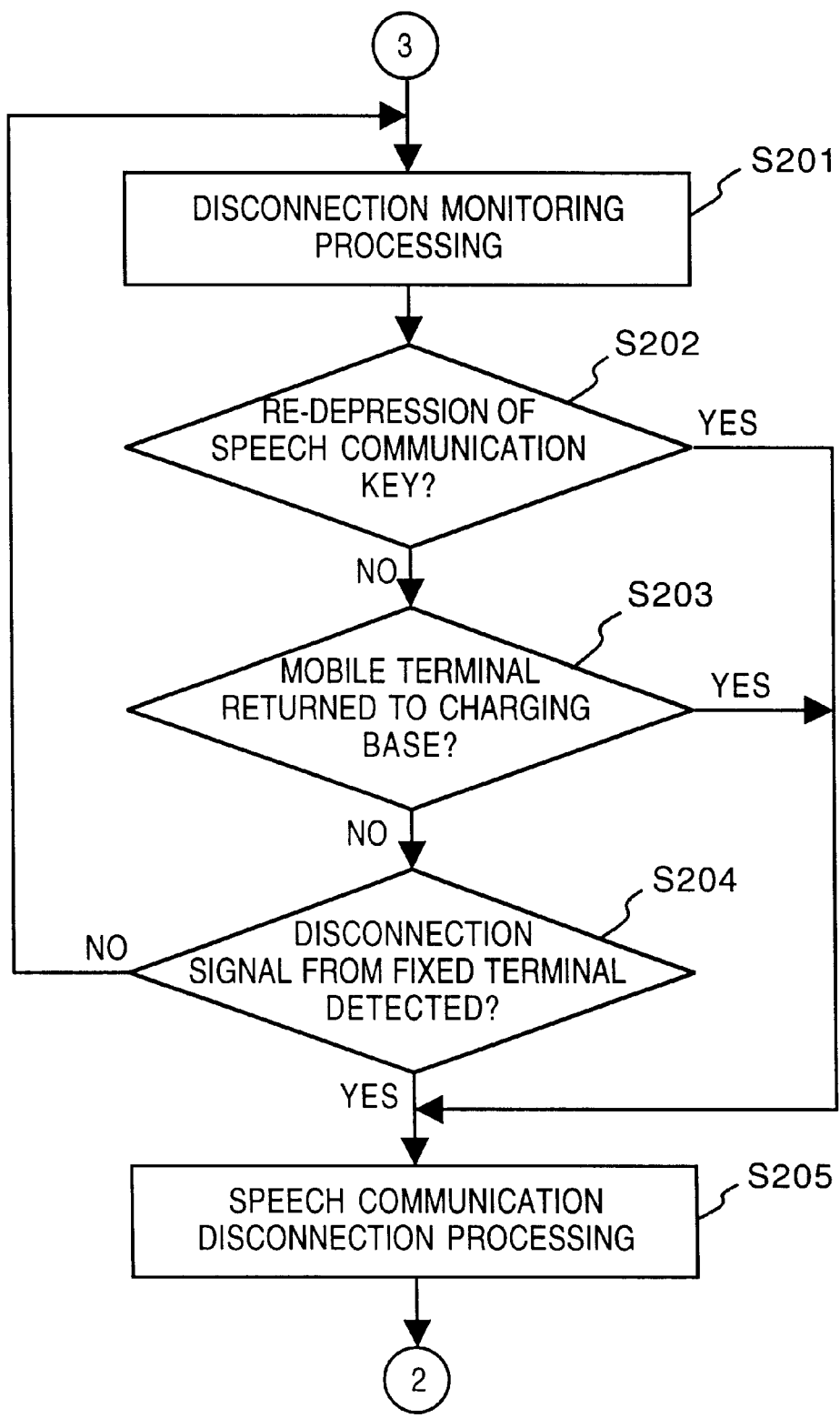
FIG. 10 is a flow chart showing the operation of the first embodiment from the busy state using the mobile terminal until the speech communication is completed.

FIG. 10 is a flow chart showing the operation in this embodiment from the busy state of a mobile terminal until the speech communication is completed.

If the mobile terminal is in a busy state, disconnection monitoring processing is executed in step S201, and re-depression of the speech communication button is monitored in step S202. If the speech communication button is not re-depressed, it is monitored in step S203 if the mobile terminal is returned to the charging base. If it is detected in step S203 that the mobile terminal is not returned to the charging base, it is checked in step S204 if a disconnection request signal from the fixed terminal is detected. If it is determined in step S204 that a disconnection request signal from the fixed terminal is not detected, the disconnection monitoring processing is performed in step S201.

If it is determined in step S202, S203, or S204 that the speech communication button is re-depressed on the mobile terminal, the mobile terminal is returned to the charging base, or a disconnection request signal from the fixed terminal is detected, processing for disconnecting the speech communication is performed in step S205, and the control of the mobile terminal advances to standby processing.

Figure 11:
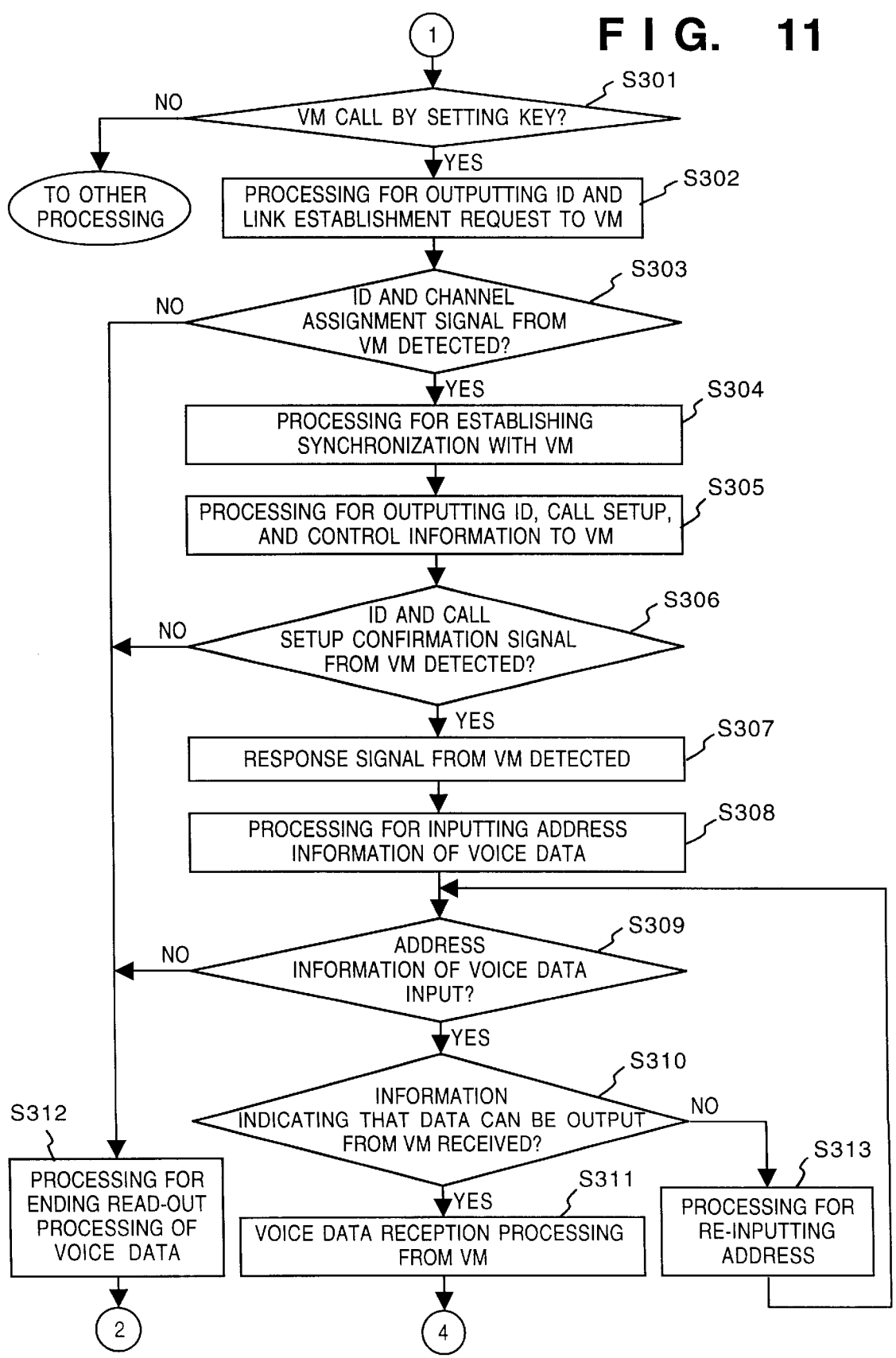
FIG. 11 is a flow chart showing the operation of the first embodiment until the mobile terminal reads out a voice message from the voice storage unit.

FIG. 11 is a flow chart showing the operation in this embodiment until a voice message is read out from the VM unit using a mobile terminal. In this flow chart, the VM unit is represented by VM for the sake of simplicity.

After a call originating operation is performed on the mobile terminal, if depression of a VM unit call key (this key may be arranged in advance on the mobile terminal or an arbitrary key may be set using a flexible key setting function) on the mobile terminal is detected in step S301, an ID signal and a link establishment request signal are output to the VM unit (VM) 111 in step S302. After this processing, it is monitored in step S303 if an ID signal and a channel assignment signal from the VM unit are detected.

If it is determined in step S303 that the ID signal and the channel assignment signal are detected, processing for establishing synchronization with the VM unit using the assigned channel is performed in step S304. On the other hand, if it is determined in step S303 that neither the ID signal nor the channel assignment signal are detected, or that there is no channel to be assigned, voice data read-out processing ends in step S312, and the control advances to standby processing.

Upon completion of the synchronization establishment processing, processing for outputting an ID signal, a call setup signal, and a voice storage processing permission signal to the VM unit is performed in step S305. After this processing, if an ID signal, a call setup confirmation signal, and a voice storage processing permission signal are detected from the VM unit in step S306, it is checked in step S307 if a response signal from the VM unit such as a voice guidance signal, a tone signal of a predetermined frequency, or the like, which indicates that a call is established, is detected.

If neither the ID signal nor the call setup confirmation signal are detected in step S306, voice data read-out processing ends in step S312, and the control advances to standby processing.

Data input after the predetermined response signal from the VM unit is confirmed in step S307 is data indicating an address. By inputting a predetermined number in this state, the address of data to be output from the memory can be determined.

In step S308, processing for inputting address information of voice data using the dial button on the mobile terminal is performed. If it is determined in step S309 that a dial number indicating the address of predetermined voice data is input, it is monitored in step S310 if information indicating whether or not voice data corresponding to the input address data is present and whether or not the voice data can be output if it is present is detected. If a signal indicating that the voice data can be output is detected from the VM unit in step S310, the voice data is received from the VM unit in step S311, and the received message can be heard.

If it is determined in step S310 that information indicating that a voice message cannot be output is received from the VM unit, processing for re-inputting address information is performed in step S313, and the flow returns to step S308 to monitor if a dial number indicating address information of a voice message is re-input.

In order to assure secrecy or security of information, processing for inhibiting a user from hearing a stored voice message using the mobile terminal unless he or she inputs a predetermined password or the like may be performed.

Figure 12:
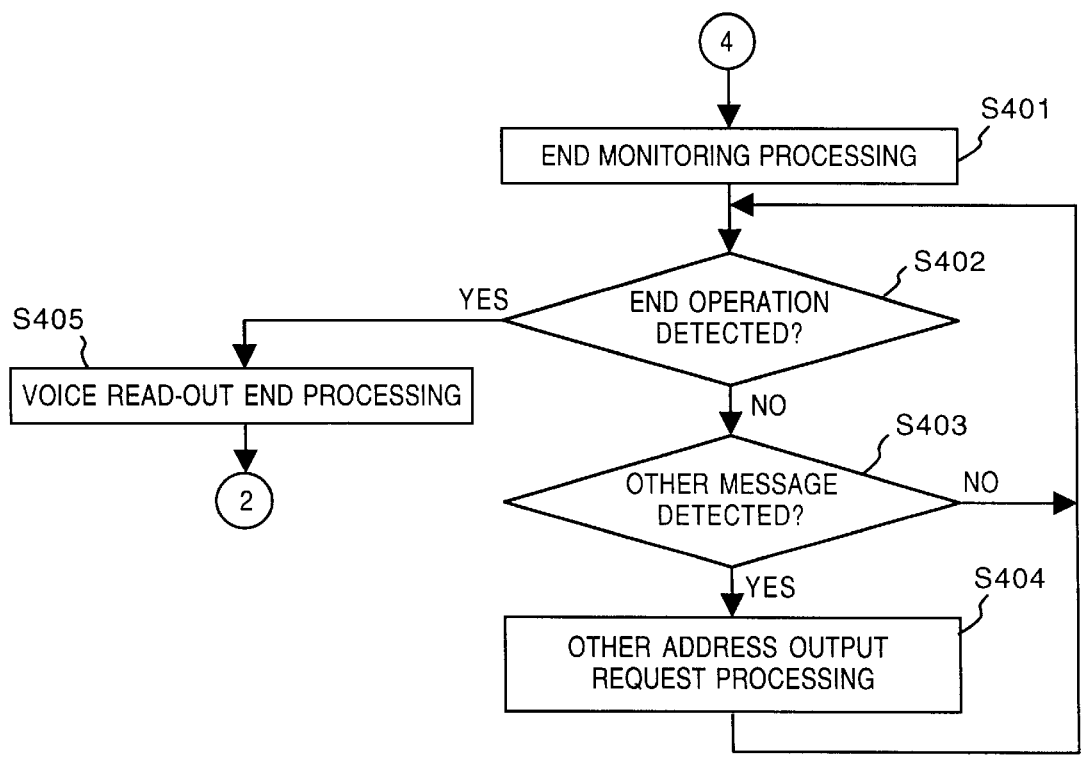
FIG. 12 is a flow chart showing the operation of the first embodiment when the mobile terminal stops the read-out operation of a voice message from the voice storage unit.

FIG. 12 is a flow chart showing the operation for stopping the voice message read-out operation from the VM unit using a mobile terminal in this embodiment.

During the hearing operation of a voice message using the mobile terminal, it is monitored in step S401 if a hearing end operation is performed on the mobile terminal. If it is determined in step S402 that re-depression of the speech communication button is detected or the mobile terminal is returned to the charging base, voice message hearing processing ends in step S405, and the control advances to standby processing.

If the end operation is not detected in step S402, it is monitored in step S403 if another message hearing processing is performed. If it is detected in step S403 that another message output processing is performed, a signal for requesting the VM unit to output the voice message is output in step S404.

On the other hand, if another voice message output request is not detected in step S403, the flow advances to step S401 to perform the voice message hearing end monitoring processing.

Figure 13:
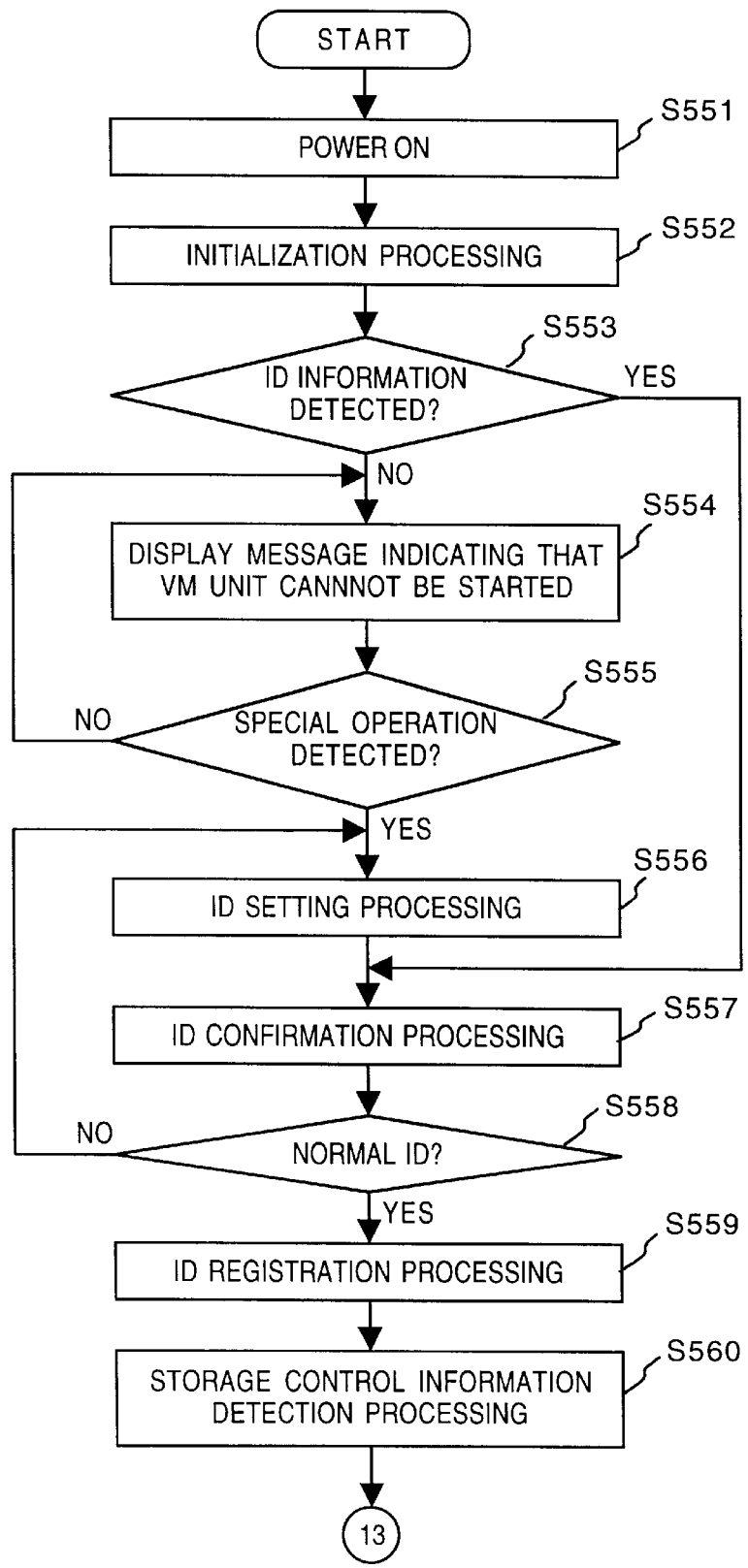
FIG. 13 is a flow chart showing the operation upon activation of the voice storage unit in the first embodiment.

FIG. 13 is a flow chart showing the operation performed when the power supply of the VM unit is turned on in this embodiment.

When the power supply of the VM unit is turned on step S551, and when initialization of the system is completed in step S552, stored ID information is confirmed in step S553. As a result of confirmation, if ID information is detected, ID confirmation processing is performed in step S557 to confirm the communication states of the mobile and fixed terminals. On the other hand, if no ID information is detected in step S553, processing for informing that the unit cannot be used is performed in step S554 to inform a user of a message indicating that normal processing cannot be started. As informing means, visual information using a display device or light emitted by, e.g., an LED, or audible information using a warning tone or the like may be used.

If special processing for inputting ID information is performed in step S555 while a message indicating that the unit cannot be used is informed in step S554, processing for registering ID information is performed in step S556. Upon completion of ID setting processing in step S556, ID information is confirmed in step S557. It is confirmed in step S558 if ID information is normal. If it is determined in step S558 that ID information is abnormal, the ID setting processing is performed again in step S556. On the other hand, if it is determined in step S558 that ID information is normal, ID storage processing is performed in step S559. In step S560, processing for detecting storage control information is performed by monitoring the communication states of the mobile and fixed terminals.

Figure 14:
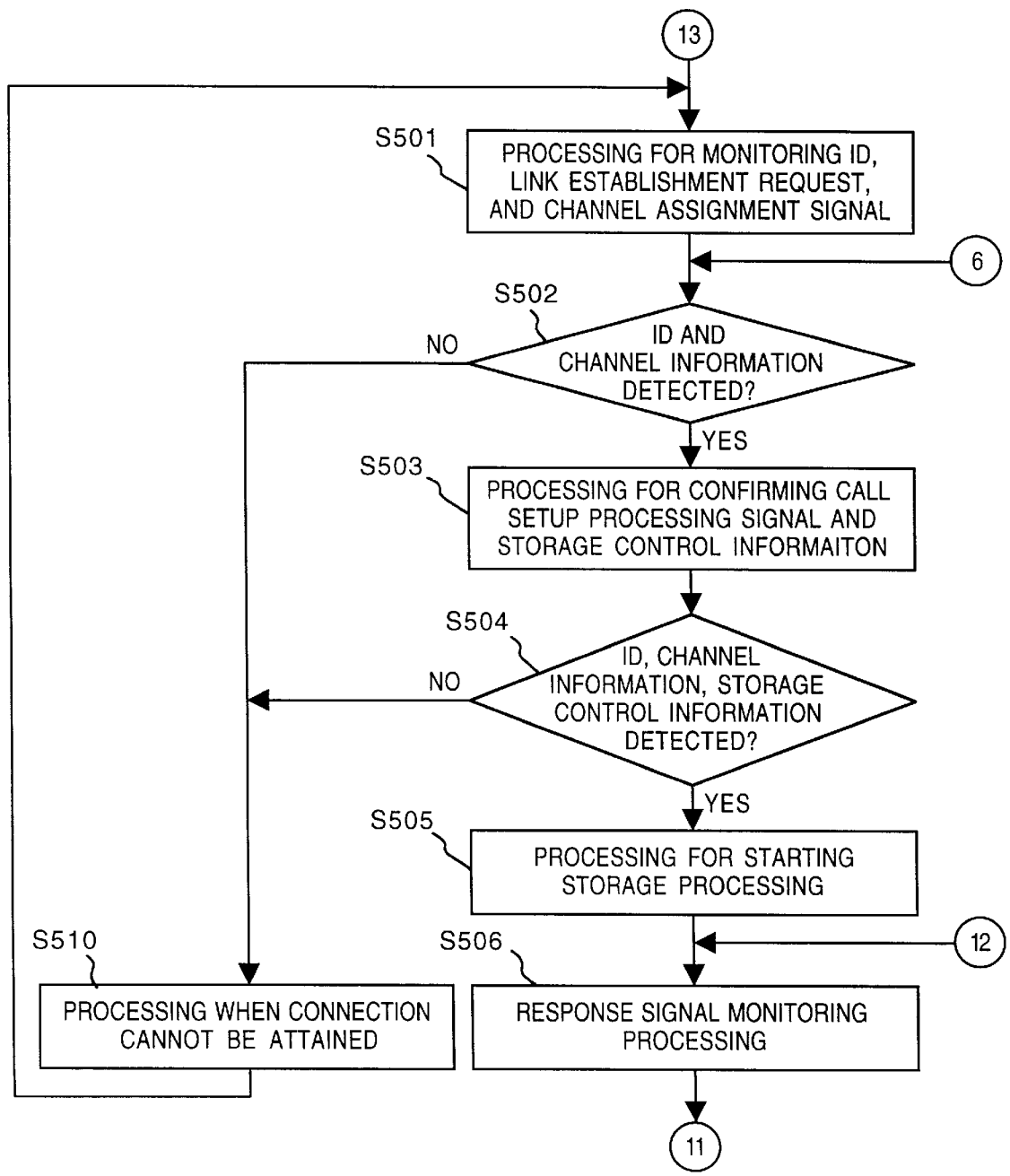
FIG. 14 is a flow chart showing the voice message storage operation of the voice storage unit in the first embodiment.
Figure 15:
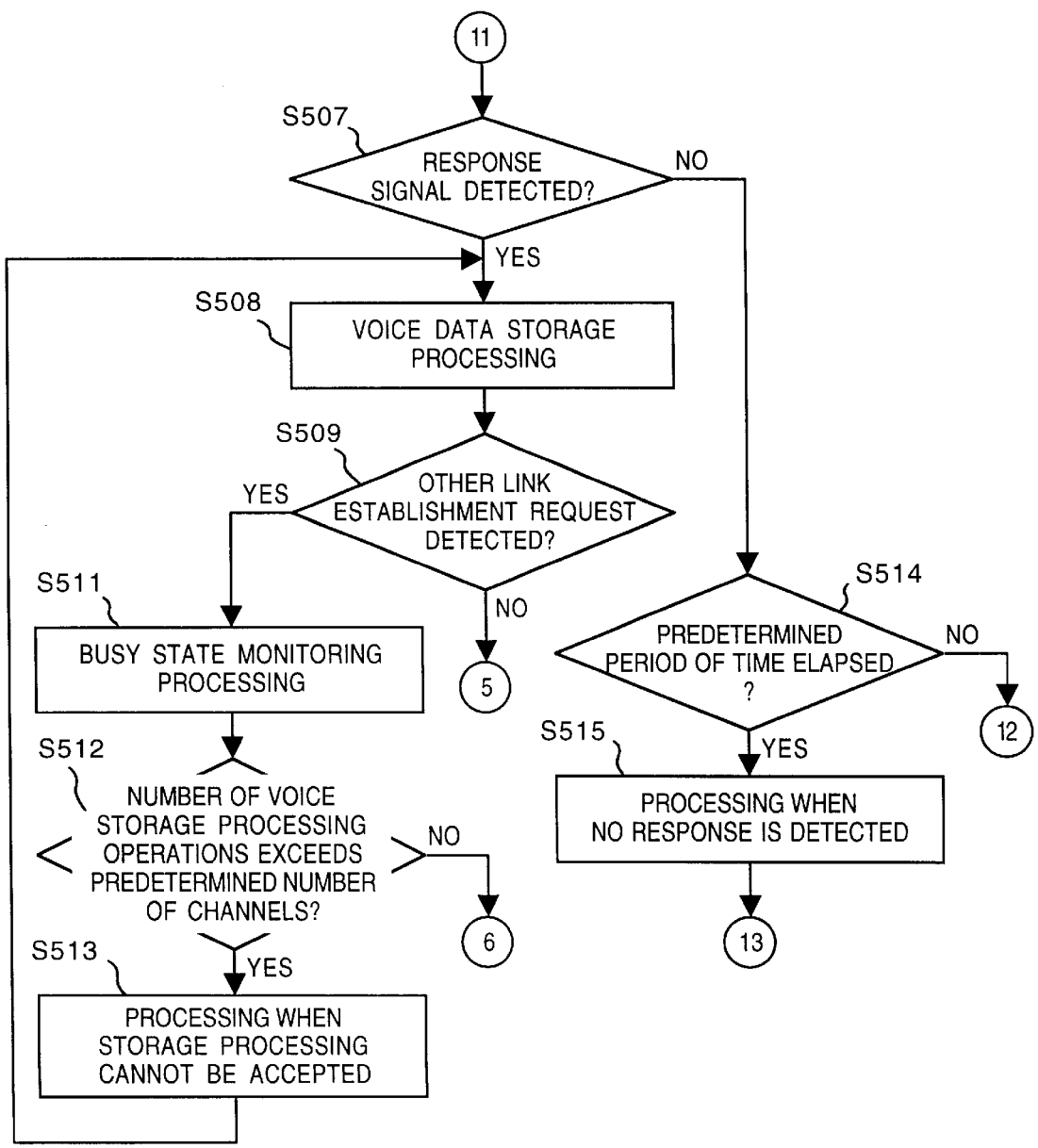
FIG. 15 is a flow chart showing the voice message storage operation of the voice storage unit in the first embodiment.

FIGS. 14 and 15 are flow charts showing the voice message storage operation in the VM unit in this embodiment.

During monitoring processing of an ID signal, a call termination request, a channel establishment request signal, and a channel assignment signal from a fixed or mobile terminal in step S501, if an ID signal and channel control information from a fixed or mobile terminal are detected in step S502, the VM unit performs confirmation processing of a call setup processing signal and storage control information exchanged between the mobile and fixed terminals in step S503.

During this processing, if an ID signal, channel information, and voice data storage control information are detected in step S504, pre-processing for starting the storage processing is performed in step S505.

In this pre-processing, when the VM unit comprises an internal memory such as a hard disk or the like, processing for setting the memory in a standby state is performed. On the other hand, when the VM unit comprises an IC as its internal memory, processing for changing the operation mode of the memory from a sleep mode to a normal mode is performed.

If neither the ID signal nor channel information are detected in steps S502 and S504, processing when a connection cannot be attained is performed in step S510, and the monitoring processing of an ID signal, a link establishment request, and a channel assignment signal is performed again in step S501.

After the processing for starting the storage processing is performed in step S505, a response signal from the mobile terminal is monitored in step S506. This response signal is output when a signal generated upon depression of the speech communication button to answer an incoming call or a signal indicating a response reverse received from the fixed or mobile terminal via the office line is detected.

During the monitoring processing of the response signal, if the VM unit detects a response signal in step S507, voice data storage processing is performed in step S508 to record the contents of a speech communication.

On the other hand, if no response signal is detected in step S507, a response signal is detected for a predetermined period of time in step S514. If it is determined in step S514 that the predetermined period of time has not elapsed, the flow returns to step S506 to perform the monitoring processing of the response signal again. On the other hand, if it is determined in step S514 that the predetermined period of time has elapsed, processing when the response signal cannot be detected is performed in step S515. Upon completion of this processing, the monitoring processing of an ID signal, a link establishment request, and a channel assignment signal is performed again in step S501.

During the voice data storage processing in step S508, if a link establishment request between other mobile and fixed terminals is detected in step S509, the current processing state is monitored in step S511. As a result, if it is detected in step S512 that all speech communication channels of the VM unit are in use, processing when storage processing cannot be accepted is performed in step S513 without accepting the request, and the voice data storage processing is continued in step S508.

Figure 16:
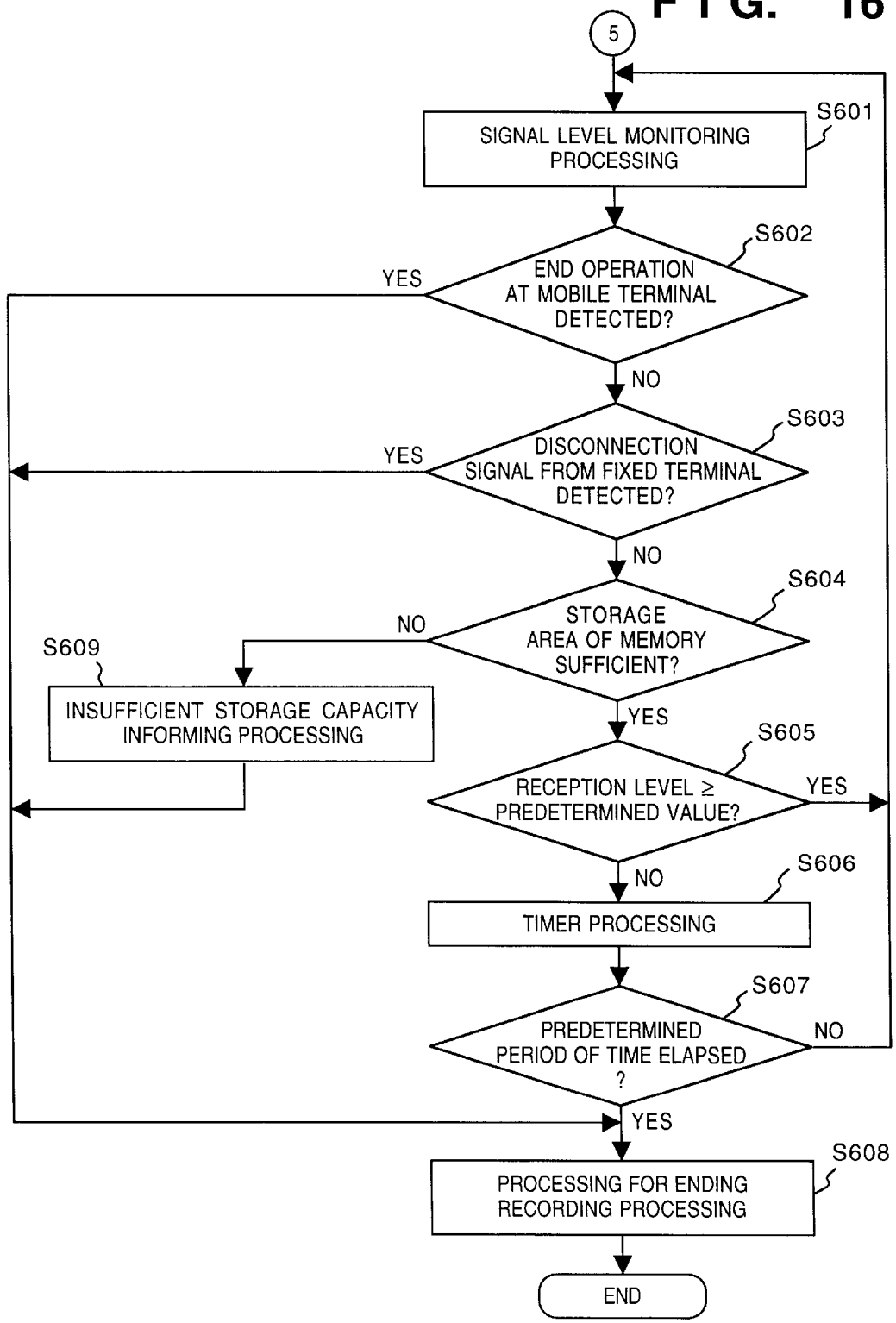
FIG. 16 is a flow chart showing the operation for completing the voice message storage processing of the voice storage unit in the first embodiment.

FIG. 16 is a flow chart showing the operation for completing the voice message storage processing of the VM unit in this embodiment.

The VM unit monitors the level of a signal from the mobile terminal in step S601 simultaneously with the recording operation of the contents of a speech communication. During this monitoring processing, if a signal indicating an end operation from the mobile terminal is detected in step S602, the voice message recording processing ends in step S608.

Note that the signal indicating the end from the mobile terminal is, e.g., setting key information, a re-depression signal of the speech communication button, or the like from the mobile terminal.

If a signal indicating the end operation of the recording processing from the mobile terminal is not detected in step S602, it is checked in step S603 if a disconnection signal from the fixed terminal is detected. If a disconnection signal from the fixed terminal is detected in step S603, processing for ending the voice data storage processing is performed in step S608.

On the other hand, if a disconnection signal from the fixed terminal is not detected in step S603, it is confirmed in step S604 if the storage area in the VM unit is sufficient. If it is determined in step S604 that the storage area of the memory is insufficient, processing for informing that the storage capacity is insufficient is performed in step S609, and predetermined message data is output to the fixed and mobile terminals for which the contents of a speech communication are being recorded. In step S608, the storage processing ends.

If it is determined in step S604 that the storage capacity of the memory is sufficient, the reception level is detected. If it is determined in step S605 that the level of the received signal is equal to or higher than a predetermined value, the flow returns to step S601 to monitor the signal level again.

If it is determined in step S605 that the signal level from the mobile or fixed terminal is lower than the predetermined value, timer processing for measuring a predetermined period of time is performed in step S606, and it is monitored in step S607 if the predetermined period of time has elapsed.

As a result of measurement, if it is determined that the predetermined period of time has not elapsed, the flow returns to step S601 to perform the monitoring processing of the signal level again. On the other hand, if it is determined in step S607 that the predetermined period of time has elapsed, processing for ending the speech communication recording processing is performed, thus ending the recording processing.

Figure 17:
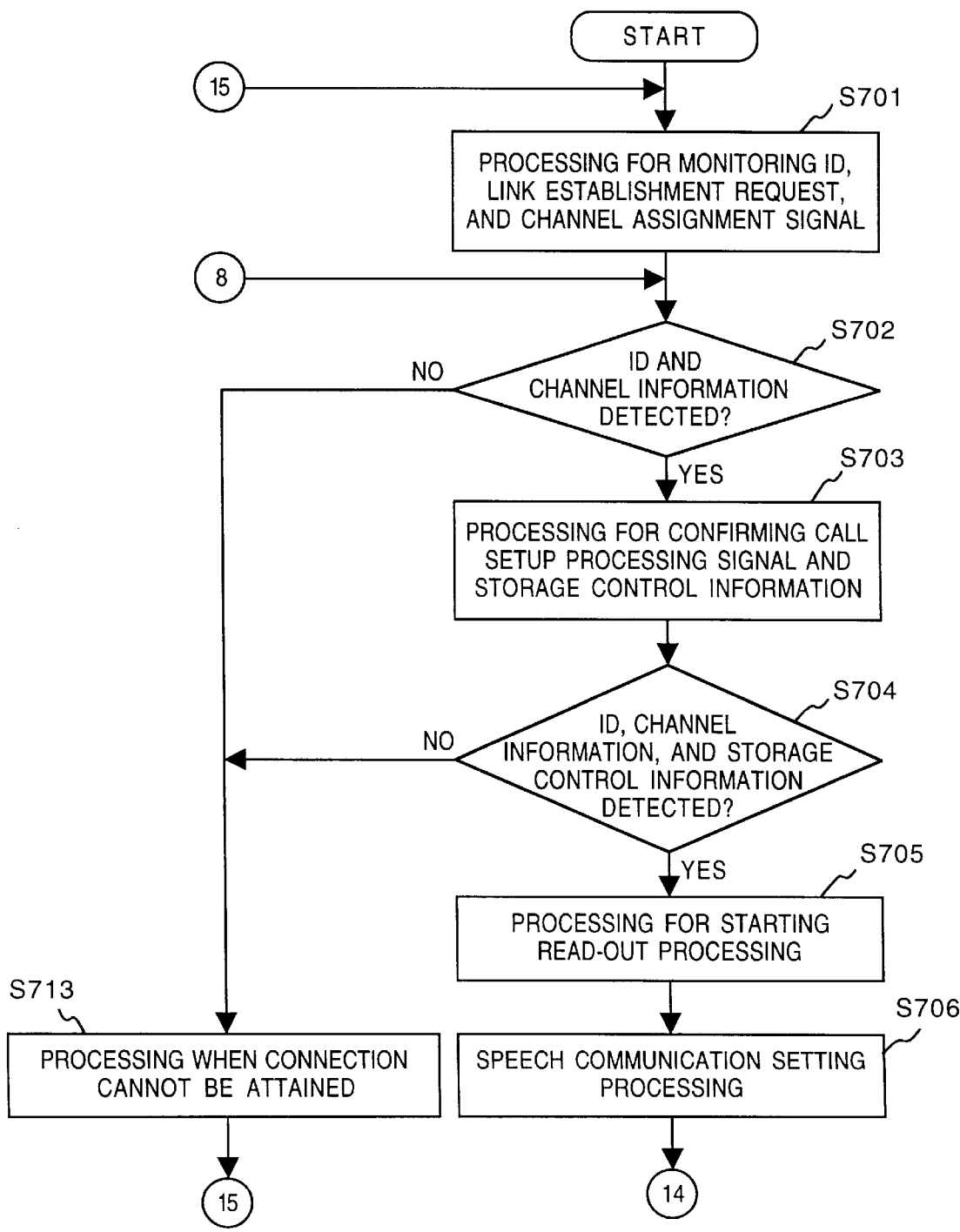
FIG. 17 is a flow chart showing the operation in the first embodiment until a voice message stored in the voice storage unit is output.
Figure 18:
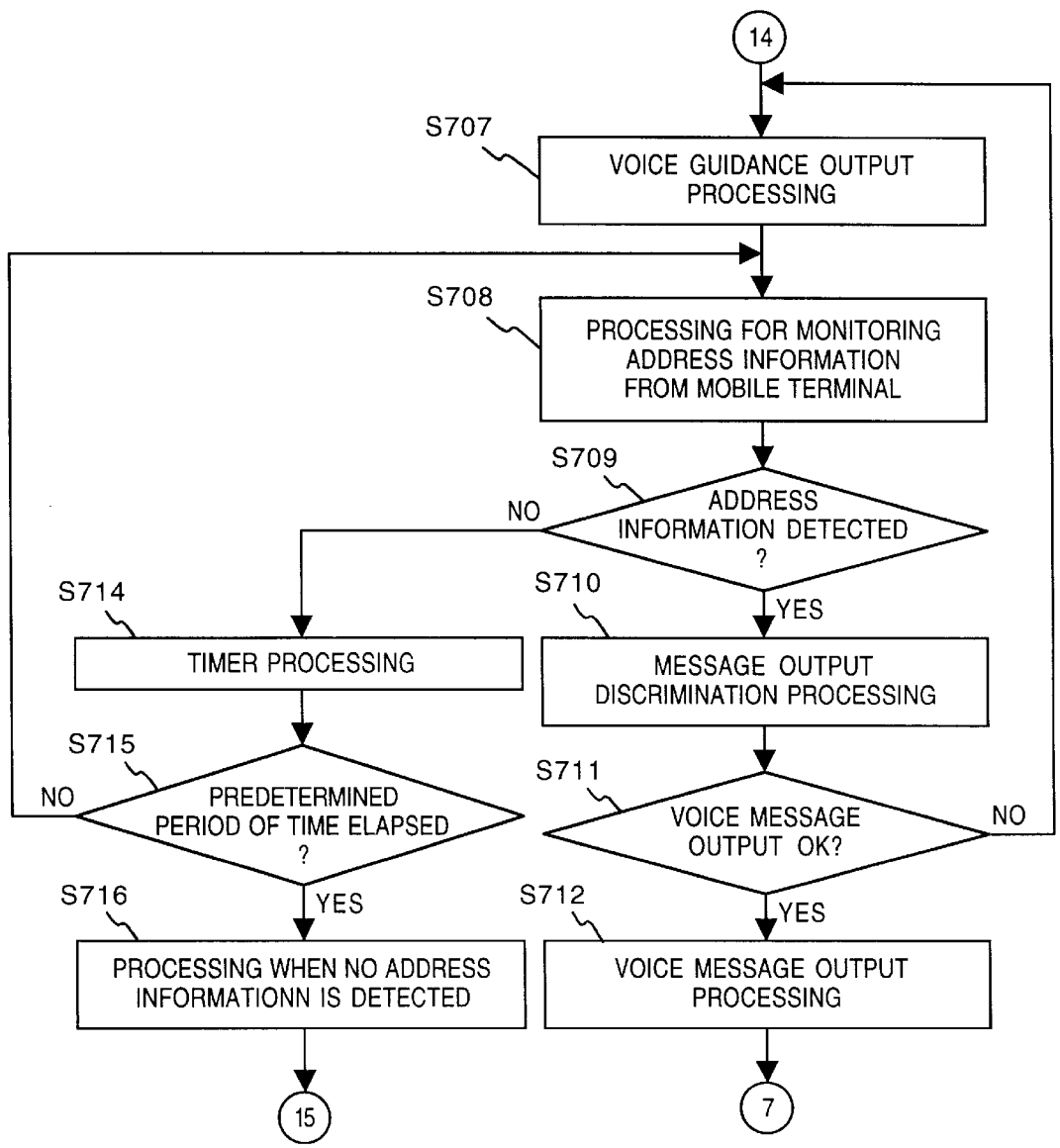
FIG. 18 is a flow chart showing the operation in the first embodiment until a voice message stored in the voice storage unit is output.

FIGS. 17 and 18 are flow charts showing the operation until a voice message stored in the VM unit is output in this embodiment.

During monitoring processing of an ID signal, a link establishment request, and a channel assignment signal from a fixed or mobile terminal in step S701, if an ID signal and a link establishment request signal from a mobile terminal are detected in step S702, confirmation processing of a call setup request signal and storage control information from the mobile terminal is performed in step S703. If an ID signal, channel information, and storage control information are detected in step S704 during this processing, processing for starting the read-out operation of voice data stored in the memory is performed in step S705.

In this processing, when the VM unit comprises an internal memory such as a hard disk or the like, processing for setting the memory in a standby state is performed. On the other hand, when the VM unit comprises an IC as its internal memory, processing for changing the operation mode of the memory from a sleep mode to a normal mode is performed.

If an ID signal, channel information, and storage processing control information from a mobile terminal cannot be detected in steps S702 and S704, processing when a connection cannot be attained is performed in step S713, and the monitoring processing of an ID signal, a link establishment request, and a channel assignment signal from a mobile terminal is performed again in step S701.

Upon completion of the processing for starting the read-out operation of voice data in the VM unit in step S705, processing for setting a speech communication path with the mobile terminal is performed in step S706. Upon completion of this processing, a predetermined voice guidance is output from the voice message output section 313 in step S707.

Upon completion of the voice guidance output processing in step S707, monitoring processing of address information from the mobile terminal is performed in step S708. After this processing, detection processing of address information from the mobile terminal is performed in step S709.

If address information from the mobile terminal cannot be detected in step S709, timer processing for measuring a predetermined period of time is performed in step S714. Upon completion of this processing, it is checked in step S715 if the predetermined period of time has elapsed. If it is determined in step S715 that the predetermined period of time has not elapsed, the processing for monitoring address information from the mobile terminal is continued in step S708. On the other hand, if it is determined in step S715 that the predetermined period of time has elapsed, processing when address information cannot be detected is performed in step S716 to end the address information processing, and the monitoring processing of an ID signal, a link establishment request, and a channel assignment signal from the mobile terminal is performed in step S701.

When address information from the mobile terminal is detected in step S709, processing for checking if a message indicated by the address information can be output is performed in step S710. If it is determined in step S711 that a voice message indicated by the address information can be output, a corresponding voice message is output to the mobile terminal in step S712.

On the other hand, if it is determined in step S711 that the voice message cannot be output, processing for outputting a voice guidance message indicating that the voice message cannot be output to the mobile terminal is performed in step S707, and it is prompted to input new address information. In this case, this processing may end after the message indicating that the voice message cannot be output is supplied.

Figure 19:
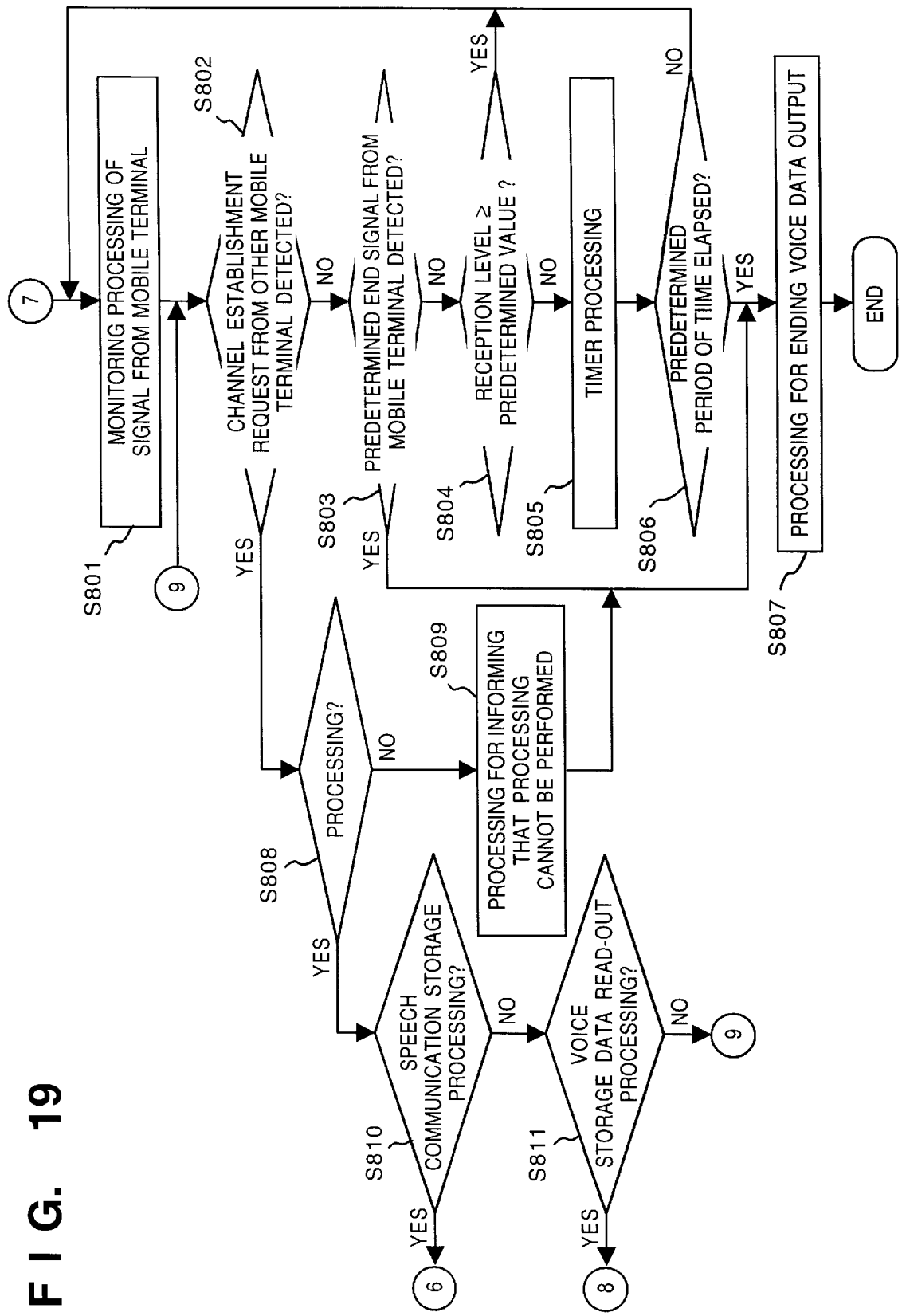
FIG. 19 is a flow chart showing the operation for stopping the output operation of a voice message stored in the voice storage unit in the first embodiment.

FIG. 19 is a flow chart showing the operation for stopping the output operation of a voice message stored in the VM unit in this embodiment.

The VM unit outputs a voice message to a mobile terminal, and at the same time, monitors a second control signal and a channel establishment request signal from the mobile terminal in another slot, which are input independently of voice data on a communication frame from the mobile terminal, in step S801.

During this monitoring processing, if a channel establishment request from another mobile terminal is not detected in step S802, and if a predetermined signal indicating the end of hearing of a voice message from the mobile terminal is detected on the second control signal in step S803, the voice message output processing ends in step S807.

As the signal indicating the end of hearing of a voice message, setting key information, a re-depression signal of the speech communication button, a predetermined signal indicating the end of operation, or the like from the mobile terminal may be used.

If a channel establishment request from another mobile terminal is detected in step S802, it is checked in step S808 if a response can be made to the channel establishment request from the other mobile terminal. As a result of this checking operation, if it is determined that a response cannot be made, processing for informing that processing cannot be performed is performed in step S809, thereby informing a message to the mobile terminal which issued the channel establishment request.

On the other hand, if it is determined in step S808 that processing for the channel establishment request from the other mobile terminal can be performed, it is checked in step S810 if the channel establishment request indicates speech communication storage processing. If it is determined in step S810 that the channel establishment request indicates speech communication storage processing, the processing for storing the contents of a speech communication is performed.

On the other hand, if it is determined in step S810 that the channel establishment request does not indicate speech communication storage processing, it is checked in step S811 if the channel establishment request indicates voice storage data read-out processing from the mobile terminal. If it is determined in step S811 that the channel establishment request indicates voice storage data read-out processing, voice storage data read-out processing using another mobile terminal is performed.

On the other hand, if it is determined in step S811 that the channel establishment request does not indicate voice storage data read-out processing, it is monitored again in step S802 if a channel establishment request from another mobile terminal is detected.

If it is determined in step S803 that a signal indicating the operation for ending the voice message output processing is not detected from the mobile terminal, it is checked in step S804 if the signal level from the mobile terminal is equal to or higher than a predetermined level. As a result of this checking step, if it is determined in step S804 that the reception level is equal to or higher than the predetermined level, signal monitoring processing is performed again in step S801.

On the other hand, if it is determined in step S804 that the signal level from the mobile terminal is lower than the predetermined value, timer processing for measuring a predetermined period of time is performed in step S805, and it is monitored in step S806 if the predetermined period of time has elapsed.

As a result of measurement, if it is determined that the predetermined period of time has not elapsed, the flow returns to step S801 to perform signal level monitoring processing again. On the other hand, if it is determined in step S806 that the predetermined period of time has elapsed, the processing for ending the voice message output processing is performed in step S807, thereby ending the output processing.

Figure 20:
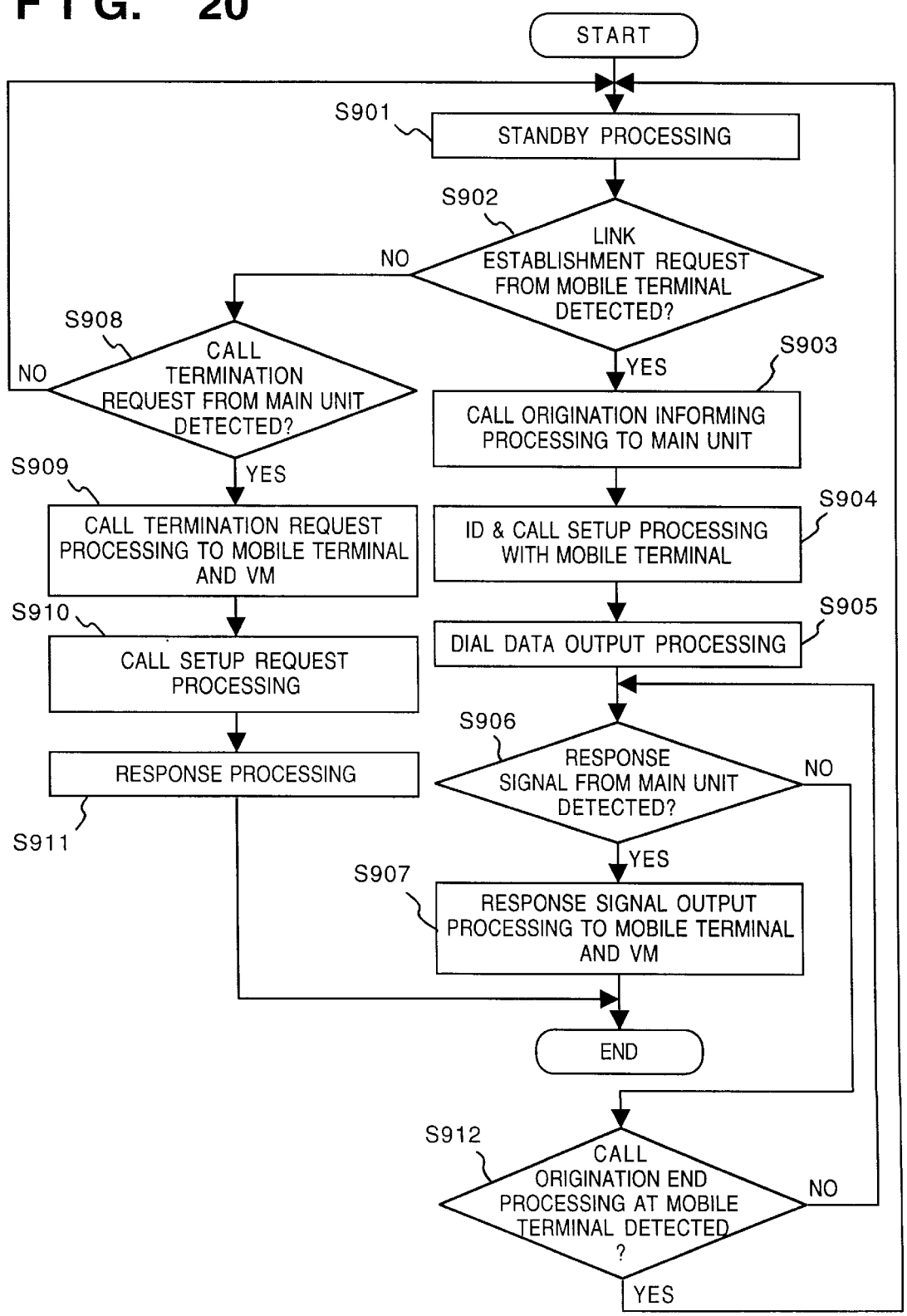
FIG. 20 is a flow chart showing the operation of the fixed terminal in the first embodiment.

FIG. 20 is a flow chart showing the operation of the fixed terminal in this embodiment.

During standby processing for monitoring signals from the mobile terminal and the main unit in step S901, it is checked in step S902 if a link establishment request signal from the mobile terminal is detected. If no link establishment request signal is detected, it is checked in step S908 if a call termination request from the main unit is detected.

If it is determined in step S908 that a call termination request from the main unit is detected, call termination request processing to the mobile terminal and the VM unit is performed by superposing a call termination request signal on a control frame in an arbitrary slot in step S909, and call setup processing with the mobile terminal is performed in step S910. Thereafter, when a response signal from the mobile terminal is detected, the control advances to processing for starting a speech communication.

On the other hand, if it is determined in step S902 that a link establishment request signal from the mobile terminal is detected, processing for informing the main unit that a call is originated by the mobile terminal under the control of the main unit is performed in step S903. Upon completion of this processing, ID & call setup processing with the mobile terminal is performed in step S904, and a DT signal is output to the mobile terminal.

When dial data from the mobile terminal is detected, the detected data is output to the main unit in step S905. After the dial data is output, if it is determined in step S906 that a response signal from the main unit is detected, processing for sending a response signal to the mobile terminal and the VM unit is performed in step S907.

If it is determined in step S906 that a response signal from the main unit is not detected, it is detected in step S912 if the mobile terminal performs call origination end processing. If the call origination end processing at the mobile terminal is not detected, it is checked in step S906 if a response signal from the main unit is detected. On the other hand, if it is detected in step S912 that the mobile terminal performs the call origination end processing, the flow returns to the standby processing in step S901.

Figure 21:
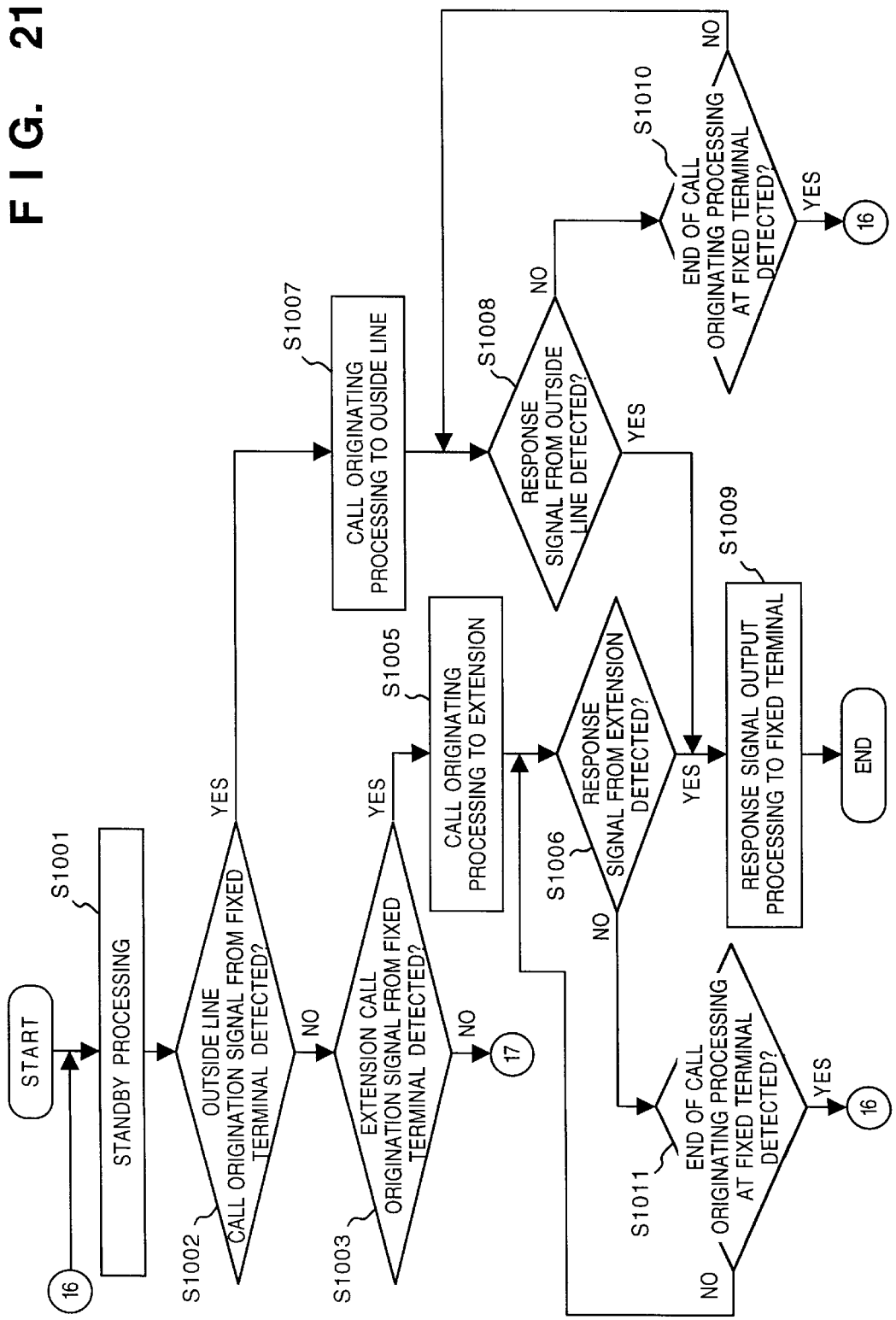
FIG. 21 is a flow chart showing the operation of the main unit in the first embodiment.
Figure 22:
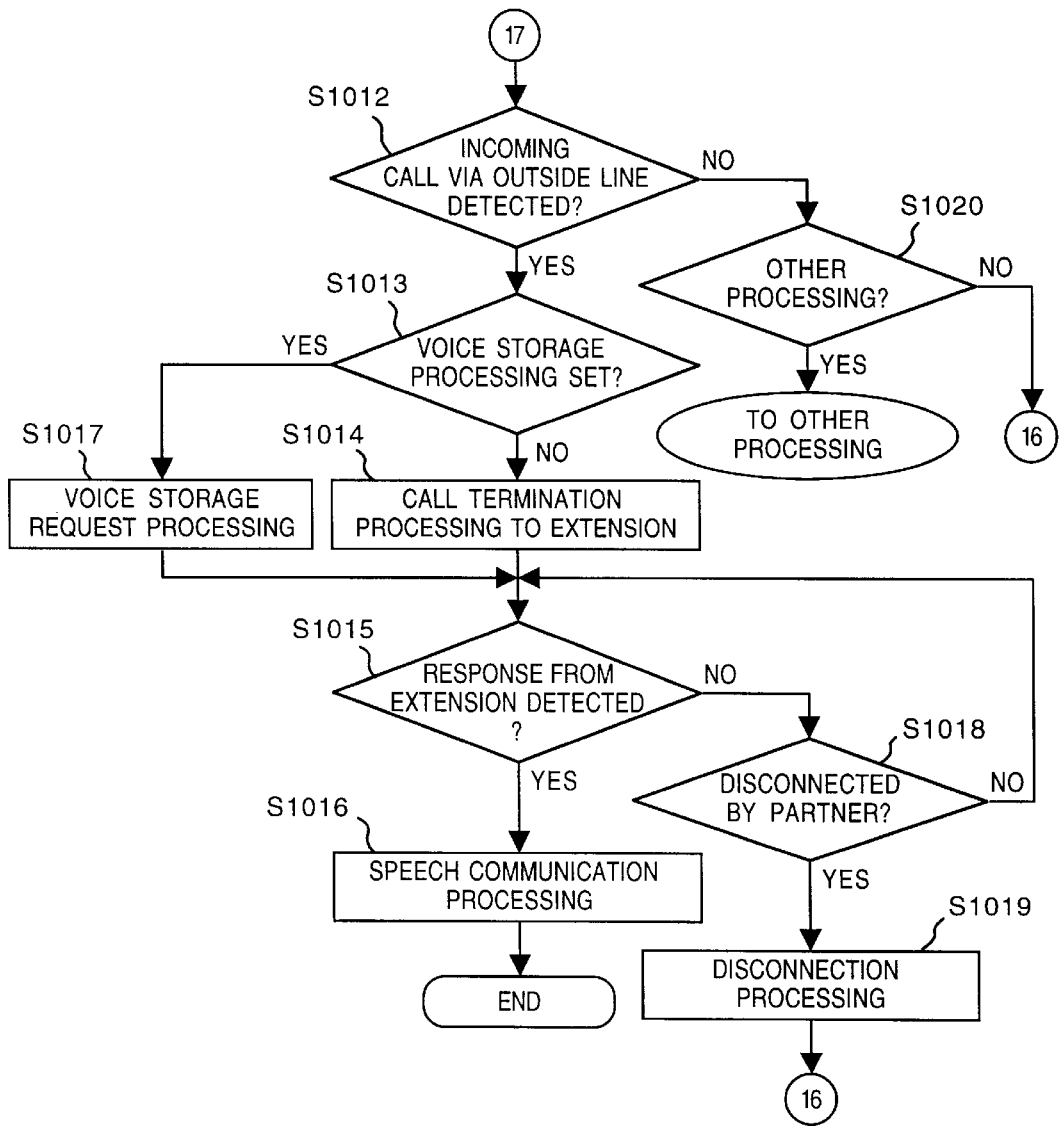
FIG. 22 is a flow chart showing the operation upon termination of an incoming call from an outside line in the main unit in the first embodiment.

FIGS. 21 and 22 are flow charts showing the operation of the main unit in this embodiment.

If it is determined in step S1002 that a signal indicating that a mobile terminal issued an outside line call origination request is received from a fixed terminal, while the main unit is executing standby processing in step S1001, a predetermined time slot is designated on the basis of dial information from the fixed terminal, and processing for originating a call to an outside line is performed, in step S1007.

As a result of the call originating processing, if it is determined in step S1008 that a response reverse from the outside line subjected to the call originating processing is detected, a predetermined response signal is output to the fixed terminal which performed the call originating processing in step S1009. On the other hand, if it is determined in step S1008 that any response reverse from the outside line is not detected, it is checked in step S1010 if a signal indicating the end of the call originating processing from the fixed terminal is detected.

If it is determined in step S1010 that a signal indicating the end of the call originating processing from the fixed terminal is not detected, it is checked again in step S1008 if a response reverse from the outside line is detected. On the other hand, if it is determined in step S1010 that the signal indicating the end of the call originating processing from the fixed terminal is detected, the control returns to the standby processing in step S1001.

If it is determined in step S1002 that an outside line call origination signal from the fixed terminal is not detected, it is checked in step S1003 if an extension call origination signal from the fixed terminal is detected. If an extension call origination signal from the fixed terminal is detected, a predetermined time slot is designated on the basis of dial information from the fixed terminal, and processing for originating a call to the extension is performed, in step S1005.

As a result of the call originating processing, if it is determined in step S1006 that a response signal from the extension subjected to the call originating processing is detected, a predetermined response signal is output to the fixed terminal which performed the call originating processing in step S1009. On the other hand, if it is determined in step S1006 that a response signal from the extension is not detected, it is checked in step S1011 if a signal indicating the end of the call originating processing from the fixed terminal is detected.

If it is determined in step S1011 that a signal indicating the end of the call originating processing from the fixed terminal is not detected, it is checked again in step S1006 if a response signal from the extension is detected. On the other hand, if the signal indicating the end of the call originating processing from the fixed terminal is detected in step S1011, the control returns to the standby processing in step S1001.

On the other hand, if it is determined in step S1003 that an extension call origination signal from the fixed terminal is not detected, it is checked in step S1012 if an incoming call via an outside line is detected. If it is determined in step S1012 that an incoming call via an outside line is not detected, it is checked in step S1020 if another processing request is detected. If another processing request is detected, the flow branches to the corresponding processing. On the other hand, if it is determined in step S1020 that any other processing request is not detected, the flow returns to step S1001 to execute standby processing.

If it is determined in step S1012 that an incoming call via an outside line is detected, it is checked in step S1013 if the voice storage processing mode is set in the outside line that received the incoming call. As a result of the checking step, if it is detected that the voice storage processing mode is not set in the outside line that received the incoming call, normal call termination processing to the extension terminal is performed in step S1014. On the other hand, if it is detected in step S1013 that the voice storage processing mode is set in the outside line that received the incoming call, request processing for performing the voice storage processing is performed in addition to the call termination processing to an extension, and the reception of the incoming call is informed to the extension terminal, in step S1017.

After the call termination processing, detection processing of a response signal from the extension is performed. If it is determined in step S1015 that a response signal cannot be detected, it is monitored in step S1018 if a disconnection signal from the partner is detected. If a disconnection signal from the partner cannot be detected, it is checked in step S1015 if a response signal from the extension is detected. On the other hand, if it is determined in step S1018 that a disconnection signal from the partner is detected, disconnection processing is performed in step S1019, and the control returns to standby processing.

If it is determined in step S1015 that a response signal from the extension is detected, a communication path between the outside line and the extension is connected, and speech communication processing is performed, in step S1016.

In the above embodiment, a response reverse from an analog line is used as a response signal upon call origination via an outside line. Upon connection to, e.g., a digital line, a predetermined digital response signal may be detected, and the same operations as described above can be performed.

The second embodiment of the present invention will be described below.

Figure 23:
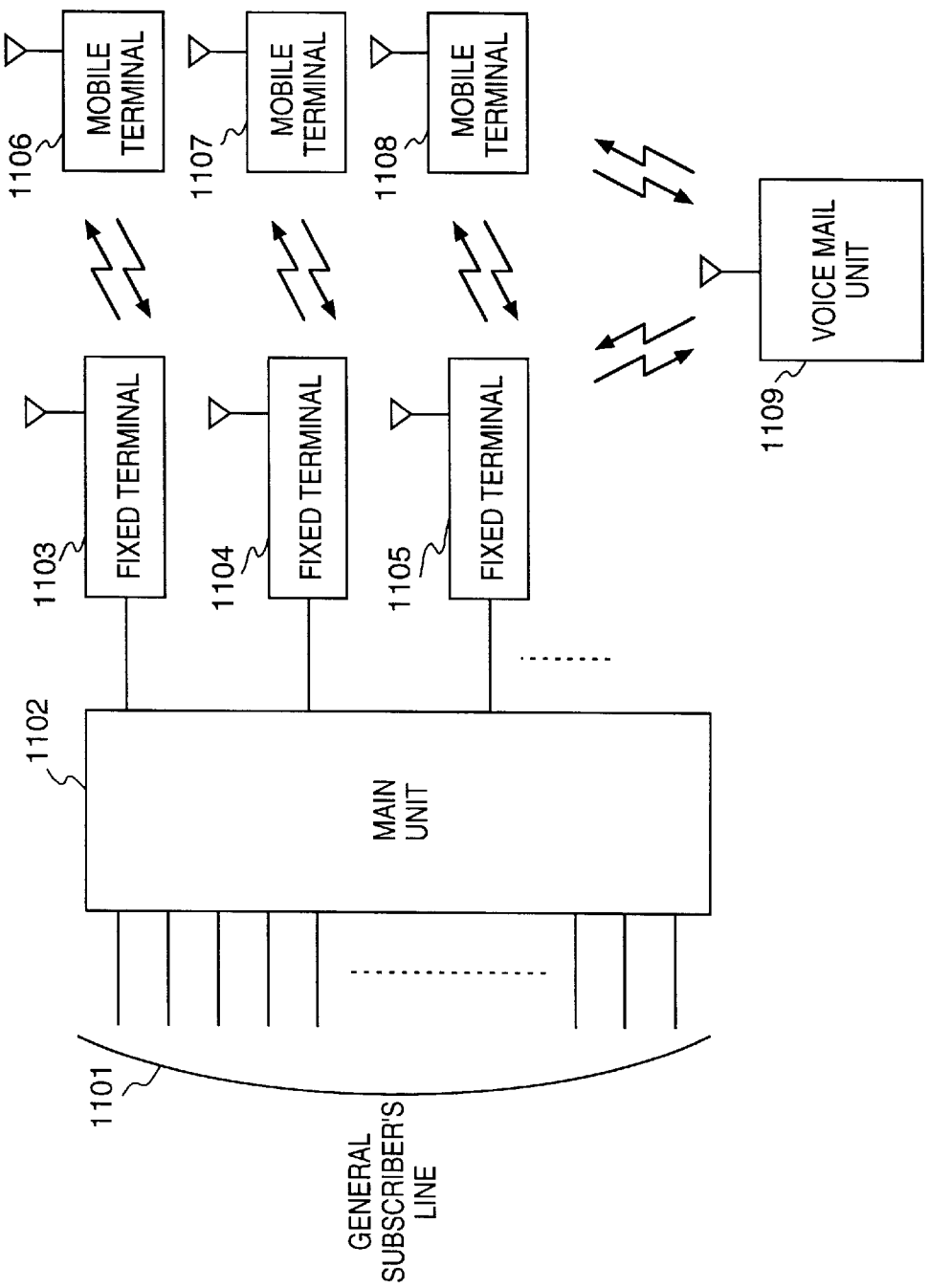
FIG. 23 is a block diagram showing the arrangement of the second embodiment in which the present invention is applied to an analog small electric power cordless key telephone system.

FIG. 23 is a block diagram showing the arrangement of the second embodiment in which the present invention is applied to an analog small electric power cordless key telephone system.

A main unit 1102 of this key telephone system accommodates general subscriber's lines 1101 in outside lines, and also accommodates, in extensions, analog small electric power fixed terminals (to be simply referred to as fixed terminals hereinafter) 1103 to 1105 for performing communications with mobile terminals 1106 to 1108 using analog signals.

The mobile terminals 1106 to 1108 are analog small electric power cordless mobile terminals (to be simply referred to as mobile terminals hereinafter) for performing radio communications with the fixed terminals 1103 to 1105 and an analog cordless voice storage (voice mail: VM) unit 1109 using analog signals.

The VM unit 1109 is an analog small electric power cordless voice storage unit (to be simply referred to as a cordless VM unit or a VM unit hereinafter) for recording the contents of speech communications on the basis of signals from the analog fixed and mobile terminals.

In the above-mentioned arrangement, when an incoming call is received by outside line 1 of the main unit 1102 via the general subscriber's line 1101, a ringing tone is generated by the extension terminal corresponding to the incoming call. Assuming that extension 1 corresponds to outside line 1, the fixed terminal 1103 of extension 1 informs the mobile terminal 1106 of the reception of the incoming call from outside line 1. Upon detection of the incoming call from outside line 1, the mobile terminal 1106 performs processing for generating a ringing tone, i.e., turns on an LED indicating a predetermined outside line and generates a ringing tone.

At this time, the VM unit 1109 monitors signals from the fixed terminals 1103 to 1106 and the mobile terminal 1106 via an antenna corresponding to outside line 1. Upon detection of a control signal (ID signal and idle channel information) upon call termination from the mobile terminal 1106, the VM unit 1109 prepares for recording the contents of a speech communication (e.g., changes the state of an IC or a hard disk from a standby state to an idle state).

Subsequently, the VM unit detects a control signal (an ID signal and speech communication channel shift information) from the mobile terminal 1106. Thereafter, upon detection of a response signal (an ID signal, voice channel information, and extension/outside line information) from the fixed terminal 1103, the cordless VM unit 1109 performs processing for storing a voice signal transmitted after the response signal at a predetermined address on the basis of the extension/outside line information.

Upon call origination from the mobile terminal 1106, if the cordless VM unit 1109 detects an off-hook signal (an ID signal and a call origination request) of the mobile terminal 1106 via an antenna, the VM unit 1109 prepares for recording the contents of a speech communication (e.g., changes the state of an IC or a hard disk from a standby state to an idle state).

Subsequently, the VM unit detects a response signal (an ID signal and idle channel information) from the fixed terminal 1103. Thereafter, the VM unit detects a signal (an ID signal and idle channel shift information) from the mobile terminal 1106, and a signal (an ID signal, idle channel shift information, and extension/outside line information) from the fixed terminal 1103. Then, the VM unit determines an area for storing voice data on the basis of the extension/outside line information from the fixed terminal 1103. Thereafter, when the mobile terminal 1106 outputs a call origination signal (an ID signal and dial information), the dial information is supplied to the main unit 1102 via the fixed terminal 1103.

Based on the dial information, the main unit 1102 generates a call to the extension or outside line. If a response signal is returned from the extension or outside line with respect to the call, the main unit 1102 detects this response information, and informs the fixed terminal 1103 of the reception of the response signal. Upon detection of the response signal, the fixed terminal 1103 outputs a predetermined signal indicating the reception of the response signal to the mobile terminal 1106 and the VM unit.

Figure 24:
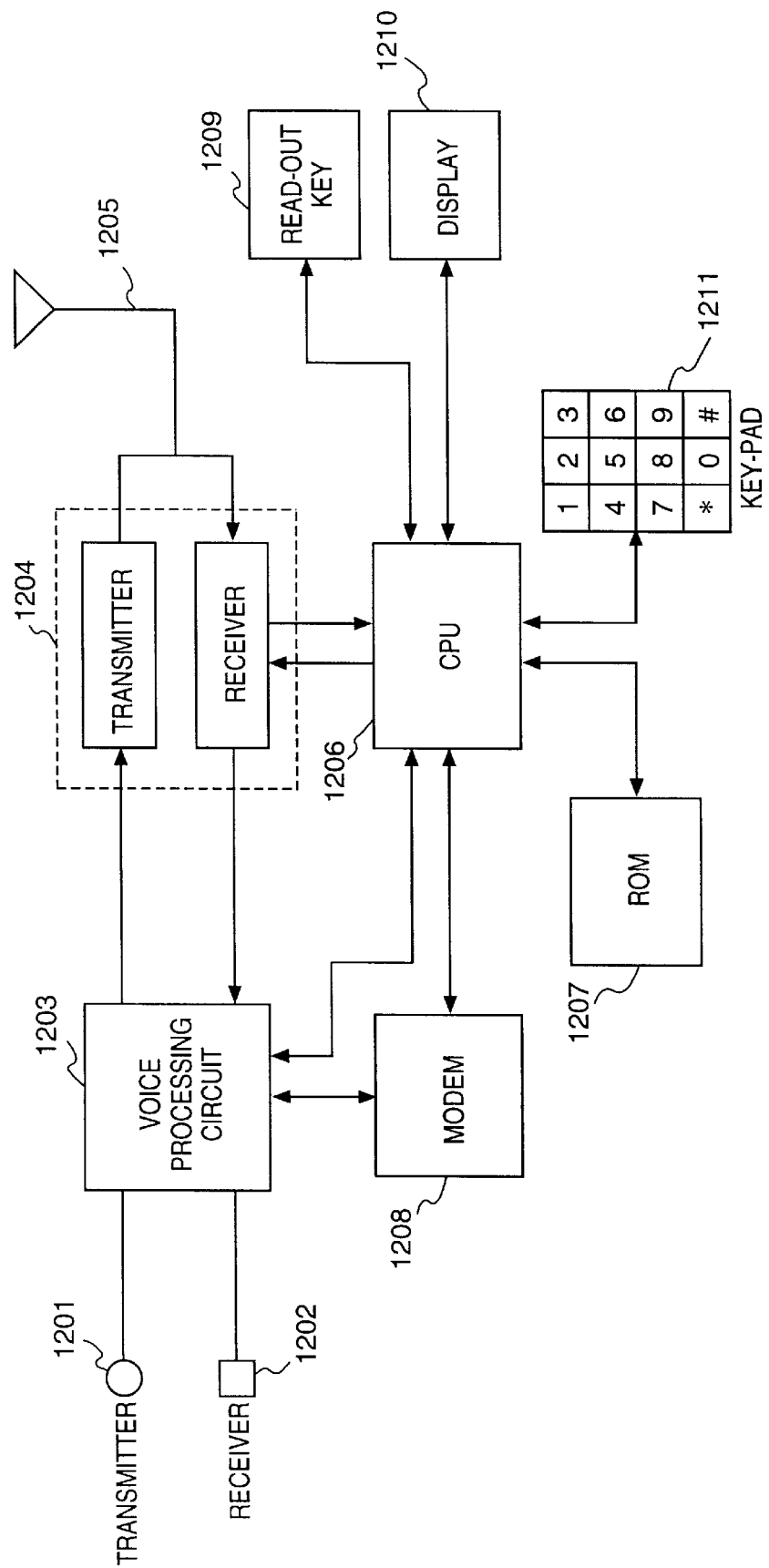
FIG. 24 is a block diagram showing the arrangement of a mobile terminal in the second embodiment.

FIG. 24 is a block diagram showing the arrangement of the mobile terminal in this embodiment.

The mobile terminal comprises a transmitter 1201 for converting a voice into an electrical signal, and transmitting the electrical signal to a voice processing circuit 1203, a receiver 1202 for converting an electrical signal received from the voice processing circuit 1203 into a voice, the voice processing circuit 1203 for exchanging a voice signal between the transmitter 1201 and the receiver 1202 and a transmitter/receiver 1204, an antenna 1205 for transmitting/ receiving signals to/from the fixed terminal, a CPU 1206 for controlling the mobile terminal, and a ROM 1207 for storing a control program.

The mobile terminal also comprises a modem 1208 for converting an analog signal from the voice processing circuit 1203 into a digital signal and supplying the digital signal to the CPU 1206, and for converting a digital signal from the CPU 1206 into an analog signal and transmitting the analog signal to the voice processing circuit 1203, a read-out key 1209 for sending a read-out signal to the VM unit, a display 1210 for displaying information, and a key-pad 1211 for converting predetermined key depression information into an electrical signal.

In the above-mentioned arrangement, a voice signal supplied from the fixed terminal in a busy state is received by the antenna 1205, is demodulated by a receiver of the transmitter/receiver 1204, and is supplied to the receiver 102 via the voice processing circuit 1203.

On the other hand, a control signal supplied from the fixed terminal in a busy state is received by the antenna 1205, is demodulated by the receiver of the transmitter/receiver 1204, and is input to the voice processing circuit 1203 in the form of an analog signal. Then, the analog signal is supplied from the voice processing circuit 1203 to the modem 1208, and is demodulated into a digital signal, which is supplied to the CPU 1206.

Upon transmission from the mobile terminal, the CPU 1206 controls the transmitter/receiver 1204, the voice processing circuit 1203, the modem 1208, and the display 1210, reads out control data including an ID (identification) code and the like from the ROM (memory) 1207, and inputs key information such as dial information via the key-pad 1211.

A control signal output from the CPU 1206 is modulated into an analog signal by the modem 1208, and the analog signal is FM (frequency)-modulated by the transmitter/ receiver 1204 via the voice processing circuit 1203. The modulated signal is transmitted from the antenna 1205 to the fixed terminal and the VM unit.

A signal demodulated by the receiver of the transmitter/ receiver 1204 is supplied to the voice processing circuit 1203. The voice processing circuit 1203 extracts a voice signal from the input signal, and supplies the voice signal to the receiver 1202. The CPU 1206 performs processing for continuing a communication with the fixed terminal.

In order to read out voice data stored in the VM unit, the read-out key 1209 of the mobile terminal is depressed. Upon detection of the depression of the read-out key 1209, the CPU 1206 sends a request signal (an ID signal, channel information, and extension information) required for accessing the VM unit to the modem 1208. The modem 1208 modulates the input signal into an analog signal, and sends the analog signal to the voice processing circuit 1203.

The read-out signal is supplied from the voice processing circuit 1203 to the transmitter/receiver 1204, and is FM-modulated by the transmitter/receiver 1204. The modulated signal is transmitted from the antenna 1205 to the VM unit.

After this signal is output, when the CPU 1206 receives a signal indicating a response from the VM unit via the antenna 1205, the receiver of the transmitter/receiver 1204, the voice processing circuit 1203, and the modem 1208, the CPU 1206 outputs a command to the voice processing circuit 1203 to perform processing for hearing a voice signal from the VM unit.

Upon completion of hearing voice data at the mobile terminal side, the read-out processing on the VM unit side is ended by performing a predetermined dial operation indicating the end of the operation (e.g., a specific number after depression of "#" and "*") using the key-pad 1221. Upon detection of the depression of the read-out key 1209 on the mobile terminal side, the CPU 1206 ends the read-out processing on the mobile terminal side. Also, the voice message hearing processing and the read-out processing of the VM unit can be ended by re-depressing the read-out key 1209.

Note that the voice processing circuit 1203 used in this embodiment is constituted by a limiter, compandor, and the like, and these are known to those skilled in the art.

Figure 25:
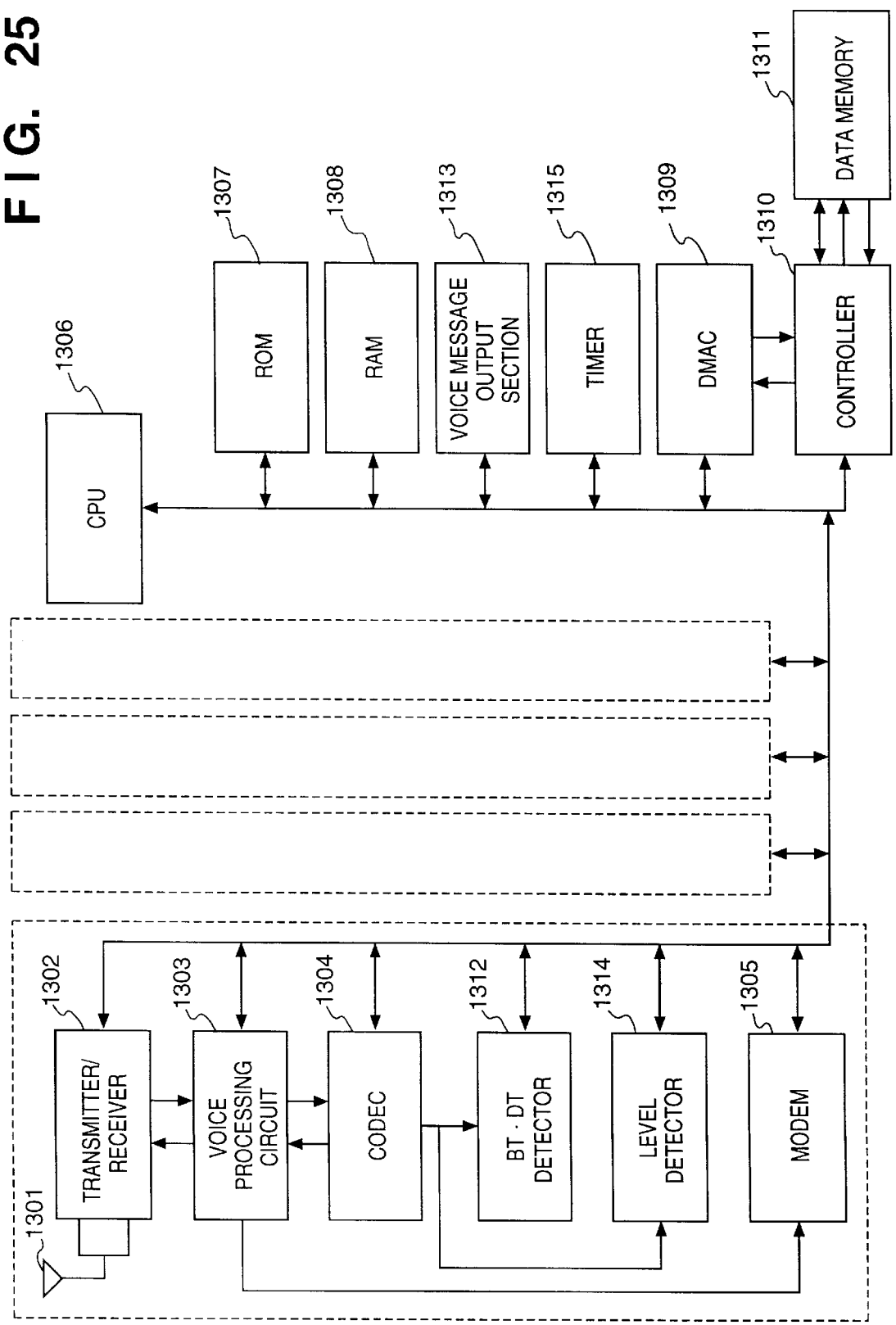
FIG. 25 is a block diagram showing the arrangement of a voice storage unit in the second embodiment.

FIG. 25 is a block diagram showing the arrangement of the VM unit of this embodiment.

The VM unit comprises an antenna 1301 for receiving signals from the mobile and fixed terminals, a transmitter/receiver 1302 for transmitting/receiving a voice signal and a control signal, a voice processing circuit 1303 for compressing/expanding transmission/reception signals such as a voice signal, a control signal, and the like, and a codec 1304 for converting an analog voice signal into a digital signal.

The VM unit also comprises a modem 1305 for converting an analog signal from the voice processing circuit 1303 into a digital signal and supplying the digital signal to a CPU 1306, and for converting a digital signal from the CPU 1306 into an analog signal and transmitting the analog signal to the voice processing circuit 1303, the CPU 1306 for controlling the operation of the overall VM unit, a ROM 1307 for storing a control program of the VM unit, a RAM 1308 used as a buffer of voice data, and a DMA controller 1309 (incorporating at least two DMA controllers) for performing DMA transfers of voice data between the codec 1304 and the RAM 1308 and between the RAM 1308 and the DMA controller 1309.

Furthermore, the VM unit comprises a controller 1310 for controlling data read/write accesses to a data memory 1311, the data memory 1311 for storing voice data, a BT·DT detector 1312 for detecting a BT·DT from an office line, a voice message output section 1313 for outputting a predetermined voice guidance message to the mobile terminal, a level detector 1314 for detecting the output level from the codec, and a timer 1315 for measuring a predetermined period of time on the basis of the output from the level detector.

In FIG. 25, the antenna 1301 to the modem 1305 constitute a block for one channel, and when the VM unit has four channels, four blocks are required, as indicated by broken lines in FIG. 25. In this embodiment, recording/reproduction processing will be explained using one block.

When a signal (an ID signal, a call origination request, and speech communication channel information) indicating an outgoing or incoming call is received from a mobile or fixed terminal via the antenna 1301, and the CPU 1306 confirms this outgoing/incoming call signal via the transmitter/receiver 1302, the voice processing circuit 1303, and the modem 1305, the CPU 1306 activates the data memory 1311 via the controller 1310. Note that this processing is executed when the data memory 1311 comprises a memory device such as a hard disk, a magneto-optical disk, or the like that requires control. Therefore, this processing is not required when the data memory 1311 comprises a semiconductor memory.

Subsequently, upon detection of a signal (an ID signal, idle channel information, and extension/outside line information) indicating a response from the mobile or fixed terminal, the CPU 1306 outputs a command to the voice processing circuit 1303 to output the received analog signal to the modem 1305 and the codec 1304. Upon reception of this command, the voice processing circuit 1303 outputs the received voice signal to the modem 1305 and the codec 1304. With this processing, control data can be received during reception of voice data.

As analog signals to be received in this case, two analog signals, i.e., an analog signal to be transmitted from the fixed terminal to the mobile terminal and an analog signal to be transmitted from the mobile terminal to the fixed terminal are received in an outside line speech communication mode, and analog signals between the fixed and mobile terminals on the call origination and termination sides are received in an extension speech communication mode. In the extension speech communication mode as well, two analog signals, i.e., an analog signal to be transmitted from the fixed terminal to the mobile terminal, and an analog signal to be transmitted from the mobile terminal to the fixed terminal are received.

Upon reception of the voice signal, the codec 1304 samples the voice signal at every 8 kHz. When output data is determined, the codec 1304 outputs a DMA request to the DMA controller 1309. Upon reception of this request, the DMA controller 1309 issues a bus release request to the CPU 1306. Upon reception of this request, the CPU 1306 returns a signal indicating that the bus is released to the DMA controller 1309 by checking the state of the bus, and also supplies control information to the DMA controller 1309.

Upon detection of the information indicating acquisition of the right of use of the bus, the DMA controller 1309 performs a DMA transfer between the codec 1304 and the RAM 1308 to store voice data in a first storage area in the RAM having a predetermined size. When the CPU 1306 detects that the first storage area becomes full of data, it performs processing for storing a voice signal in a second storage area.

Parallel to the storage operation in the second storage area, storage processing from the first storage area to the data memory 1311 is performed. The storage processing in the data memory 1311 ends before the second storage area becomes full of data.

When the second storage area becomes full of data, the CPU 1306 starts the storage operation in the first storage area again, and executes voice storage processing in the data memory by repeating the above-mentioned operation. In this storage processing, when a specific storage area is not designated by the mobile terminal, voice data is stored in an area on the data memory corresponding to the extension number of the mobile terminal itself. On the other hand, voice data may be stored in an area corresponding to an outside line number.

In order to suspend the voice storage processing, processing for completing the storage processing is executed when the CPU 1306 detects an on-hook signal from the mobile or fixed terminal via the modem 1305 and when the CPU 1306 detects a DT signal from the BT·DT detector 1312 via the codec 1304.

Upon completion of the storage processing, when a signal indicating a change in storage area is received from the mobile terminal by the antenna 1301, and the CPU 1306 confirms this signal via the transmitter/receiver 1302, the voice processing circuit 1303, and the modem 1305, the CPU 1306 outputs a command to the controller 1310 to transfer data to the area indicated by the change request signal.

Upon reception of this command, the controller 1310 transfers data from the storage area corresponding to the mobile terminal in the data memory 1311 to the region indicated by the change request signal.

Upon completion of this data transfer, the controller 1310 informs the CPU 1306 of the end of transfer. Upon reception of this information, the CPU 1306 informs the mobile terminal of the end of transfer.

Subsequently, voice reproduction processing will be explained below.

When a signal (an ID signal, idle channel information, and extension/outside line information) indicating reproduction is received from the mobile terminal by the antenna 1301, and the CPU 1306 confirms this signal via the transmitter/receiver 1302, the voice processing circuit 1303, and the modem 1305, the CPU 1306 checks if this request is acceptable.

If the request is acceptable, the CPU 1306 outputs a response signal to the modem 1305, and the response signal (an ID signal, idle channel information, and extension/outside line information) is transmitted to the mobile terminal via the voice processing circuit 1303 and the antenna 1301. Upon detection of establishment of a speech communication, the CPU 1306 outputs a command to the voice message output section 1313 to output a predetermined guidance.

Upon reception of this command, the voice message output section 1313 outputs the predetermined guidance stored in its internal memory onto a bus. The CPU 1306 inputs this guidance data to the codec 1304, and the codec 1304 D/A-converts the guidance data into an analog signal. The codec 1304 outputs the analog signal to the voice processing circuit 1303. Upon reception of this voice signal, the voice processing circuit 1303 outputs the voice guidance signal to the mobile terminal via the transmitter/receiver 1302 and the antenna 1301. In this embodiment, a voice guidance is output. Instead, a tone signal of a predetermined signal that can be confirmed by the mobile terminal side may be used.

Upon detection of the end of the voice guidance, the CPU 1306 performs processing for detecting address information of voice data from the mobile terminal.

Upon detection of dial information from the mobile terminal via the antenna 1301, the transmitter/receiver 1302, and the modem 1305 during this processing, the CPU 1306 performs processing for reading out a message corresponding to this dial information and stored in the data memory 1311, via the controller 1310.

In this processing, the CPU 1306 outputs a command to the controller 1310 to output voice data in a predetermined area on the basis of extension/outside line information. Upon reception of this command, the controller 1310 stores voice data in the predetermined area in the data memory 1311 in its internal buffer.

When this buffer becomes full of data, the controller 1310 outputs a DMA transfer request of the voice data in the buffer to the DMA controller 1309. When this request is accepted, the DMA controller 1309 performs a DMA transfer between the controller 1310 and the RAM 1308. When the CPU 1306 detects that the transfer of data to the first storage area of the RAM 1308 has been completed, the CPU 1306 outputs a command to the codec 1304 to issue a DMA transfer request.

Upon reception of this command, the codec 1304 issues a DMA transfer request to the DMA controller 1309. When this request is accepted, the DMA controller 1309 performs a DMA transfer between the RAM 1308 and the codec 1304. Parallel to the DMA transfer from the first storage area of the RAM 1308, voice data from the controller 1310 is stored in the second storage area of the RAM 1308 by the DMA transfer.

Upon completion of the DMA transfer of the voice data from the first storage area of the RAM 1308 to the codec 1304, the DMA transfer of data from the second storage area to the codec 1304 is subsequently started. By repeating this operation, voice data stored in the data memory 1311 can be read out.

Note that the voice processing circuit 1303 used in this embodiment is constituted by a limiter, compandor, and the like, and these are known to those who are skilled in the art.

On the other hand, the conversion method of the codec for A/D-converting voice data is not particularly limited as long as a PCM (Pulse Code Modulation) method, ADPCM (Adaptive Differential Pulse Code Modulation) method, or the like is used. The bus arrangement is not particularly limited, either. For example, the bus may have an 8-, 16-, 32-, 64-bit width, or the like.

Figure 26:
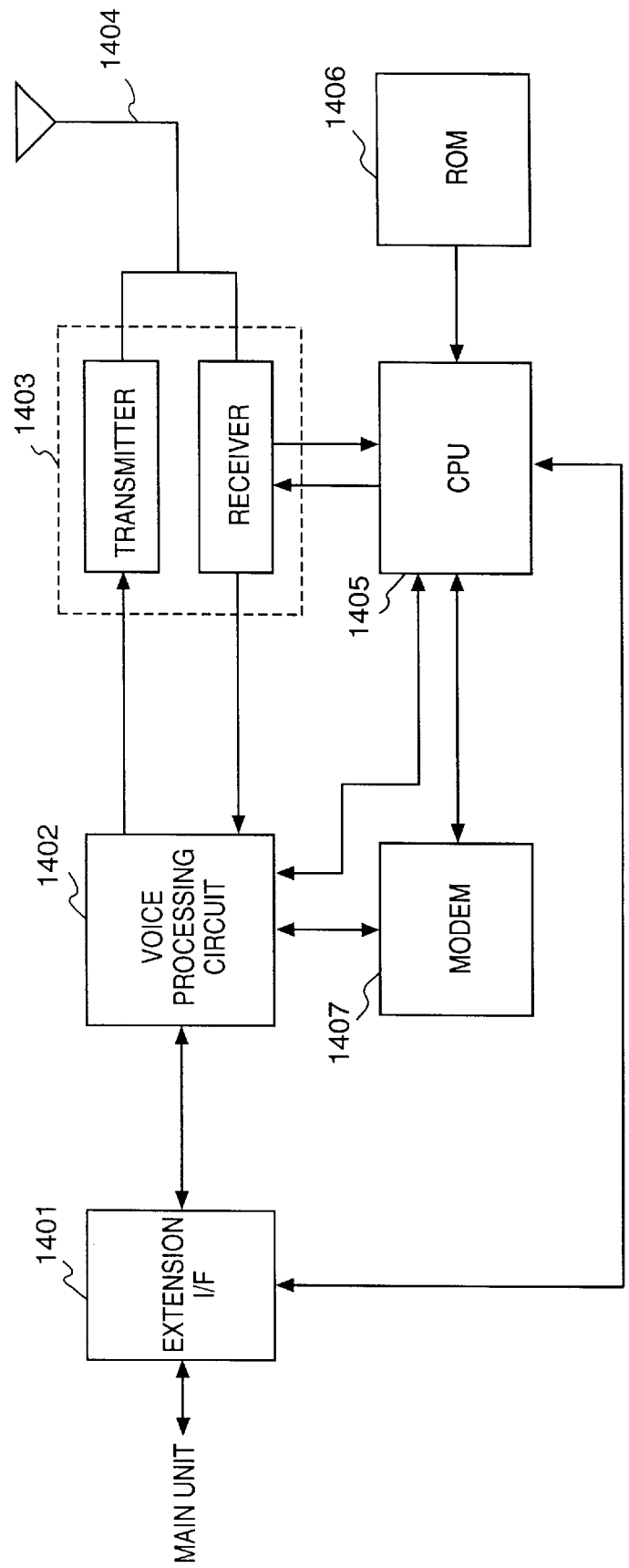
FIG. 26 is a block diagram showing the arrangement of a fixed terminal in the second embodiment.

FIG. 26 is a block diagram showing the arrangement of the fixed terminal of this embodiment.

The fixed terminal comprises an extension interface 1401 for exchanging signals with the main unit, a voice processing circuit 1402 for exchanging a voice signal with the extension interface 1401 and a transmitter/receiver 1403, the transmitter/receiver 1403 for modulating/demodulating signals so as to exchange signals with the mobile terminals, an antenna 1404 for exchanging signals with the mobile terminal, a CPU 1405 for controlling the fixed terminal, a ROM 1406 for storing a control program, and a modem 1407 for converting an analog signal from the voice processing circuit 1402 into a digital signal and supplying the digital signal to the CPU 1405, and for converting a digital signal from the CPU 1405 into an analog signal and transmitting the analog signal to the voice processing circuit 1402.

In the fixed terminal with the above-mentioned arrangement, when the CPU 1405 detects, via the extension interface 1401, a message from the main unit indicating that a response to an outgoing call is received from an extension or outside line, it outputs a predetermined response signal to the modem 1407.

The modem 1407 D/A-converts this signal, and outputs the obtained analog signal to the voice processing circuit 1402. The voice processing circuit 1402 sends this analog control signal to the transmitter/receiver 1403, and the transmitter/receiver 1403 outputs the control signal indicating that the response is received to the mobile terminal and the VM unit via the antenna 1404.

Figure 27:
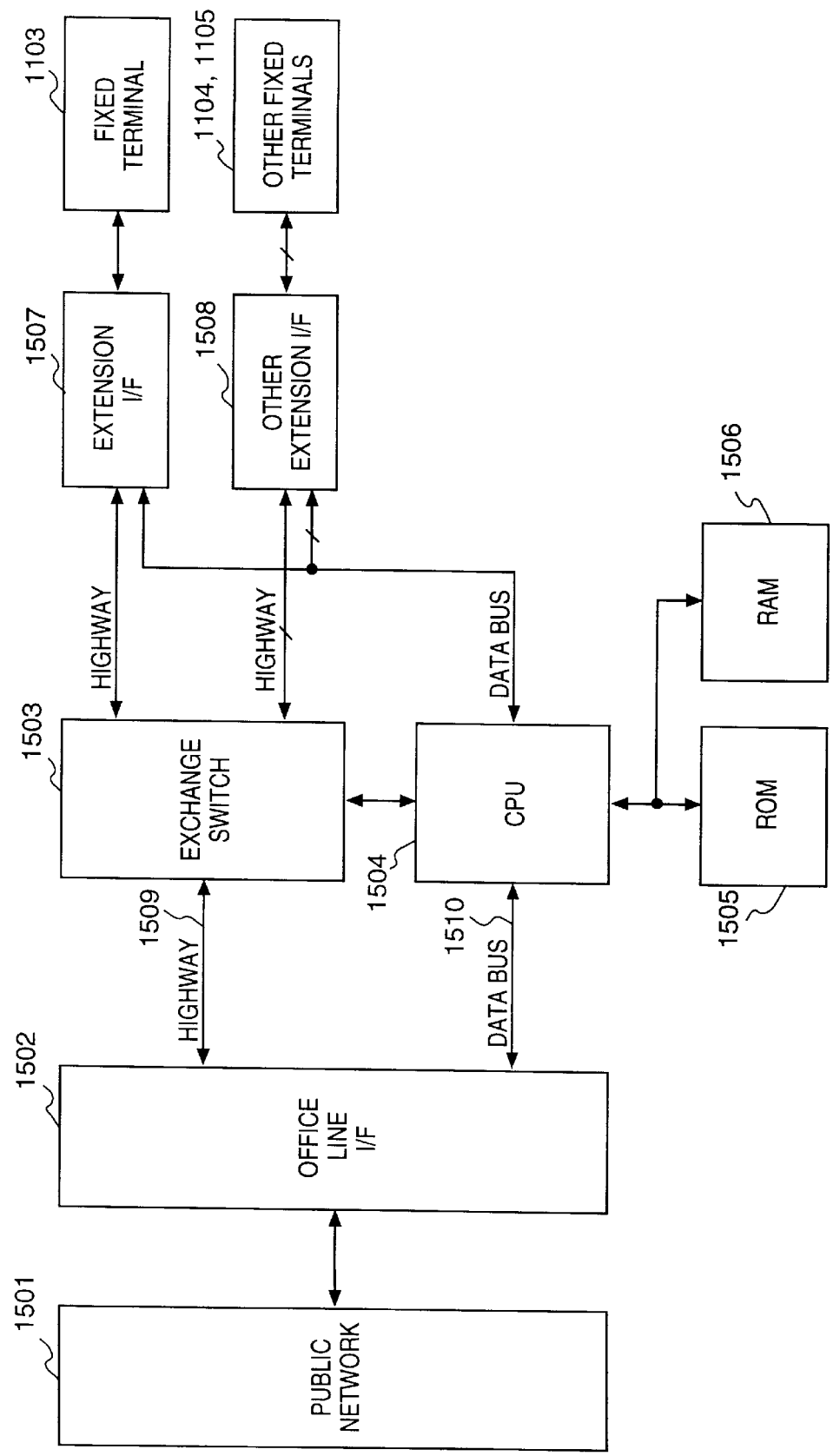
FIG. 27 is a block diagram showing the arrangement of a main unit in the second embodiment.

FIG. 27 is a block diagram showing the arrangement of the main unit of this embodiment.

The main unit comprises an office line interface 1502 which accommodates a public network 1501, and detects a response reverse from the public network 1501, an exchange switch 1503 for performing connection control of lines, a CPU 1504 for controlling the entire main unit, a ROM 1505 for storing a control program, a RAM 1506 for storing data, extension interfaces 1507 and 1508 which accommodate the fixed terminals 1103 to 1105, highways 1509 for connecting among the interfaces 1502, 1507, and 1508, and the exchange switch 1503, and data buses 1510 for connecting the CPU 1504 and the respective sections.

In the above-mentioned arrangement, when the CPU 1504 receives a signal indicating that the mobile terminal originates a call via the highways 1509 and the extension interface 1507, it controls the exchange switch 1503 to perform processing for connecting the highways 1509 to the office line interface 1502 or the other extension interface 1508, and performs call originating processing to a destination indicated by a dial number input from the mobile terminal.

Upon completion of the call originating processing, the CPU 1504 detects a response signal from the extension interface 1508 or the office line interface 1502. Note that a response signal from each of other mobile terminals is considered as depression information of a speech communication button for an incoming call, and when the other extension interface 1508 receives this information, it outputs a predetermined response signal to the CPU 1504.

When a response reverse is received from the public network 1501, the office line interface 1502 detects it using its internal response reverse detector (which is constituted by a photocoupler, operational amplifier, one-shot multivibrator circuit, and the like, and is known to those who are skilled in the art), and outputs a signal indicating that the partner answered the call, to the CPU 1504.

When another fixed terminal 1104 detects a response made at a corresponding mobile terminal of an extension, it informs the CPU 1504 of a signal indicating the presence of a predetermined response via the extension interface 1508.

Upon reception of the response signal, the CPU 1504 sends a command to the fixed terminal 1103 via the extension interface 1507 to output a predetermined response signal to the mobile terminal and the VM unit.

In this embodiment, responses from the extension and outside line interfaces are directly detected by the CPU 1504. Alternatively, processing for scanning predetermined external ports using interrupt processing may be performed.

Figure 28:
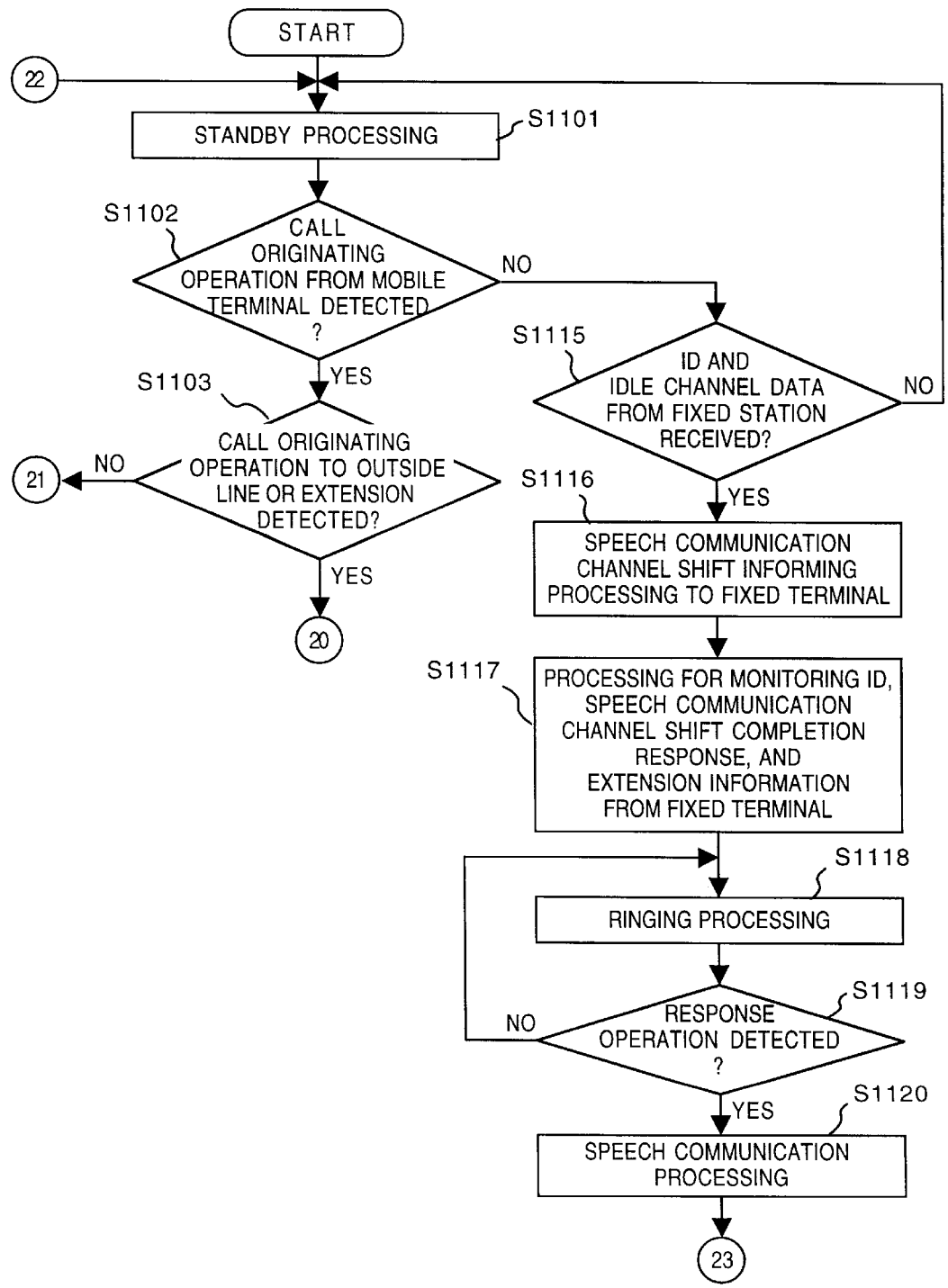
FIG. 28 is a flow chart showing the operation of the second embodiment from when a user originates a call from a mobile terminal to an extension or outside line until he or she starts a speech communication.
Figure 29:
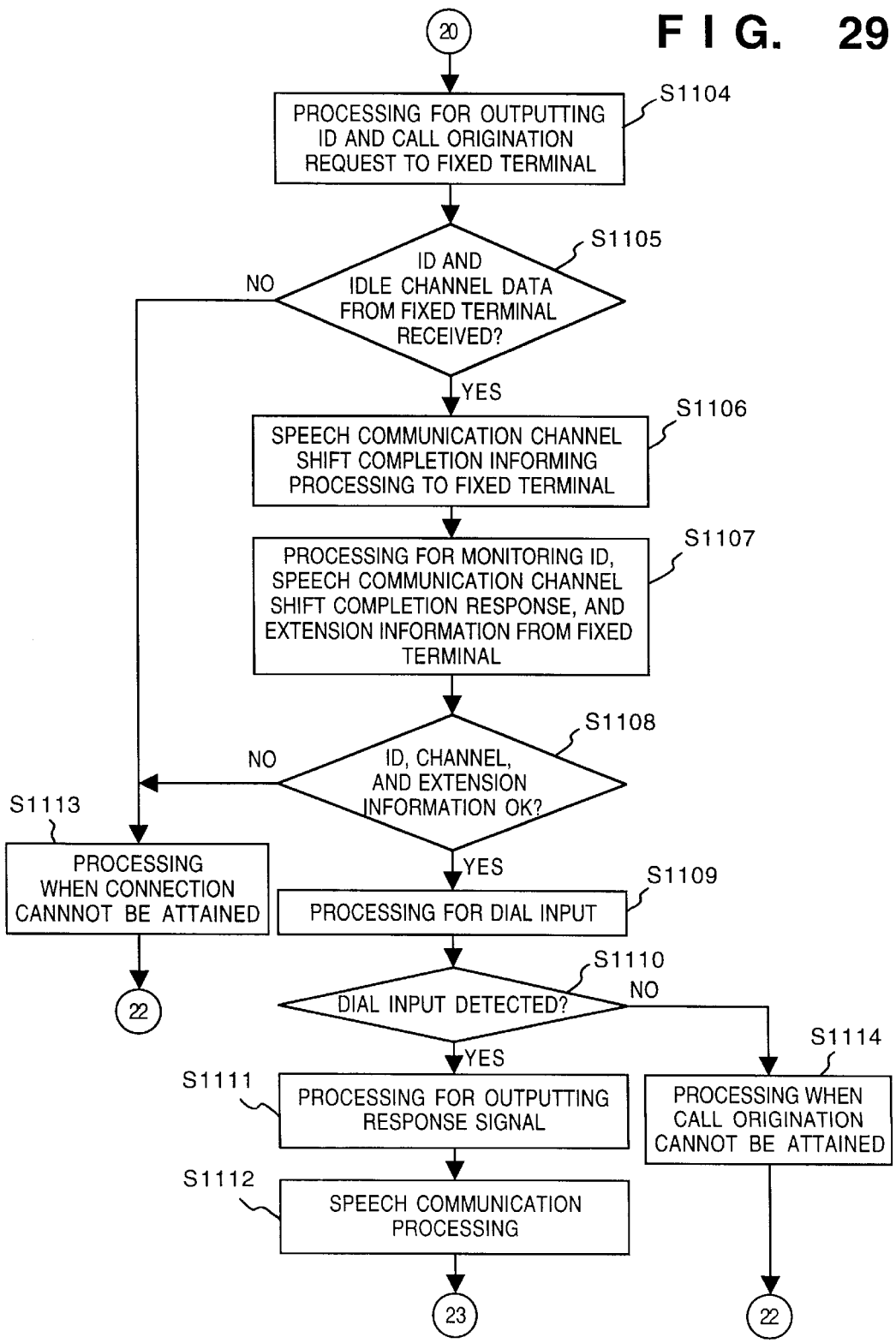
FIG. 29 is a flow chart showing the operation of the second embodiment from when a user originates a call from a mobile terminal to an extension or outside line until he or she starts a speech communication.

FIGS. 28 and 29 are flow charts showing the operation in this embodiment from when a user originates a call to an extension or outside line using a mobile terminal until he or she starts a speech communication.

If a call originating operation is performed by depressing the speech communication button or removing the mobile terminal from a charging base in step S1102 while standby processing is being performed in step S1101, it is checked in step S1103 if a call originating operation to an outside line or extension is to be performed. If NO in step S1103, processing shown in FIG. 31 (to be described later) is performed.

On the other hand, if YES in step S1103, an ID signal and a call origination request signal are output to the fixed terminal in step S1104. A response to this signal from the fixed terminal is monitored in step S1105. When an ID signal and idle channel data are detected from the fixed terminal, ID & speech communication channel shift completion processing for the fixed terminal is performed in step S1106.

In step S1107, processing for monitoring an ID signal, a speech communication channel shift completion response signal, and control information (LED, extension information, and the like) from the fixed terminal is performed, thereby detecting the ID signal, speech communication channel, and control information.

If an ID signal, channel information, or the like cannot be detected in steps S1105 and S1108, processing (for generating a warning tone or displaying, on the display, a message indicating that a call originating operation cannot be performed) when a connection to the fixed terminal cannot be attained is performed in step S1113, and the flow returns to standby processing in step S1101.

If the ID signal, channel information, and control information are detected in step S1108, processing for inputting a dial signal is performed in step S1109. This processing corresponds to processing for outputting a DT upon call origination via an extension or outside line.

After this processing, if a dial signal is input in step S1110, a signal indicating a response from the partner is detected and a predetermined response signal is output in step S1111. After the response signal is output, processing for performing a speech communication with the fixed terminal is performed, and a normal speech communication is performed.

If a dial signal cannot be confirmed in step S1110, processing when a call originating operation cannot be performed is executed in step S1114, and the flow returns to normal standby processing in step S1101.

On the other hand, if a call originating operation on the mobile terminal cannot be confirmed in step S1102, an ID signal and idle channel data indicating an incoming call from the fixed terminal are monitored in step S1115. If an ID signal and idle channel data are not detected in step S1115, normal standby processing is performed in step S1101.

If an ID signal and idle channel data indicating an incoming call from the fixed terminal are detected in step S1115, speech communication channel shift completion informing processing to the fixed terminal is performed in step S116. Upon completion of this informing processing, processing for monitoring an ID signal, a speech communication channel shift completion response, and control information (LED, extension information, and the like) from the fixed terminal is performed in step S1117. Upon completion of this processing, the mobile terminal generates a ringing tone in response to a command from the fixed terminal in step S1118.

If a user answers the call using the mobile terminal in step S1119, processing for a speech communication is performed in step S1120, thus setting a busy state. On the other hand, if a user does not answer the call using the mobile terminal in step S1119, ringing processing of the mobile terminal is continued in step S1118.

Figure 30:
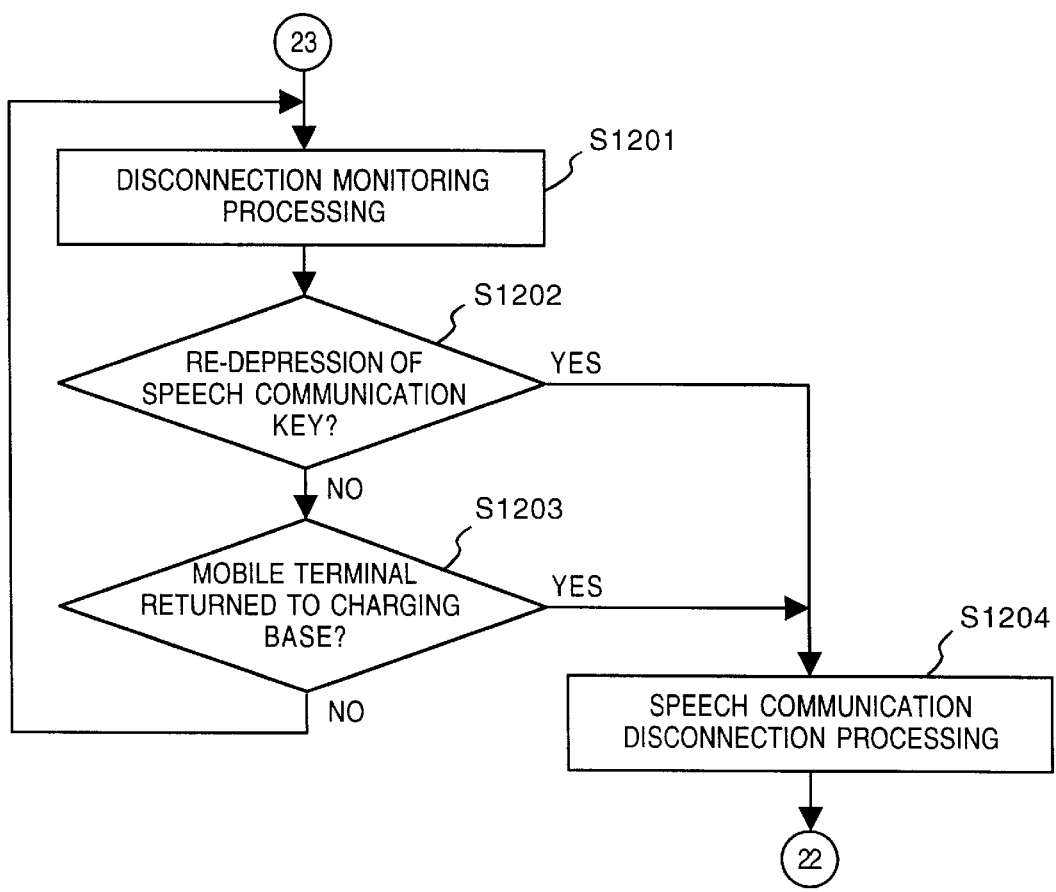
FIG. 30 is a flow chart showing the operation of the second embodiment from the busy state using the mobile terminal until the speech communication is completed.

FIG. 30 is a flow chart showing the operation in this embodiment from a busy state of a mobile terminal until the speech communication is completed.

If the mobile terminal is in a busy state, disconnection monitoring processing is executed in step S1201, and re-depression of the speech communication button is monitored in step S1202. If the speech communication button is not re-depressed, it is monitored in step S1203 if the mobile terminal is returned to the charging base. If it is detected in step S1203 that the mobile terminal is not returned to the charging base, the disconnection monitoring processing is performed in step S1201.

If it is determined in step S1202 or S1203 that the speech communication button is re-depressed on the mobile terminal or the mobile terminal is returned to the charging base, processing for disconnecting the speech communication is performed in step S1204, and the control of the mobile terminal advances to standby processing.

Figure 31:
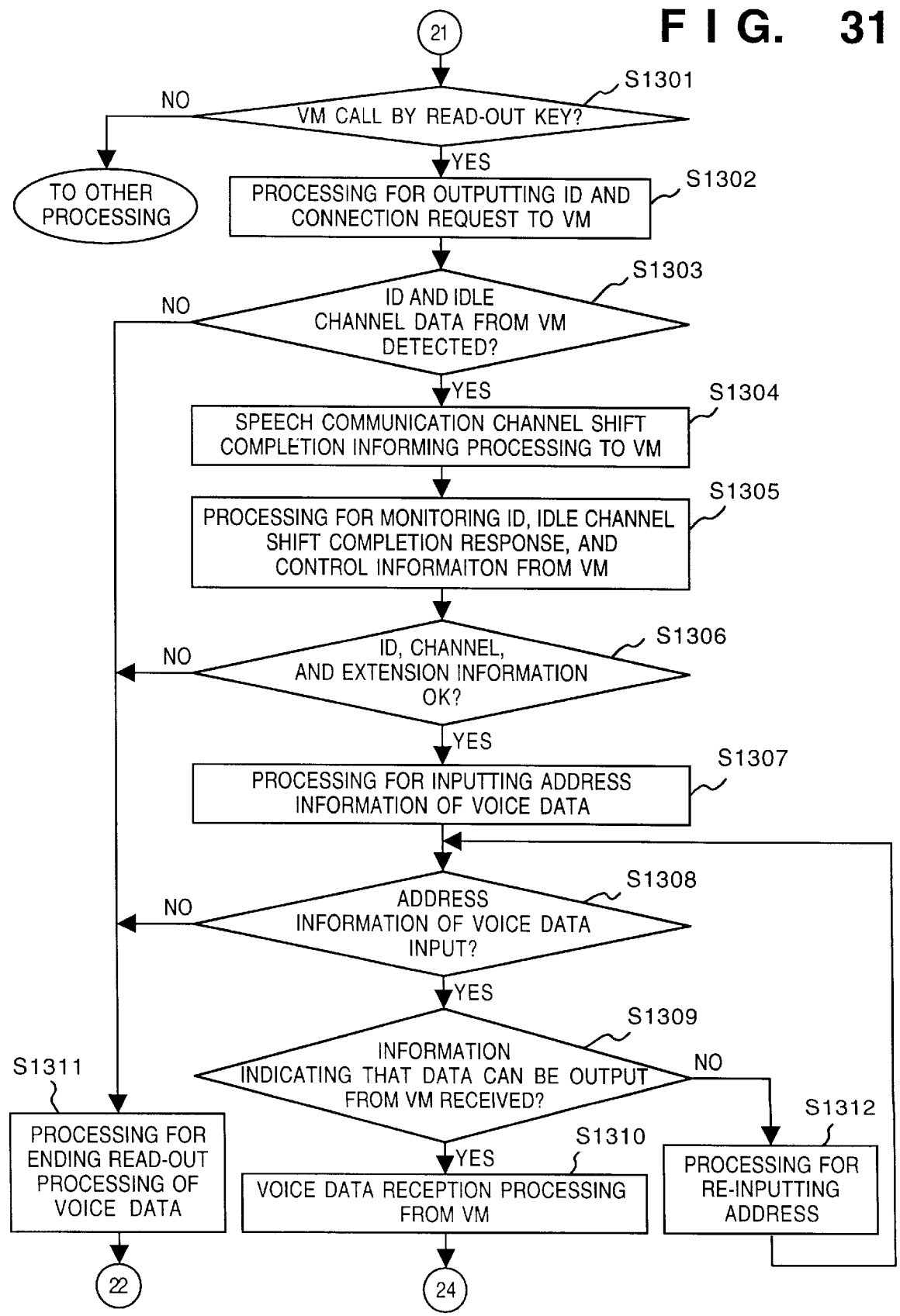
FIG. 31 is a flow chart showing the operation of the second embodiment until the mobile terminal reads out a voice message from the voice storage unit.

FIG. 31 is a flow chart showing the operation in this embodiment until a voice message is read out from the VM unit using a mobile terminal.

After a call originating operation is performed on the mobile terminal, if depression of the read-out key for calling the VM unit (this key may be arranged in advance on the mobile terminal or an arbitrary key may be set using a flexible key setting function) on the mobile terminal is detected in step S1301, an ID signal and a connection request signal are output to the VM unit in step S1302. After this processing, it is monitored in step S1303 if an ID signal and idle channel data from the VM unit are detected.

If the ID signal and the idle channel data are confirmed in step S1303, ID & speech communication channel shift completion informing processing to the VM unit is performed in step S1304. On the other hand, if the ID signal and the idle channel data are not detected in step S1303, voice data read-out processing ends in step S1311, and the control returns to standby processing.

Upon completion of the processing in step S1304, processing for monitoring an ID signal, an idle channel shift completion response, and a control information signal from the VM unit is performed in step S1305. If the ID signal, idle channel shift completion response, and control information are confirmed in step S1306 during the monitoring processing in step S1305, processing for inputting address information of voice data is performed in step S1307. On the other hand, if the ID signal and idle channel data cannot be detected in step S1306, voice data read-out processing ends in step S1311, and the control returns to standby processing.

Data input after this processing is one indicating an address. By inputting a predetermined number in this manner, the address of data to be output from the memory can be determined.

If a predetermined number is input in step S1308, it is monitored in step S1309 if information indicating whether or not voice data corresponding to the input address data is present and whether or not the voice data can be output if it is present is detected. If a signal indicating that the voice data can be output is detected from the VM unit in step S1309, the voice data is received from the VM unit in step S1310, and the received message can be heard.

If the ID signal and idle channel data cannot be detected in step S1308, voice data read-out processing ends in step S1311, and the control returns to standby processing.

If information indicating that a voice message cannot be output is received from the VM unit in step S1309, processing for re-inputting address information is performed in step S1312, and the flow returns to step S1308 to monitor if an address is re-input.

Note that an arrangement for inhibiting a user from hearing a stored voice message using a mobile terminal unless he or she inputs a predetermined password or the like before he or she inputs address information may be adopted.

Figure 32:
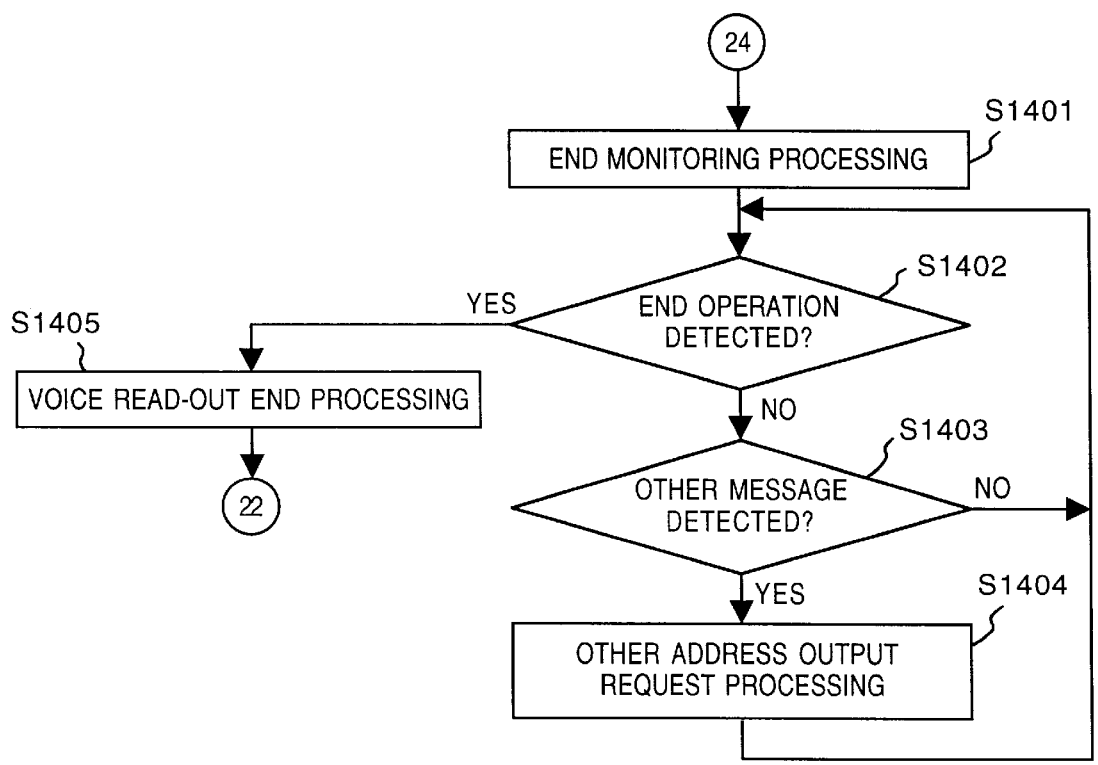
FIG. 32 is a flow chart showing the operation of the second embodiment when the mobile terminal stops the read-out operation of a voice message from the voice storage unit.

FIG. 32 is a flow chart showing the operation for stopping the voice message read-out operation from the VM unit using a mobile terminal in this embodiment.

During the hearing operation of a voice message using the mobile terminal, it is monitored in step S1401 if a hearing end operation is performed on the mobile terminal. If it is determined in step S1402 that re-depression of the speech communication button is detected or the mobile terminal is returned to the charging base, voice message hearing processing ends in step S1405, and the control advances to standby processing.

If the end operation is not detected in step S1402, it is monitored in step S1403 if another message hearing processing is performed. If it is detected in step S1403 that another message output processing is performed, a signal for requesting the VM unit to output the voice message is output in step S1404.

On the other hand, if another voice message output request is not detected in step S1403, the flow advances to step S1401 to perform the voice message hearing end monitoring processing.

Figure 33:
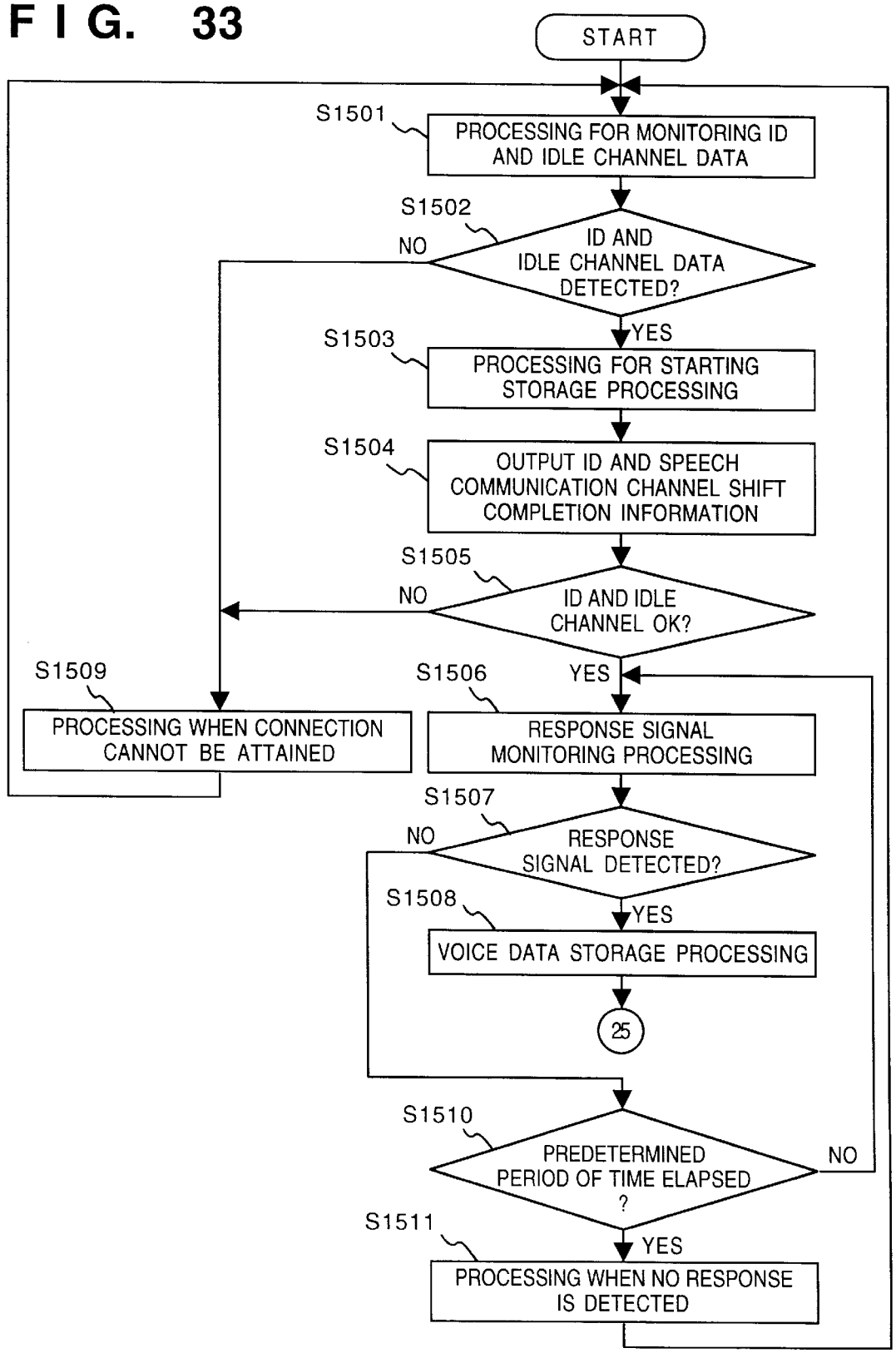
FIG. 33 is a flow chart showing the voice message storage operation of the voice storage unit in the second embodiment.

FIG. 33 is a flow chart showing the voice message storage operation in the VM unit in this embodiment.

During monitoring processing of an ID signal and idle channel data from a fixed or mobile terminal in step S1501, if an ID signal and idle channel data from a fixed or mobile terminal are detected in step S1502, the VM unit performs processing for starting storage processing in step S1503.

In this processing, when the VM unit comprises an internal memory such as a hard disk or the like, processing for setting the memory in a standby state is performed. On the other hand, when the VM unit comprises an IC as its internal memory, processing for changing the operation mode of the memory from a sleep mode to a normal mode is performed.

If the ID signal and idle channel data cannot be detected in step S1502, processing when a connection cannot be attained is performed in step S1509, and monitoring processing of an ID signal and idle channel data is performed again in step S1501.

Upon completion of the processing for starting the storage processing, an ID signal and a speech communication channel shift completion signal to the mobile terminal are monitored in step S1504. During the monitoring processing of the signals, if the VM unit detects an ID signal and a speech communication channel shift completion signal in step S1505, a response signal from the mobile terminal is monitored in step S1506. This response signal is output when a signal generated upon depression of the speech communication button to answer an incoming call or a signal indicating a response reverse received from the fixed or mobile terminal via the office line is detected.

During the monitoring processing of the response signal, if the VM unit detects a response signal in step S1507, voice data storage processing is performed in step S1508 to record the contents of a speech communication.

If a response signal cannot be detected in step S1507, a response signal is detected for a predetermined period of time in step S1510. If the predetermined period of time has not elapsed, the flow returns to step S1506 to perform the monitoring processing of the response signal again. On the other hand, if it is detected in step S1510 that the predetermined period of time has elapsed, processing when the response signal cannot be detected is performed in step S1511, and the monitoring processing of an ID signal and idle channel data is performed in step S1501.

Figure 34:
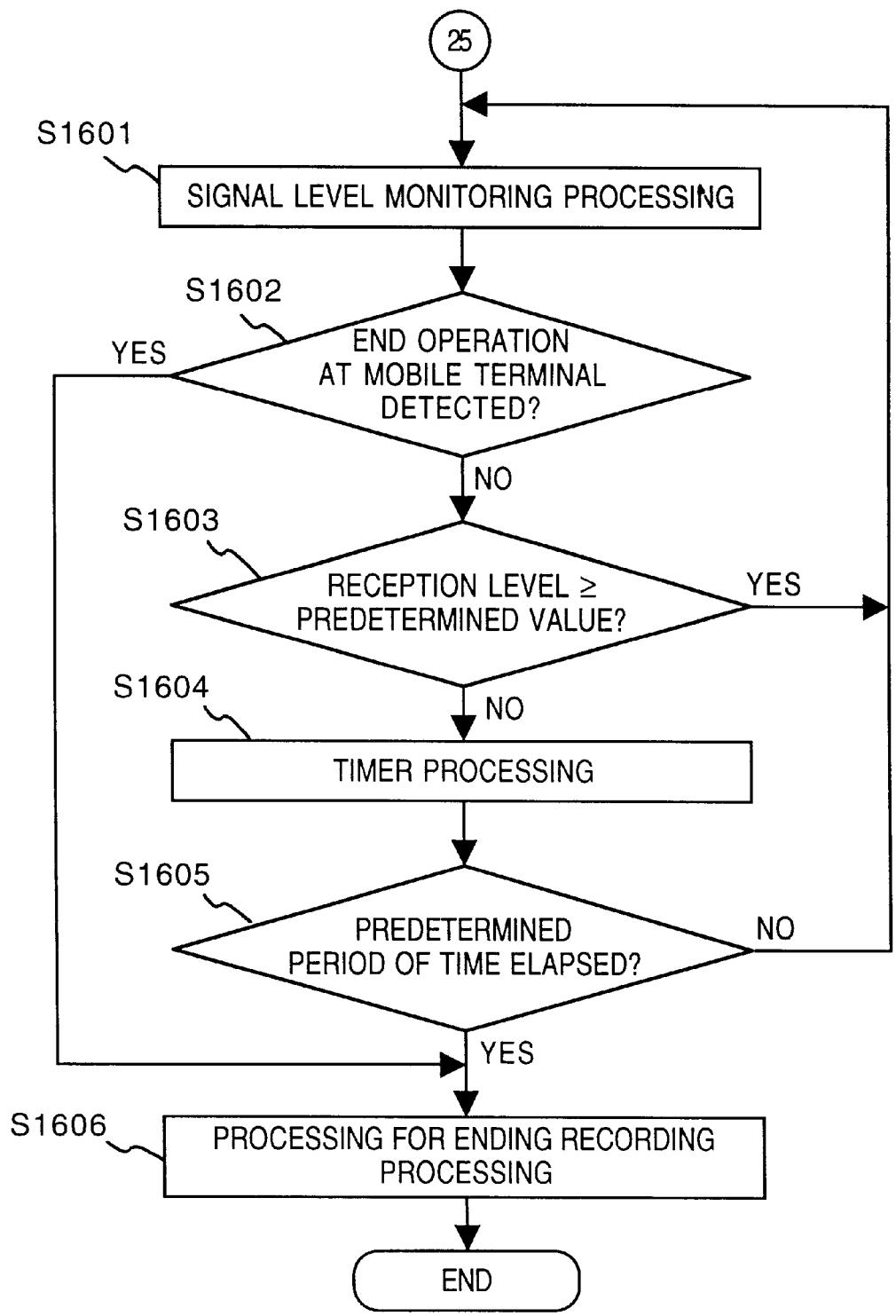
FIG. 34 is a flow chart showing the operation for completing the voice message storage processing of the voice storage unit in the second embodiment.

FIG. 34 is a flow chart showing the operation for completing the voice message storage processing of the VM unit in this embodiment.

The VM unit monitors the level of a signal from the mobile terminal in step S1601 simultaneously with the recording operation of the contents of a speech communication. During this monitoring processing, if a signal indicating an end operation from the mobile terminal is detected in step S1602, the voice message recording processing ends in step S1606.

Note that the signal indicating the end of the operation from the mobile terminal is, e.g., setting key information, a re-depression signal of the speech communication button, or the like from the mobile terminal.

If a signal indicating the end operation of the recording processing from the mobile terminal is not detected in step S1602, it is checked in step S1603 if the signal level from the mobile terminal is equal to or higher than a predetermined level. If it is determined in step S1603 that the reception level is equal to or higher than the predetermined value, the flow returns to step S1601 to monitor the signal level again.

If it is determined in step S1603 that the signal level from the mobile terminal is lower than the predetermined value, timer processing for measuring a predetermined period of time is performed in step S1604, and it is monitored in step S1605 if the predetermined period of time has elapsed.

As a result of measurement, if it is determined that the predetermined period of time has not elapsed, the flow returns to step S1601 to perform the monitoring processing of the signal level again. On the other hand, if it is determined in step S1605 that the predetermined period of time has elapsed, processing for ending the speech communication recording processing is performed in step S1606, thus ending the recording processing.

Figure 35:
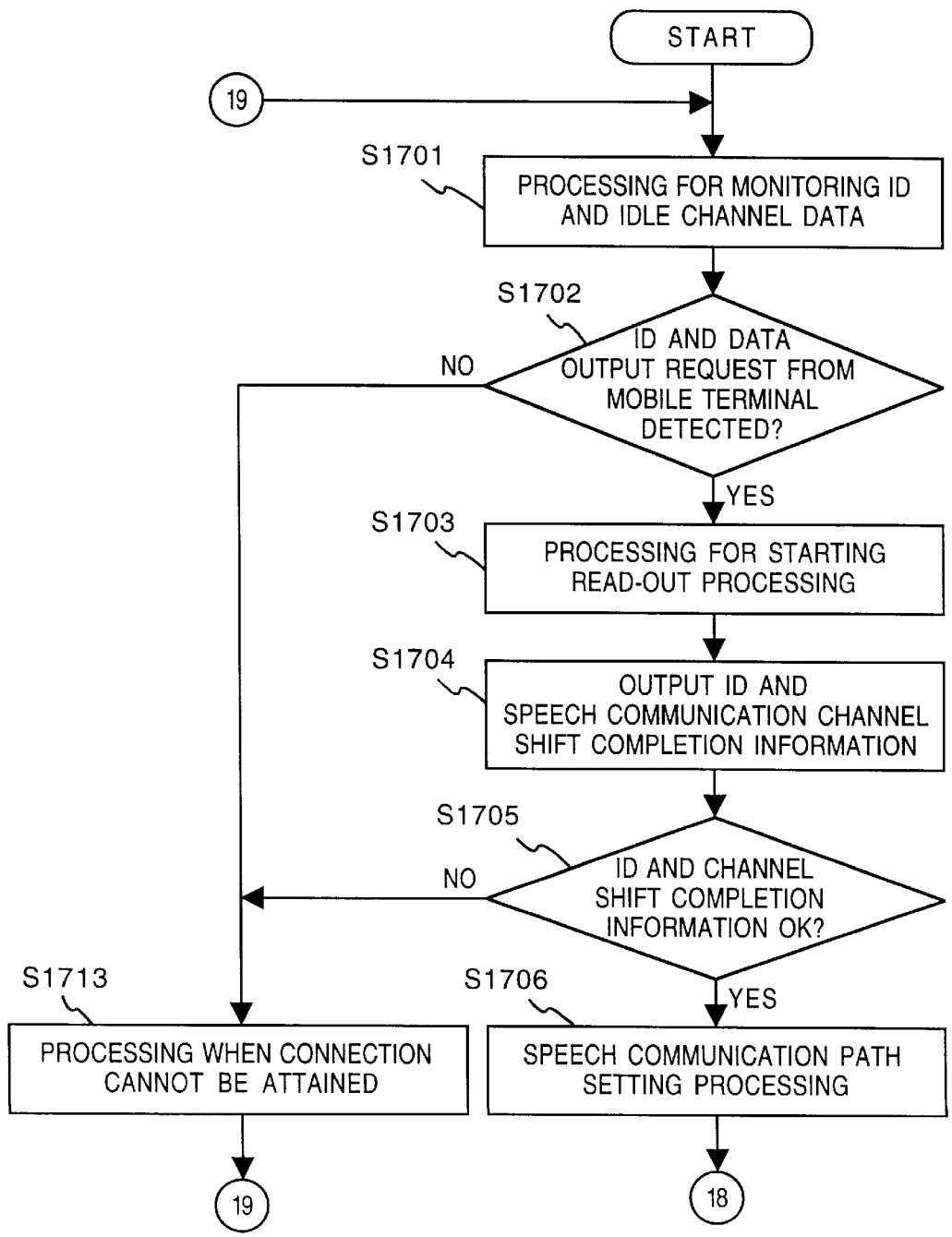
FIG. 35 is a flow chart showing the operation in the second embodiment until a voice message stored in the voice storage unit is output.
Figure 36:
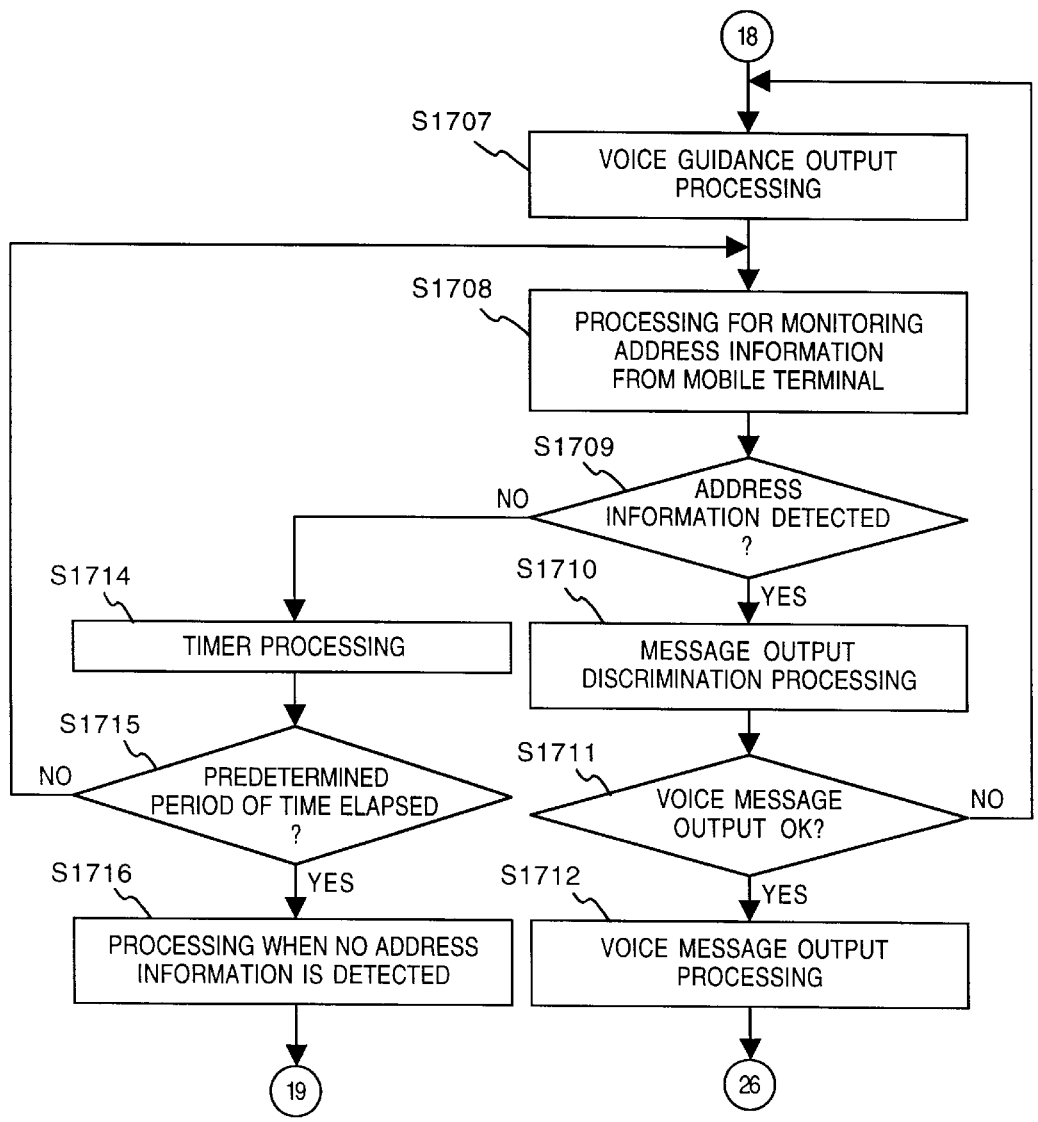
FIG. 36 is a flow chart showing the operation in the second embodiment until a voice message stored in the voice storage unit is output.

FIGS. 35 and 36 are flow charts showing the operation until a voice message stored in the VM unit is output in this embodiment.

During monitoring processing of an ID signal and idle channel data, from a fixed or mobile terminal in step S1701, if an ID signal and a voice message output request signal from a mobile terminal are detected in step S1702, processing for starting the read-out operation of voice data stored in the memory is performed in step S1703.

In this processing, when the VM unit comprises an internal memory such as a hard disk or the like, processing for setting the memory in a standby state is performed. On the other hand, when the VM unit comprises an IC as its internal memory, processing for changing the operation mode of the memory from a sleep mode to a normal mode is performed.

On the other hand, if an ID signal and a voice message output request from a mobile terminal cannot be detected in step S1702, processing when a connection cannot be attained is performed in step S1713, and the monitoring processing of an ID signal and idle channel data is performed again in step S1701.

Upon completion of the processing for starting the read-out processing in step S1703, processing for monitoring an ID signal and a speech communication channel shift completion informing signal from the mobile terminal is performed in step S1704. During this processing, if the VM unit detects an ID signal and a speech communication channel shift completion informing signal in step S1705, processing for setting a speech communication path with the mobile terminal is performed in step S1706. Upon completion of this processing, a predetermined voice guidance is output from the voice message output section 1313 in step S1707.

On the other hand, if an ID signal and an idle channel shift completion informing signal cannot be detected in step S1705, processing when a connection cannot be attained is performed in step S1713, and the monitoring processing of an ID signal and idle channel data from a mobile terminal is performed again in step S1701.

Upon completion of the voice guidance output processing in step S1707, processing for monitoring address information from the mobile terminal is performed in step S1708. After the end of this processing, processing for detecting address information from the mobile terminal is performed in step S1709.

If address information from the mobile terminal cannot be detected in step S1709, timer processing for measuring a predetermined period of time is performed in step S1714. Upon completion of this processing, it is checked in step S1715 if the predetermined period of time has elapsed. If the predetermined period of time has not elapsed, the processing for monitoring the address information from the mobile terminal is continued in step S1708.

On the other hand, if it is determined in step S1715 that the predetermined period of time has elapsed, processing when address information cannot be detected is performed in step S1716 to end the address information detection processing, and the monitoring processing of an ID signal and idle channel data from the mobile terminal is performed in step S1701.

If address information from the mobile terminal is detected in step S1709, processing for checking if a message indicated by this address information can be output is performed in step S1710. If it is determined in step S1711 that a voice message indicated by the address information can be output, a corresponding voice message is output to the mobile terminal in step S1712.

On the other hand, if it is determined in step S1711 that a voice message cannot be output, processing for informing the mobile terminal that a voice message indicated by the output address information cannot be output is performed in step S1707. In this processing, processing for outputting a voice guidance message indicating that the designated voice message cannot be output to the mobile terminal is performed, and input of new address information is prompted. In this case, this processing may end after the message indicating that the voice message cannot be output is supplied.

Figure 37:
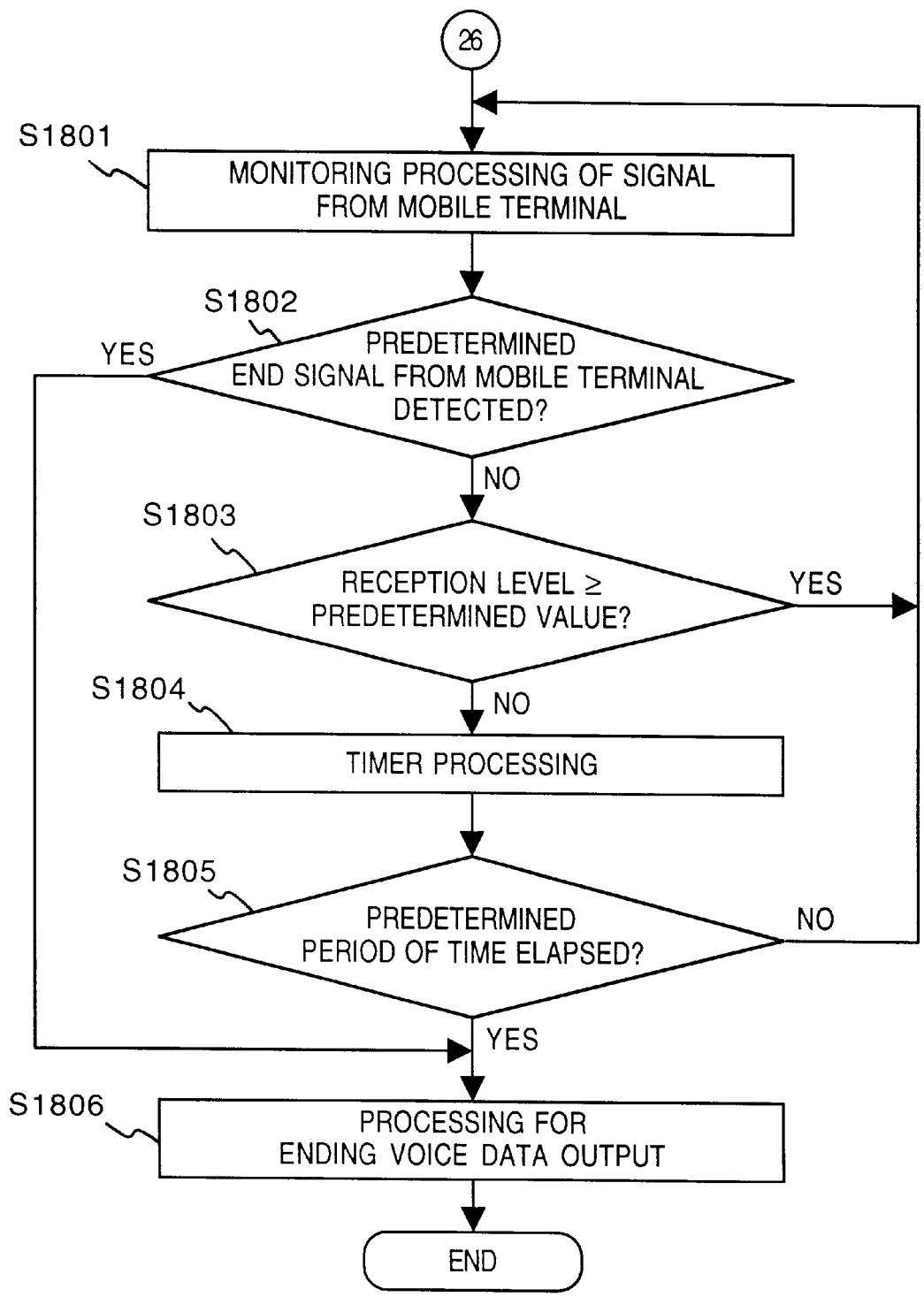
FIG. 37 is a flow chart showing the operation for stopping the output operation of a voice message stored in the voice storage unit in the second embodiment.

FIG. 37 is a flow chart showing the operation for stopping the output operation of a voice message stored in the VM unit in this embodiment.

The VM unit monitors the signal level from a mobile terminal in step S1801 simultaneously with the output operation of a voice message to the mobile terminal. During this monitoring processing, if a predetermined signal indicating the end of hearing of a voice message is detected from the mobile terminal in step S1802, voice message output processing ends in step S1806.

Note that the signal indicating the end of hearing of a voice message is setting key information, a re-depression signal of the speech communication button, or the like from the mobile terminal.

If the operation for ending the voice message output processing cannot be detected from the mobile terminal in step S1802, it is checked in step S1803 if the signal level from the mobile terminal is equal to or higher than a predetermined level. As a result of this checking step, if the reception level is equal to or higher than the predetermined level, the signal level monitoring processing is performed again in step S1801.

If it is determined in step S1803 that the signal level from the mobile terminal is lower than the predetermined level, timer processing for measuring a predetermined period of time is performed in step S1804, and it is monitored in step S1805 if the predetermined period of time has elapsed.

As a result of measurement, if it is determined that the predetermined period of time has not elapsed, the flow returns to step S1801 to perform the signal level monitoring processing again. On the other hand, if it is determined in step S1805 that the predetermined period of time has elapsed, processing for ending the voice message output processing is performed in step S1806, thus ending the output operation.

Figure 38:
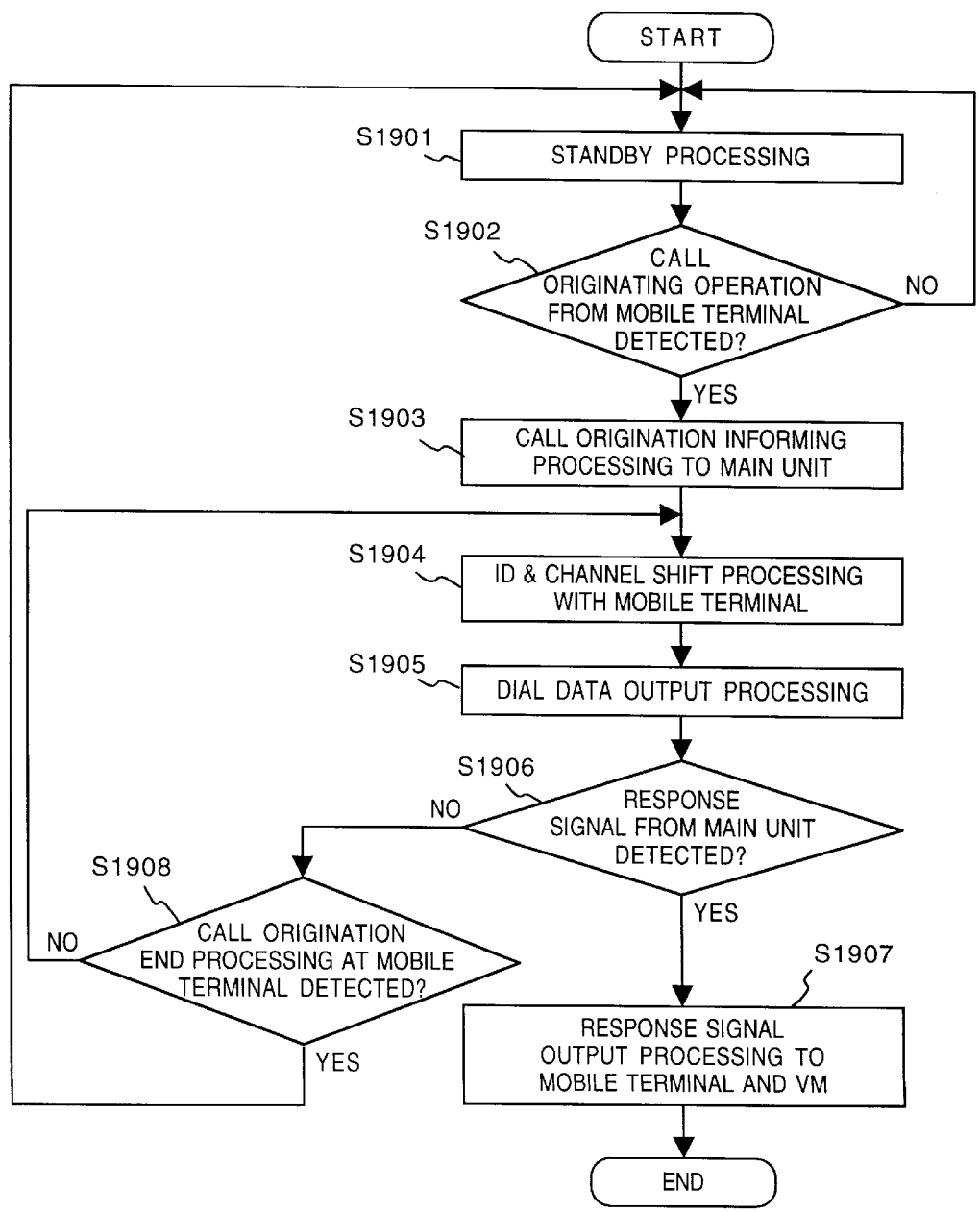
FIG. 38 is a flow chart showing the operation of the fixed terminal in the second embodiment.

FIG. 38 is a flow chart showing the operation of the fixed terminal in this embodiment.

During standby processing for monitoring signals from the mobile terminal and the main unit in step S1901, if it is determined in step S1902 that a call origination request from the mobile terminal to the extension or outside line is detected, a signal for requesting call origination is sent to the main unit in step S1903.

Upon completion of this processing, processing for shifting a speech communication channel with the mobile terminal is performed in step S1904 to set a state ready for receiving dial data from the mobile terminal, and dial data sent from the mobile terminal is output to the main unit in step S1905.

As a result of outputting the dial data to the outside line or extension, if a response signal from the extension or outside line is detected from the main unit in step S1906, a signal indicating that a response to the outgoing call is received is output to the mobile terminal and the VM unit in step S1907.

If a response signal from the extension or outside line cannot be detected from the main unit in step S1906, it is monitored in step S1908 if the mobile terminal ends call originating processing. If the mobile terminal does not end call originating processing, a response signal from the main unit is monitored in step S1906.

Figure 39:
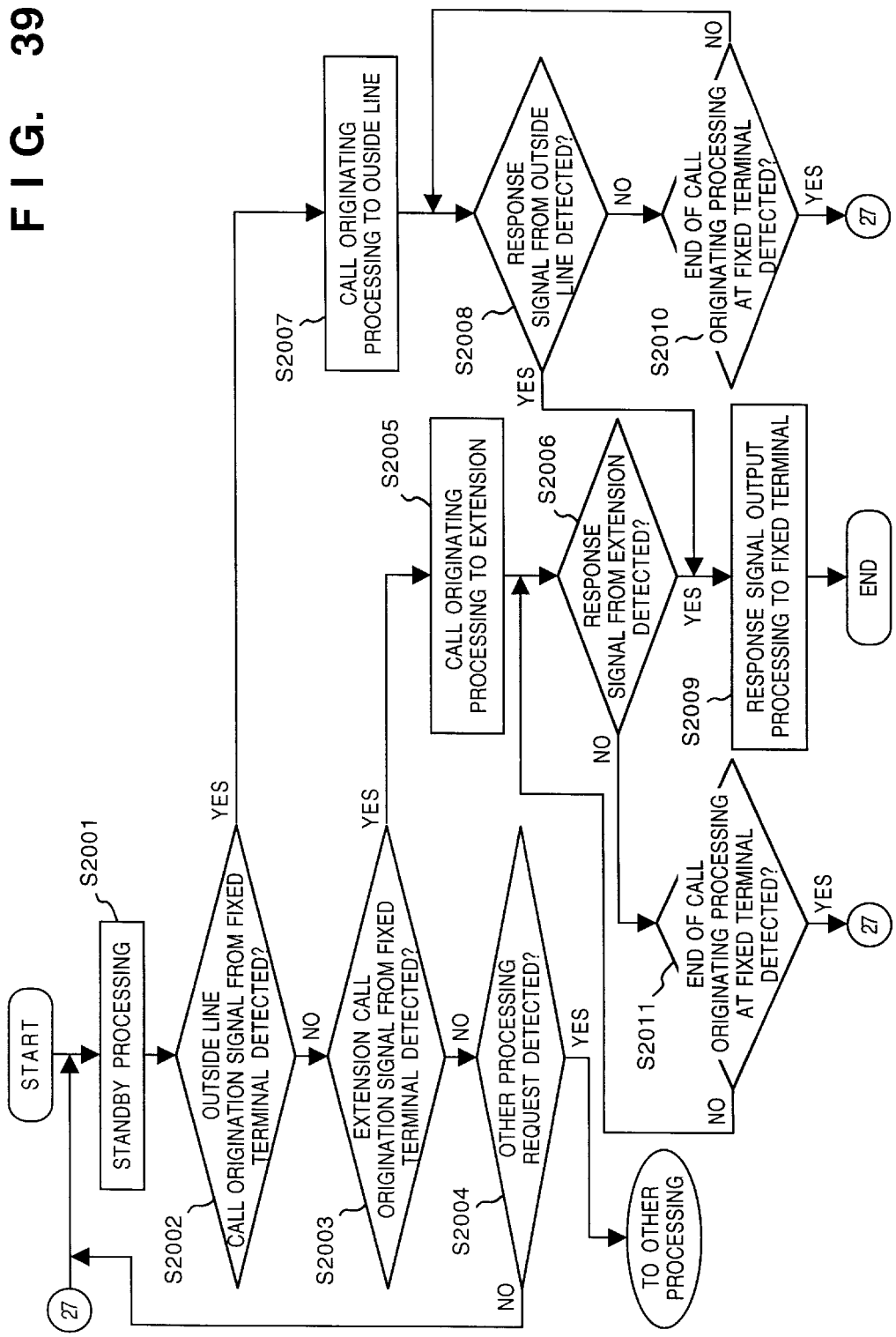
FIG. 39 is a flow chart showing the operation of the main unit in the second embodiment.

FIG. 39 is a flow chart showing the operation of the main unit in this embodiment.

If it is determined in step S2002 that a signal indicating that the mobile terminal issued an outside line call origination request is received from the fixed terminal, while the main unit is executing standby processing in step S2001, processing for originating a call to the outside line is performed on the basis of dial information from the fixed terminal in step S2007.

As a result of the call originating processing, if it is determined in step S2008 that a response reverse from the outside line subjected to the call originating processing is detected, a predetermined response signal is output to the fixed terminal which performed the call originating processing. On the other hand, if it is determined in step S2008 that a response reverse from the outside line is not detected, it is checked in step S2010 if a signal indicating the end of the call originating processing from the fixed terminal is detected. If the signal indicating the end of the call originating processing is not detected from the fixed terminal, a response reverse from the outside line is detected again in step S2008. On the other hand, if it is determined in step S2010 that the signal indicating the end of the call originating processing from the fixed terminal is detected, the flow returns to step S2001 to perform the standby processing.

On the other hand, if it is determined in step S2002 that an outside line call origination signal from the fixed terminal is detected, it is checked in step S2003 if an extension call origination signal from the fixed terminal is detected. If an extension call origination signal from the fixed terminal is detected, processing for originating a call to the extension is performed on the basis of dial information from the fixed terminal in step S2005.

As a result of the call originating processing, if it is determined in step S2006 that a response signal from the extension that received a call is detected, a predetermined response signal is output to the fixed terminal which performed the call originating processing in step S2009. On the other hand, if it is determined in step S2006 that a response signal from the extension is not detected, it is checked in step S2011 if a signal indicating the end of the call originating processing from the fixed terminal is detected.

If a signal indicating the end of the call originating processing is not detected from the fixed terminal in step S2011, it is checked again in step S2006 if a response signal from the extension is detected. On the other hand, if the signal indicating the end of the call originating processing from the fixed terminal is detected in step S2011, the control returns to the standby processing in step S2001.

In the second embodiment described above, a response reverse from an analog line is used as a response signal upon call origination via an outside line. Upon connection to, e.g., a digital line, a predetermined digital response signal may be detected, and the same operations as described above can be performed.

In this embodiment, the contents of all speech communications are recorded. Alternatively, an operation for setting a predetermined extension or outside line to be subjected to the speech communication recording operation may be allowed.

In the above embodiment, a radio unit is constituted by a small electric power system. As another embodiment, a radio unit may be constituted using a weak radio wave, spread spectrum, optical communication, or the like.

In each of the above embodiments, the control system is constituted using the CPU, ROM, RAM, voice codec, and the like. Alternatively, voice data storage processing may be attained by specific arithmetic processing using DSP (Digital Signal Processing).

In the first and second embodiments, voice data is automatically stored in the VM unit. Alternatively, a key for starting the voice storage operation may be arranged on the operation unit of each mobile terminal, and a signal indicating the start of the voice storage operation may be transmitted to the VM unit upon operation of the key, so that a voice storage start instruction may be manually issued.

In the first and second embodiments, when voice data stored in the VM unit is reproduced, a reproduction instruction signal is directly sent from a mobile terminal to the VM unit. Alternatively, this reproduction instruction signal may be received by the main unit, and upon reception of this signal, the main unit may designate a transmission channel of reproduced voice data from the VM unit to the mobile terminal so as to instruct the start of reproduction to the VM unit.

The third embodiment will be described below.

Figure 40:
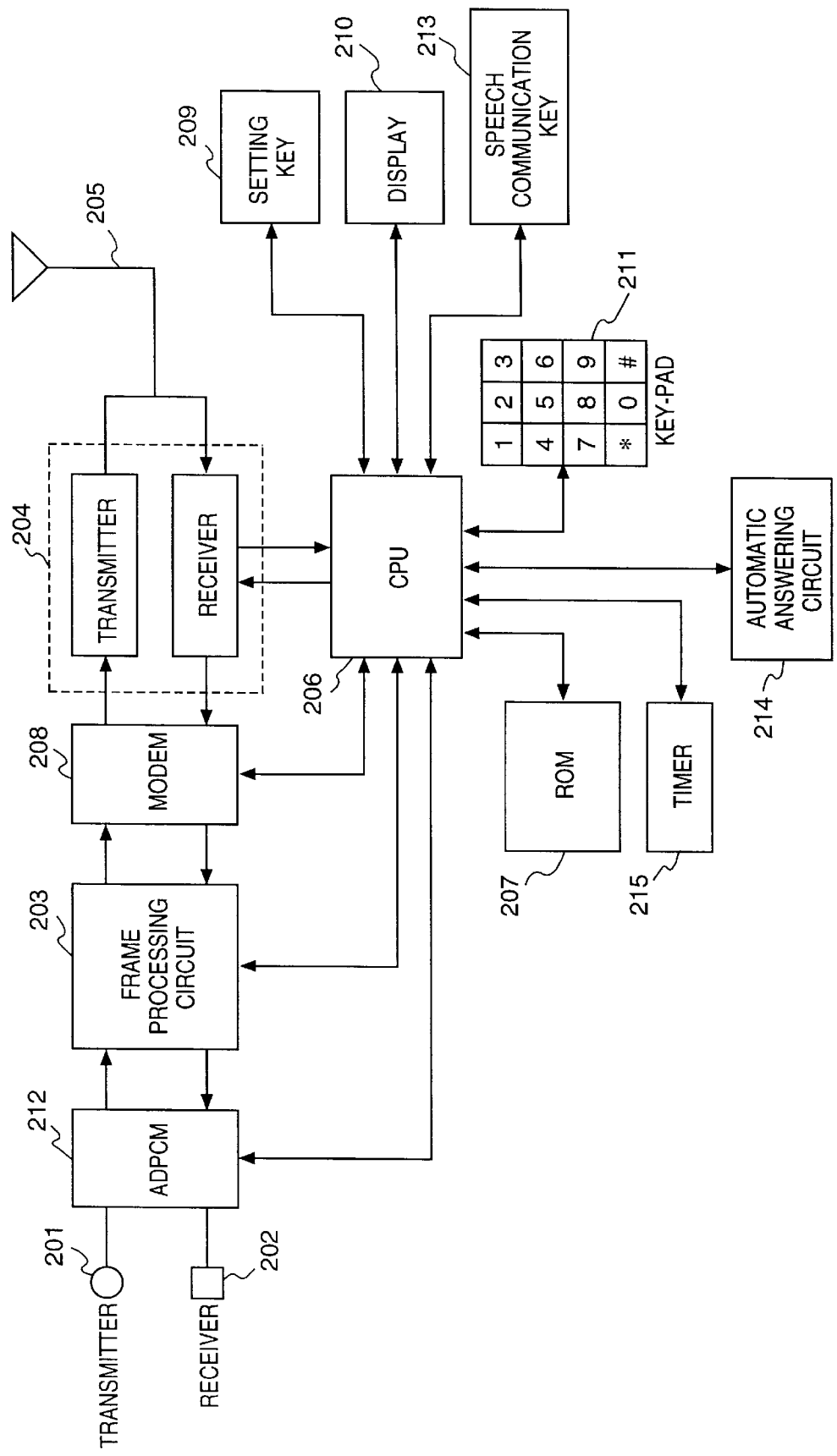
FIG. 40 is a block diagram showing the arrangement of a mobile terminal according to the third embodiment of the present invention.

FIG. 40 is a block diagram showing the arrangement of the mobile unit of this embodiment.

Referring to FIG. 40, reference numeral 214 denotes an automatic answering circuit which automatically sets an off-hook state upon detection of an incoming call informing signal sent from a fixed terminal, and outputs an answering message. The automatic answering circuit sets an on-hook state in response to a signal from a timer 215.

Reference numeral 215 denotes a timer for measuring a predetermined period of time from the beginning of the off-hook state set by the automatic answering circuit.

Since other arrangements are the same as those in FIG. 2, a detailed description thereof will be omitted.

Since the arrangements of the fixed terminal, main unit, and VM unit are the same as those in the first embodiment, a detailed description thereof will be omitted.

Figure 41:
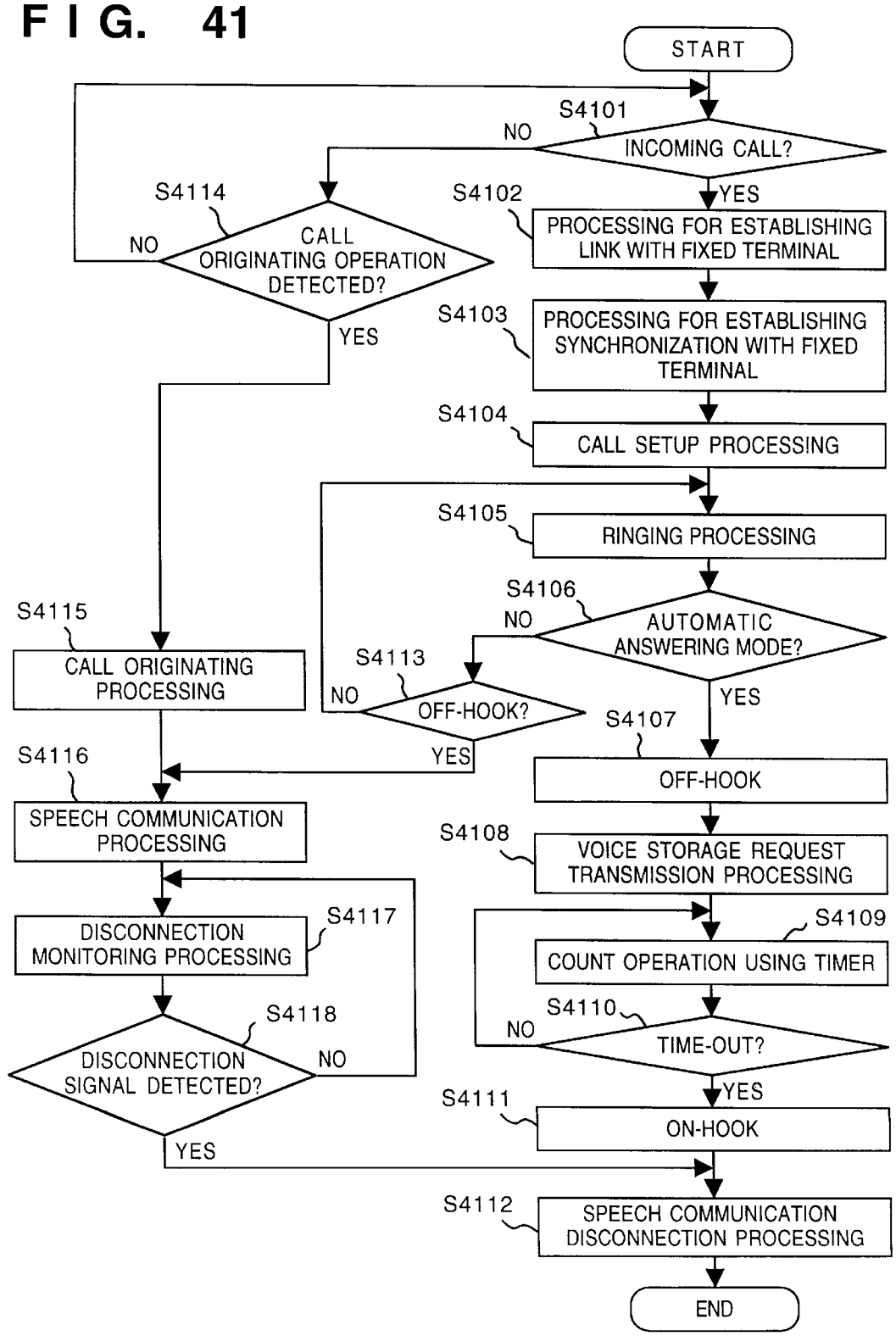
FIG. 41 is a flow chart showing the operation of the mobile terminal according to the third embodiment of the present invention.

FIG. 41 is a flow chart showing the operation of the mobile terminal.

In step S4101 in FIG. 41, it is checked based on a signal from the fixed terminal if an incoming call is detected. If NO in step S4101, it is checked in step S4114 if a call originating operation is performed. If YES in step S4114, call originating processing is performed in step S4115, and processing for a speech communication is performed in step S4116. At this time, the mobile terminal is busy. Simultaneously with the speech communication processing, disconnection monitoring processing for monitoring the end of the speech communication is performed in step S4117.

If an on-hook operation of the mobile terminal or a disconnection request signal from the fixed terminal is detected in step S4118, speech communication disconnection processing is performed in step S4112, thus ending the speech communication.

On the other hand, if an incoming call is detected in step S4101, processing for establishing a link with the fixed terminal is performed in step S4102 to assign a channel. Upon completion of the link establishment processing, processing for establishing synchronization with the fixed terminal using the designated channel is performed in step S4103. Upon completion of this processing, call setup processing with the fixed terminal is performed in step S4104. Upon completion of the call setup processing, a ringing tone is generated by the mobile terminal in response to a command from the fixed terminal in step S4105.

Simultaneously with the generation of the ringing tone, it is checked in step S4106 if an automatic answering mode is selected. If YES in step S4106, the mobile terminal is automatically set in an off-hook state in step S4107, and a voice storage request signal is transmitted in step S4108. After the voice storage request signal is transmitted, a counting operation using a timer is performed in step S4109. A time-out state of the timer is monitored in step S4110. If the timer has reached a time-out state, an on-hook operation is performed in step S4111. After the on-hook operation, speech communication disconnection processing is performed in step S4112, thus ending the speech communication.

The operation of the VM unit is the same as that in the first embodiment. Upon detection of an incoming call, the VM unit starts the storage operation of voice data upon reception of a voice storage request signal from the mobile terminal, and ends the storage operation of voice data upon reception of an on-hook signal from the mobile terminal.

When a call originating operation is performed using a mobile terminal, the VM unit starts the storage operation of voice data upon detection of a response to a call from the fixed terminal, and ends the storage operation of voice data upon reception of a signal indicating the end of a speech communication from the fixed or mobile terminal.

In this embodiment, the automatic answering mode can be set by operating a setting key 209.

Like in this embodiment, when an automatic answering function is provided to the mobile terminal, the VM unit can be used as an automatic answering telephone unit.

As described above, according to the present invention, the VM unit can be shared by a plurality of extension terminals.

Also, according to the present invention, the main unit and the VM unit need not be directly connected to each other, and can be placed anywhere as long as they can receive electric waves, thus much facilitating construction.

According to the present invention, since the contents of communications using a plurality of extension terminals are digitally stored, the communication contents can be stored in units of extension terminals, and can be easily reproduced in units of extension terminals.

As many apparently widely different embodiments of the present invention can be made without departing from the spirit and scope thereof, it is to be understood that the invention is not limited to the specific embodiments thereof except as defined in the appended claims.

What is claimed is:

1. A voice storage device in a radio communication system having a radio communication control device, a plurality of radio communication terminals and the voice storage device, comprising:

reception means for receiving a control signal and an information signal, said control signal being transmitted based on a discrimination made by the radio communication control device or the radio communication terminals which can make discrimination between a first wireless communication path and a second wireless communication path the first wireless communication path being an outside line and the second wireless communication path being an extension line, said information signal being communicated via the first or second wireless communication path based on the discrimination; and voice storage means for storing the information signal communicated via the first or second wireless communication path, based on the control signal received by said reception means.

2. The device according to claim 1, wherein the control signal is transmitted when said radio communication terminal starts communication.

3. The device according to claim 1, wherein said voice storage means stores the information signal received by said reception means, based on a control signal transmitted by any of a first radio communication terminal and a second radio communication terminal.

4. The device according to claim 1, wherein there are a plurality of said reception means, and said voice storage means stores information signals received by the plurality of reception means.

5. The device according to claim 1, wherein the information signal is an audio signal.

6. The device according to claim 1, wherein said reception means receives the information signal transmitted from both said radio communication control device and one of said radio communication terminals, and said voice storage means stores the information signal which is bi-directionally transmitted between said radio communication control device and one of said radio communication terminals.

7. The device according to claim 1, wherein said radio communication control device or said radio communication terminals make discrimination of whether or not the communication path is a predetermined second wireless communication path, wherein in a case where the communication path is the predetermined second wireless communication path, said radio communication control device or said radio communication terminals transmit the control signal and the information signal, and in a case where the communication path is not the predetermined second wireless communication path, said radio communication control device or said radio communication terminals do not transmit the control signal and the information signal.

8. The device according to claim 1, wherein said radio communication control device or said radio communication terminals make discrimination of whether or not the communication path is a predetermined first wireless communication path, wherein a case where the communication path is the predetermine first wireless communication path, said radio communication control device or said radio communication terminals transmit the control signal and the information signal, and in a case where the communication path is not the predetermined first wireless communication path, said radio communication control device or said radio communication terminals do not transmit the control signal and the information signal.

9. The device according to claim 1, wherein the communication path, discriminated by said radio communication control device or said radio communication terminals, is either the first wireless communication path or the second wireless communication path.

10. The device according to claim 9, wherein, in a case where the discriminated communication path is the first wireless communication path, said radio communication control device or said radio communication terminals transmit the control signal and the information signal, and in a case where the discriminated communication path is the second wireless communication path, said radio communication control device or said radio communication terminals do not transmit the control signal and the information signal.

11. The device according to claim 9, wherein, in a case where the discriminated communication path is the second wireless communication path, said radio communication control device or said radio communication terminals transmit the control signal and the information signal, and in a case where the discriminated communication path is the first wireless communication path, said radio communication control device or said radio communication terminals do not transmit the control signal and the information signal.

12. The device according to claim 1, wherein said voice storage device further comprises read-out means for reading out a signal stored in said voice storage means, and said read-out means performs a read-out operation of the signal on the basis of the radio control signal received by said reception means.

13. The device according to claim 2, wherein said read-out means also ends the read-out operation on the basis of the radio control signal received by said reception means.

14. The device according to claim 12, wherein the signal read out by said read-out means is transmitted to one of the radio communication terminals which has transmitted the control signal.

15. The device according to claim 12, further comprising distinguish means for distinguishing said radio communication terminals on the basis of the control signal received by said reception means,
wherein said read-out means reads out a signal based upon the distinguishment made by said distinguish means.

16. A radio communication system having a radio communication control device, a plurality of radio communication terminals and a voice storage device,
said radio communication control device or said radio communication terminals comprising:
discrimination means for making discrimination between a first wireless communication path and a second wireless communication path the first wireless communication path being an outside line and the second wireless communication path being an extension line; and
transmission means for transmitting a control signal to said voice storage device based on the discrimination made by said discrimination means and transmitting an information signal communicated via the first or second wireless communication path based on the discrimination made by said discrimination means,
said voice storage device comprising:
reception means for receiving the control signal and information signal transmitted by said radio communication control device or said radio communication terminals; and
voice storage means for storing the information signal communicated via the first or second wireless communication path, based on the control signal received by said reception means.

17. The system according to claim 16, wherein the control signal is transmitted when said radio communication terminal starts communication.

18. The system according to claim 15, wherein said voice storage means stores the information signal received by said reception means, based on a control signal transmitted by any of a first radio communication terminal and a second radio communication terminal.

19. The system according to claim 15, wherein there are a plurality of said reception means, and said voice storage means stores information signals received by the plurality of reception means.

20. The system according to claim 16, wherein the information signal is an audio signal.

21. The system according to claim 15, wherein said reception means receives said information signal transmitted from both of said radio communication control device and one of said radio communication terminals, and
said voice storage device stores the information signal which is bi-directionally transmitted between said radio communication control device and one of said radio communication terminals.

22. The system according to claim 16, wherein said radio communication control device establishes the communication path discriminated by said discrimination means.

23. The system according to claim 15, wherein said discrimination means discriminates whether or not the communication path is a predetermined second wireless communication path, and, in a case where the communication path is the predetermined second wireless communication path, said transmission means transmit the control signal and the information signal, and in a case where the communication path is not the predetermined second wireless communication path, said transmission means does not transmit the control signal and the information signal.

24. The system according to claim 15, wherein said discrimination means discriminates whether or not the communication path is a predetermined first wireless communication path, and, in a case where the communication path is the predetermined first wireless communication path, said transmission means transmit the control signal and the information signal, and in a case where the communication path is not the predetermined first wireless communication path, said transmission means does not transmit the control signal and the information signal.

25. The system according to claim 16, wherein said discrimination means discriminates whether the communication path is the first wireless communication path or the second wireless communication path.

26. The system according to clam 25, wherein, in a case where the discriminated communication path is the first wireless communication path, said transmission means transmit the control signal and the information signal, and in a case where the discriminated communication path is the second wireless communication path, said transmission means does not transmit the control signal and the information signal.

27. The system according to claim 25, wherein, in a case where the discriminated communication path is the second wireless communication path, said transmission means transmit the control signal and the information signal, and in a case where the discriminated communication path is the first wireless communication path, said transmission means does not transmit the control signal and the information signal.

28. The system according to claim 16, wherein said voice storage device further comprises read-out means for reading out a signal stored in said voice storage means, and said read-out means performs a read-out operation of the signal on the basis of the radio control signal received by said reception means.

29. The system according to claim 5, wherein said read-out means also ends the read-out operation on the basis of the radio control signal received by said reception means.

30. The system according to claim 28, wherein said voice storage device comprising determination means for determining a radio communication terminal based on the control signal received by said reception means, said read-out means performs read-out operation of the signal on the basis of the determination of said determination means.

31. The system according to claim 28, wherein the read-out information signal is transmitted to said radio communication terminal which has transmitted the radio control signal to the voice storage device.

32. A control method of a voice storage device in a radio communication system having a radio communication control device, a plurality of radio communication terminals and the voice storage device, comprising:

a receiving step of receiving a control signal and an information signal, said control signal being transmitted based on a discrimination made by the radio communication control device or the radio communication terminals which can make discrimination between a first wireless communication path and a second wireless communication path the first wireless communication path being an outside line and the second wireless communication path being an extension line, said information signal being communicated via the first or second wireless communication path based on the discrimination; and a storing step of storing the information signal communicated via the first or second wireless communication path, based on the control signal received in said receiving step.

33. The method according to claim 32, wherein the control signal is transmitted when said radio communication terminal starts communication.

34. The method according to claim 32, wherein in said storing step, the information signal received in said receiving step is stored based on a control signal transmitted by any of a first radio communication terminal and a second radio communication terminal.

35. The method according to claim 32, wherein a plurality of said receiving step can be executed in parallel, and in said storing step, information signals received in the plurality of receiving steps are stored.

36. The method according to claim 32, wherein said information signal is an audio signal.

37. The method according to claim 32, wherein, in said receiving step, information signals received by both the radio communication control device and one of the radio communication terminals are received, and in said storing step, information signals bi-directionally transmitted from the radio communication control device and the radio communication terminal are stored.

38. The method according to claim 32, wherein said radio communication control device or said radio communication terminals make discrimination of whether or not the communication path is a predetermined second wireless communication path, wherein in a case where the communication path is the predetermined second wireless communication path, said radio communication control device or said radio communication terminals transmit the control signal and the information signal, and in a case where the communication path is not the predetermined second wireless communication path, said radio communication control device or said radio communication terminals do not transmit the control signal and the information signal.

39. The method according to claim 32, wherein said radio communication control device or said radio communication terminals make discrimination of whether or not the communication path is a predetermined first wireless communication path, wherein in a case where the communication path is the predetermined first wireless communication path, said radio communication control device or said radio communication terminals transmit the control signal and the information signal, and in a case where the communication path is not the predetermined first wireless communication path, said radio communication control device or said radio communication terminals do not transmit the control signal and the information signal.

40. The method according to claim 32, wherein the communication path, discriminated by said radio communication control device or said radio communication terminals, is either the first wireless communication path or the second wireless communication path.

41. The method according to claim 40, wherein, in a case where the communication path is the first wireless communication path, said radio communication control device or said radio communication terminals transmit the control signal and the information signal, and in a case where the communication path is the second wireless communication path, said radio communication control device or said radio communication terminals do not transmit the control signal and the information signal.

42. The method according to claim 40, wherein, in a case where the communication path is the second wireless communication path, said radio communication control device or said radio communication terminals transmit the control signal and the information signal, and in a case where the communication path is the first wireless communication path, said radio communication control device or said radio communication terminals do not transmit the control signal and the information signal.

43. The method according to claim 32, wherein said voice storage device further comprises read-out step of reading out a signal stored in said storing step, and said read-out step performs a read-out operation of the signals on the basis of the radio control signal received by said reception step.

44. The method according to claim 43, wherein said read-out step also ends the read-out operation on the basis of the radio control signal received by said reception step.

45. The method according to claim 43, wherein the signal read-out by said read-out step is transmitted to said radio communication terminal which has transmitted the radio control signal to the storage device.

46. The method according to claim 43, further comprising a determination step of determining a radio communication terminal based on the control signal received by said reception step, said read-out step performs read-out operation of the signal on the basis of the determination of said determination means.

47. A control method of a radio communication system having a radio communication control device, a plurality of radio communication terminals and a voice storage device, comprising:

a method of controlling said radio communication control device or said radio communication terminals, comprising:

a discriminating step of making discrimination between a first wireless communication path and a second wireless communication path the first wireless communication path being an outside line and the second wireless communication path being an extension line; and a transmitting step of transmitting a control signal to said voice storage device based on the discrimination made in said discriminating step and transmitting an information signal communicated via the first or second wireless communication path based on the discrimination made in said discriminating step, and a method of controlling said voice storage device comprising:

a receiving step of receiving the control signal and information signal transmitted by said radio communication control device or said radio communication terminals; and a storing step of storing the information signal communicated via the first or second wireless communication path, based on the control signal received in said receiving step.

48. The method according to claim 47, wherein the control signal is transmitted when said radio communication terminal starts communication.

49. The method according to claim 47, wherein in said storing step, the information signal received in said receiving step is stored based on a control signal transmitted by any of a first radio communication terminal and a second radio communication terminal.

50. The method according to claim 47, wherein a plurality of said receiving step can be executed in parallel, and in said storing step, information signals received in the plurality of receiving steps are stored.

51. The method according to claim 47, wherein said information signal is an audio signal.

52. The method according to claim 47, wherein, in said reception step, the information signals transmitted from both said radio communication control device and one of said radio communication terminals is received, and, in said storing step, the information signal which is bi-directionally transmitted between said radio communication control device and one of said radio communication terminals is stored.

53. The method according to claim 47, wherein said radio communication control device comprising a establishing step of establishing a communication path discriminated in said discriminating step.

54. The method according to claim 47, wherein, in said discriminating step, it is discriminated whether the communication path is the first wireless communication path or the second wireless communication path, and;

in said transmitting step, in a case where the communication path is the second wireless communication path, the control signal and the information signal are transmitted, and in a case where the communication path is the first wireless communication path, the control signal and the information signal are not transmitted.

55. The method according to claim 47, wherein, in said discriminating step, it is discriminated whether the communication path is the first wireless communication path or the second wireless communication path, and;

in said transmitting step, in a case where the communication path is the first wireless communication path, the control signal and the information signal are transmitted, and in a case where the communication path is the second wireless communication path, the control signal and the information signal are not transmitted.

56. The method according to claim 47, wherein, in said discriminating step, it is discriminated whether the communication path is the first wireless communication path or the second wireless communication path.

57. The method according to claim 56, in said transmitting step, in a case where the communication path is the first wireless communication path, the control signal and the information signal are transmitted, and in a case where the communication path is the second wireless communication path, the control signal and the information signal are not transmitted.

58. The method according to claim 56, in said transmitting step, in a case where the communication path is the second wireless communication path, the control signal and the information signal are transmitted, and in a case where the communication path is the first wireless communication path, the control signal and the information signal are not transmitted.

59. The method according to claim 47, wherein the control method of said voice storage device further comprising:

a read-out step of reading out a signal stored in said storage step, and said read-out step performs a read-out operation of the signal on the basis of the radio control signal received by said reception step.

60. The method according to claim 15, wherein said read-out step also ends the read-out operation on the basis of the radio control signal received by said reception step.

61. The method according to claim 59, wherein the signal read-out by said read-out step is transmitted to said radio communication terminal which has transmitted the radio control signal to the voice storage device.

62. The method according to claim 59, wherein the control method of said voice storage device further comprising a determination step of determining a radio communication terminal on the basis of the control signal received in said reception step, said read-out step performs read-out operation of the signal on the basis of the determination of said determination step.

63. A radio communication system having a radio communication control device, a plurality of radio communication terminals and a voice storage device, said radio communication control device or said radio communication terminals comprising:

transmission means for transmitting a control signal and a wireless information signal to said voice storage device, said voice storage device comprising:

reception means for receiving the control signal transmitted by said radio communication control device or said radio communication terminals and receiving the wireless information signal transmitted by both of said radio communication control device and said radio communication terminals; and voice storage means for storing the wireless information signal received by said reception means, based on the control signal received by said reception means.

64. The system according to claim 63, wherein the control signal is transmitted when said radio communication terminal starts communication.

65. The system according to claim 63, wherein said voice storage means stores the wireless information signal received by said reception means, based on a control signal transmitted by any of a first radio communication terminal and a second radio communication terminal.

66. The system according to claim 63, wherein there are a plurality of said reception means, and said voice storage means stores wireless information signals received by the plurality of reception means.

67. The system according to claim 63, wherein said wireless information signal is an audio signal.

68. The system according to claim 63, wherein said radio communication control device further comprising establish means to establish the communication path.

69. The system according to claim 63, wherein said transmission means transmits the control signal and the wireless information signal according to whether or not the communication path is a predetermined second wireless communication path, and, in a case where the communication path is the predetermined second wireless communication path, said transmission means transmits the control signal and the wireless information signal, and in a case where the communication path is not the predetermined second wireless communication path, said transmission means does not transmit the control signal and the wireless information signal.

70. The system according to claim 63, wherein said transmission means transmits the control signal and the wireless information signal according to whether or not the communication path is a predetermined first wireless communication path, and, in a case where the communication path is the predetermined first wireless communication path, said transmission means transmits the control signal and the wireless information signal, and in a case where the communication path is not the predetermined first wireless communication path, said transmission means does not transmit the control signal and the wireless information signal.

71. The system according to claim 63, wherein, in a case where the communication path is the first wireless communication path, said transmission means transmits the control signal and the wireless information signal, and in a case where the communication path is the second wireless communication path, said transmission means does not transmit the control signal and the wireless information signal.

72. The system according to claim 63, wherein said transmission means transmits the control signal and the wireless information signal according to whether the communication path is the first wireless communication path or the second wireless communication path.

73. The system according to claim 72, wherein, in a case where the communication path is the second wireless communication path, said transmission means transmits the control signal and the wireless information signal, and in a case where the communication path is the first wireless communication path, said transmission means does not transmit the control signal and the wireless information signal.

74. The system according to claim 63, wherein said voice storage device further comprises read-out means for reading out a signal stored in said voice storage means, and said read-out means performs a read-out operation of the signal on the basis of the radio control signal received by said reception means.

75. The system according to claim 74, wherein said read-out means also ends the read-out operation on the basis of the control signal received by said reception means.

76. The system according to claim 74, wherein said read-out information signal is transmitted to said radio communication terminal which has transmitted the radio control signal to the voice storage device.

77. The system according to claim 74, further comprising determination means for determining a radio communication terminals on the basis of the control signal received by said reception means, wherein said read-out means reads out a signal based upon the determination made by said determination means.

78. A voice storage device in a radio communication system having a radio communication control device, a plurality of radio communication terminals and the voice storage device, comprising:

reception means for receiving a control signal transmitted by said radio communication control device or said radio communication terminals, and receiving a wireless information signal transmitted by both of said radio communication control device and said radio communication terminals; and voice storage means for storing the wireless information signal received by said reception means, based on the control signal received by said reception means.

79. The device according to claim 78, wherein the control signal is transmitted when said radio communication terminal starts communication.

80. The device according to claim 78, wherein said voice storage means stores the wireless information signal received by said reception means, based on a control signal transmitted by any of a first radio communication terminal and a second radio communication terminal.

81. The device according to claim 78, wherein there are a plurality of said reception means, and said voice storage means stores wireless information signals received by the plurality of reception means.

82. The device according to claim 78, wherein the wireless information signal is an audio signal.

83. The device according to claim 78, wherein said reception means receive the control signal and wireless information signal according to whether or not a communication path is a predetermined second wireless communication path, wherein in a case where the communication path is the predetermined second wireless communication path, said reception means receive the control signal and the wireless information signal, and in a case where the communication path is not the predetermined second wireless communication path, said reception means does not receive the control signal and the wireless information signal.

84. The device according to claim 78, wherein said reception means receive the control signal and the wireless information signal according to whether or not a communication path is a predetermined first wireless communication path, wherein in a case where the communication path is the predetermined first wireless communication path, said reception means receive the control signal and the wireless information signal, and in a case where the communication path is not the predetermined first wireless communication path, said reception means do not receive the control signal and the wireless information signal.

85. The device according to claim 78, wherein said reception means receive the control signal and the wireless information signal according to whether a communication path is the first wireless communication path or the second wireless communication path.

86. The device according to claim 85, wherein, in a case where the communication path is the first wireless communication path, said radio communication control device or said radio communication terminals transmit the control signal and the wireless information signal, and in a case where the communication path is the second wireless communication path, said radio communication control device or said radio communication terminals do not transmit the control signal and the wireless information signal.

87. The device according to claim 85, wherein, in a case where the communication path is the second wireless communication path, said radio communication control device or said radio communication terminals transmit the control signal and the wireless information signal, and in a case where the communication path is the first wireless communication path, said radio communication control device or said radio communication terminals do not transmit the control signal and the wireless information signal.

88. The device according to claim 78, wherein said voice storage device further comprises read-out means for reading out a signal stored in said voice storage means, and said read-out means performs read-out operation of the signal on the basis of the control signal received by said reception means.

89. The device according to claim 88, wherein said read-out means also ends the read-out operation on the basis of the control signal received by said reception means.

90. The device according to claim 88, wherein the signal read out by said read-out means is transmitted to one of the radio communication terminals which has transmitted the control signal.

91. The device according to claim 88, wherein said voice storage device further comprising determination means for determining a radio communication terminal based on the control signal received by said reception means, said read-out means performs read-out operation of the signal on the basis of the determination of said determination means.

92. A control method of a radio communication system having a radio communication control device, a plurality of radio communication terminals and a voice storage device, a method of controlling said radio communication control device or said radio communication terminals comprising:

a transmitting step of transmitting a control signal and a wireless information signal to said voice storage device, a method of controlling said voice storage device comprising:

a receiving step of receiving the control signal transmitted by said radio communication control device or said radio communication terminals and receiving the wireless information signal transmitted by both of said radio communication control device and said radio communication terminals; and a storing step of storing the wireless information signal received in said receiving step, based on the control signal received in said receiving step.

93. The method according to claim 92, wherein the control signal is transmitted when said radio communication terminal starts communication.

94. The method according to claim 92, wherein in said storing step, the wireless information signal received in said receiving step is stored based on a control signal transmitted by any of a first radio communication terminal and a second radio communication terminal.

95. The method according to claim 92, wherein a plurality of said receiving step can be executed in parallel, and in said storing step, wireless information signals received in the plurality of receiving steps are stored.

96. The method according to claim 92, wherein said wireless information signal is an audio signal.

97. The method according to claim 92, comprising an establishing step for establishing a communication path.

98. The method according to claim 92, wherein said method of controlling the voice storage device further comprising a read-out step of reading out a signal stored in said storing step, and said read-out step performs a read-out operation of the signals on the basis of the radio control signal received by said reception step.

99. The method according to claim 98, wherein said read-out step also ends the read-out operation on the basis of the radio control signal received by said reception step.

100. The method according to claim 98, wherein said read-out information signal is transmitted to said radio communication terminal which has transmitted the radio control single to the voice storage device.

101. The method according to claim 98, wherein said method of controlling the voice storage device further comprising a determining step of determining a radio communication terminal based on the control signal received in said reception step, said read-out step performs read-out operation of the signal on the basis of the determination of said determination means.

102. The method according to claim 92, wherein, in said transmitting step, the control signal and the wireless information signal are transmitted according to whether the communication path is the first wireless communication path or the second wireless communication path.

103. The method according to claim 102, wherein, in said transmitting step, in a case where the communication path is the first wireless communication path, the control signal and the wireless information signal are transmitted, and in a case where the communication path is the second wireless communication path, the control signal and the wireless information signal are not transmitted.

104. The method according to claim 102, wherein, in said transmitting step, in a case where the communication path is the second wireless communication path, the control signal and the wireless information signal are transmitted, and in a case where the communication path is the first wireless communication path, the control signal and the wireless information signal are not transmitted.

105. The method according to claim 102, wherein, in said transmitting step, the control signal and the wireless information signal are transmitted according to whether or not the communication path is a predetermined first wireless communication path, and, in said transmitting step, in a case where the communication path is the first wireless communication path, the control signal and the wireless information signal are transmitted, and in a case where the communication path is not the predetermined first wireless communication path, the control signal and the wireless information signal are not transmitted.

106. The method according to claim 102, wherein, in said transmitting step, the control signal and the wireless information signal are transmitted according to whether the communication path is a predetermined second wireless communication path, and,
in said transmitting step, in a case where the communication path is the predetermined second wireless communication path, the control signal and the wireless information signal are transmitted, and in a case where the communication path is not the second wireless communication path, the control signal and the wireless information signal are not transmitted.

107. A control method of a voice storage device in a radio communication system having a radio communication control device, a plurality of radio communication terminals and the voice storage device, comprising:
a receiving step of receiving a control signal transmitted by said radio communication control device or said radio communication terminals, and receiving a wireless information signal transmitted by both of said radio communication control device and said radio communication terminals; and
a storing step of storing the wireless information signal received in said receiving step, based on the control signal received in said receiving step.

108. The method according to claim 107, wherein said read-out step also ends the read-out operation on the basis of the radio control signal received by said reception step.

109. The method according to claim 107, wherein said receiving step receives the control signal and the wireless information signal according to whether or not a communication path is a predetermined first wireless communication path,
wherein in a case where the communication path is the predetermined first wireless communication path, the receiving step receives the control signal and the wireless information signal, and in a case where the communication path is not the predetermined first wireless communication path, the receiving step does not receive the control signal and the wireless information signal.

110. The device according to claim 107, wherein said receiving step receives the control signal and the wireless information signal according to whether or not a communication path is a predetermined second wireless communication path,
wherein in a case where the communication path is the predetermined second wireless communication path, said receiving step receives the control signal and the wireless information signal, and in a case where the communication path is not the predetermined second wireless communication path, said receiving step does not receive the control signal and the wireless information signal.

111. The method according to claim 107, wherein the wireless information signal is an audio signal.

112. The method according to claim 107, wherein a plurality of said receiving step can be executed in parallel, and in said storing step, wireless information signals received in the plurality of receiving steps are stored.

113. The method according to claim 107, wherein in said storing step, the wireless information signal received in said receiving step is stored based on a control signal transmitted by any of a first radio communication terminal and a second radio communication terminal.

114. The method according to claim 107, wherein said method of controlling the voice storage device further comprising a read-out step of reading out a signal stored in said storing step, and
said read-out step performs a read-out operation of the signals on the basis of the radio control signal received by said reception step.

115. The method according to claim 114, wherein the read-out information signal is transmitted to said radio communication terminal which has transmitted the radio control signal to the voice storage device.

116. The method according to claim 114, wherein said method of controlling the voice storage device further comprising a determining step of determining a radio communication terminal based on the control signal received in said reception step,
said read-out step performs read-out operation of the signal on the basis of the determination of said determination means.

117. The method according to claim 114, wherein said voice storage device further comprising a determining step of determining a radio communication terminal based on the control signal received in said reception step,
said read-out step performs read-out operation of the signal on the basis of the determination of said determination means.

118. The method according to claim 114, wherein the control signal is transmitted when said radio communication terminal starts communication.

119. The method according to claim 107, wherein said receiving step receives the control signal and the wireless information signal according to whether a communication path is using a first wireless communication path or a second wireless communication path.

120. The method according to claim 119, wherein, in a case where the communication path is the first wireless communication path, said radio communication control device or said radio communication terminals transmit the control signal and the wireless information signal, and in a case where the communication path is the second wireless communication path, said radio communication control device or said radio communication terminals do not transmit the control signal and the wireless information signal.

121. The method according to claim 119, wherein, in a case where the communication path is the second wireless communication path, said radio communication control device or said radio communication terminals transmit the control signal and the wireless information signal, and in a case where the communication path is the first wireless communication path, said radio communication control device or said radio communication terminals do not transmit the control signal and the wireless information signal.

122. A system having a plurality of radio communication terminals, a voice storage device and a radio communication control device including at least one wireless outside line and a plurality of wireless extension lines for controlling communication between one of the plurality of terminals and the wireless outside line or wireless communications between two of the plurality of terminals,
said radio communication control device comprising:
discrimination means for discriminating a wireless communication between one of the plurality of communication terminals and the outside line from a wireless communication between two of the plurality of terminals; and
transmission means for transmitting a control signal corresponding to the discrimination made by said discrimination means to the voice storage device, and said voice storage device comprising:

voice storage means for receiving the control signal transmitted by said transmission means, and in a case where the wireless communication is between one of the plurality of communication terminals and the outside line, storing an information signal from one of the plurality of communication terminals and information signal from the communication control device, and in a case where the wireless communication is between two of the plurality of terminals, storing information signals transmitted from one of said two terminals and information from the communication control device.

123. A voice storage device in a radio communication system having a radio communication control device, a plurality of radio communication terminals and the voice storage device, comprising:

reception means for receiving a control signal and an information signal, said control signal being transmitted based on a discrimination made by the radio communication control device or the radio communication terminals which can make discrimination between a first wireless communication path and a second wireless communication path which are different from each other, said information signal being communicated via a wireless communication path based on the discrimination; and voice storage means for storing the information signal communicated via the first or second wireless communication path, based on the control signal received by said reception means, the voice storage means being separate from both the radio communication control device and the radio control terminals.

124. The device according to claim 123, wherein said radio communication control device or said radio communication terminals make discrimination of whether or not the wireless communication path is a predetermined outside line, wherein a case where the wireless communication path is the predetermined outside line, said radio communication control device or said radio communication terminals transmit the control signal and the information signal, and in a case where the wireless communication path is not the predetermined outside line, said radio communication control device or said radio communication terminals do not transmit the control signal and the information signal.

125. The device according to claim 123, wherein said radio communication control device or said radio communication terminals make discrimination of whether or not the wireless communication path is a predetermined extension line, wherein in a case where the communication path is the predetermined extension line, said radio communication control device or said radio communication terminals transmit the control signal and the information signal, and in a case where the wireless communication path is not the predetermined extension line, said radio communication control device or said radio communication terminals do not transmit the control signal and the information signal.

126. The device according to claim 123, wherein said reception means received the information signal transmitted from both said radio communication control device and one of said radio communication terminals, and said voice storage means stores the information signal which is bi-directionally transmitted between said radio communication control device and one of said radio communication terminals.

127. The device according to claim 123, wherein the information signal is an audio signal.

128. The device according to claim 123, wherein there are a plurality of said reception means, and said voice storage means stores information signals received by the plurality of reception means.

129. The device according to claim 123, wherein said voice storage means stores the information signal received by said reception means, based on a control signal transmitted by any of a first radio communication terminal and a second radio communication terminal.

130. The device according to claim 123, wherein the control signal is transmitted when said radio communication terminal starts communication.

131. The device according to claim 123, wherein said voice storage device further comprises read-out means for reading out a signal stored in said voice storage means, and said read-out means performs a read-out operation of the signal on the basis of the radio control signal received by said reception means.

132. The device according to claim 131, wherein said read-out means also ends the read-out operation on the basis of the radio control signal received by said reception means.

133. The device according to claim 131, wherein the signal read out by said read-out means is transmitted to one of the radio communication terminals which has transmitted the control signal.

134. The device according to claim 131, further comprising distinguish means for distinguishing said radio communication terminals on the basis of the control signal received by said reception means, wherein said read-out means reads out a signal based upon the distinguishment made by said distinguish means.

135. The device according to claim 123, wherein the first or second wireless communication path, discriminated by said radio communication control device or said radio communication terminals, is either a wireless communication path using an outside line or a wireless communication path using an extension line.

136. The device according to claim 135, wherein, in a case where the wireless communication path is the outside line, said radio communication control device or said radio communication terminals transmit the control signal and the information signal, and in a case where the wireless communication path is the extension line, said radio communication control device or said radio communication terminals do not transmit the control signal and the information signal.

137. The device according to claim 135, wherein, in a case where the wireless communication path is the extension line, said radio communication control device or said radio communication terminals transmit the control signal and the information signal, and in a case where the wireless communication path is the outside line, said radio communication control device or said radio communication terminals do not transmit the control signal and the information signal.

138. A radio communication system having a radio communication control device, a plurality of radio communication terminals and a voice storage device, said radio communication control device or said radio communication terminals comprising:

discrimination means for making discrimination between a first wireless communication path and a second wireless communication path which are different from each other; and transmission means for transmitting a control signal to said voice storage device based on the discrimination made by said discrimination means and transmitting an information signal communicated via the first or second wireless communication path based on the discrimination made by said discrimination means, said voice storage device comprising:

reception means for receiving the control signal and information signal transmitted by said radio communication control device or said radio communication terminals; and voice storage means for storing the information signal communicated via the first or second wireless communication path, based on the control signal received by said reception means, the voice storage device being separate from both the radio communication control device and the radio communication terminals.

139. The system according to claim 138, wherein said discrimination means discriminates whether or not the wireless communication path is a predetermined outside line, and, in a case where the wireless communication path is the predetermined outside line, said transmission means transmit the control signal and the information signal, and in a case where the wireless communication path is not the predetermined outside line, said transmission means does not transmit the control signal and the information signal.

140. The system according to claim 138, wherein said discrimination means discriminates whether or not the wireless communication path is a predetermined extension line, and, in a case where the wireless communication path is the predetermined extension line, said transmission means transmit the control signal and the information signal, and in a case where the wireless communication path is not the predetermined extension line, said transmission means does not transmit the control signal and the information signal.

141. The system according to claim 138, wherein said radio communication control device establishes the wireless communication path discriminated by said discrimination means.

142. The system according to claim 138, wherein said reception means receives said information signal transmitted from both of said radio communication control device and one of said radio communication terminals, and said voice storage device stores the information signal which is bi-directionally transmitted between said radio communication control device and one of said radio communication terminals.

143. The system according to claim 138, wherein the information signal is an audio signal.

144. The system according to claim 138, wherein there are a plurality of said reception means, and said voice storage means stores information signals received by the plurality of reception means.

145. The system according to claim 138, wherein said voice storage means stores the information signal received by said reception means, based on a control signal transmitted by any of a first radio communication terminal and a second radio communication terminal.

146. The system according to claim 138, wherein the control signal is transmitted when said radio communication terminal starts communication.

147. The system according to claim 138, wherein said voice storage device further comprises read-out means for reading out a signal stored in said voice storage means, and said read-out means performs a read-out operation of the signal on the basis of the radio control signal received by said reception means.

148. The system according to claim 147, wherein said read-out means also ends the read-out operation on the basis of the radio control signal received by said reception means.

149. The system according to claim 147, wherein the read-out information signal is transmitted to said radio communication terminal which has transmitted the radio control signal to the voice storage device.

150. The system according to claim 147, wherein said voice storage device comprising determination means for determining a radio communication terminal based on the control signal received by said reception means, said read-out means performs read-out operation of the signal on the basis of the determination of said determination means.

151. The system according to claim 138, wherein said discrimination means discriminates whether the wireless communication path is an outside line or an extension line.

152. The system according to clam 151, wherein, in a case where the wireless communication path is an outside line, said transmission means transmit the control signal and the information signal, and in a case where the wireless communication path is an extension line, said transmission means does not transmit the control signal and the information signal.

153. The system according to claim 151, wherein, in a case where the wireless communication path is an extension line, said transmission means transmit the control signal and the information signal, and in a case where the wireless communication path is an outside line, said transmission means does not transmit the control signal and the information signal.

154. A control method of a voice storage device in a radio communication system having a radio communication control device, a plurality of radio communication terminals and the voice storage device, comprising:

a receiving step of receiving a control signal and an information signal, said control signal being transmitted based on a discrimination made by the radio communication control device or the radio communication terminals which can make discrimination between a first wireless communication path and a second wireless communication path which are different from each other, said information signal being communicated via a wireless communication path based on the discrimination; and a storing step of storing the information signal communicated via the first or second wireless communication path, based on the control signal received in said receiving step, the voice storage device being separate from both the radio communication control device and the radio communication terminals.

155. The method according to claim 154, wherein said radio communication control device or said radio communication terminals make discrimination of whether or not the wireless communication path is a predetermined outside line, wherein in a case where the wireless communication path is the predetermined outside line, said radio communication control device or said radio communication terminals transmit the control signal and the information signal, and in a case where the wireless communication path is not the predetermined outside line, said radio communication control device or said radio communication terminals do not transmit the control signal and the information signal.

156. The method according to claim 154, wherein said radio communication control device or said radio communication terminals make discrimination of whether or not the wireless communication path is a predetermined extension line, wherein in a case where the wireless communication path is the predetermined extension line, said radio communication control device or said radio communication terminals transmit the control signal and the information signal, and in a case where the wireless communication path is not the predetermined extension line, said radio communication control device or said radio communication terminals do not transmit the control signal and the information signal.

157. The method according to claim 154, wherein, in said receiving step, information signals received by both the radio communication control device and one of the radio communication terminals are received, and in said storing step, information signals bi-directionally transmitted from the radio communication control device and the radio communication terminal are stored.

158. The method according to claim 154, wherein said information signal is an audio signal.

159. The method according to claim 154, wherein a plurality of said receiving step can be executed in parallel, and in said storing step, information signals received in the plurality of receiving steps are stored.

160. The method according to claim 154, wherein in said storing step, the information signal received in said receiving step is stored based on a control signal transmitted by any of a first radio communication terminal and a second radio communication terminal.

161. The method according to claim 154, wherein the control signal is transmitted when said radio communication terminal starts communication.

162. The method according to claim 154, wherein said voice storage device further comprises read-out step of reading out a signal stored in said storing step, and said read-out step performs a read-out operation of the signals on the basis of the radio control signal received by said reception step.

163. The method according to claim 162, wherein said read-out step also ends the read-out operation on the basis of the radio control signal received by said reception step.

164. The method according to claim 162, wherein the signal read-out by said read-out step is transmitted to said radio communication terminal which has transmitted the radio control signal to the voice storage device.

165. The method according to claim 162, further comprising a determination step of determining a radio communication terminal based on the control signal received by said reception step, said read-out step performs read-out operation of the signal on the basis of the determination of said determination means.

166. The method according to claim 154, wherein the wireless communication path, discriminated by said radio communication control device or said radio communication terminals, is either a wireless communication path using an outside line or a wireless communication path using an extension line.

167. The method according to claim 166, wherein, in a case where the wireless communication path is the outside line, said radio communication control device or said radio communication terminals transmit the control signal and the information signal, and in a case where the wireless communication path is the extension line, said radio communication control device or said radio communication terminals do not transmit the control signal and the information signal.

168. The method according to claim 166, wherein, in a case where the wireless communication path is the extension line, said radio communication control device or said radio communication terminals transmit the control signal and the information signal, and in a case where the wireless communication path is the outside line, said radio communication control device or said radio communication terminals do not transmit the control signal and the information signal.

169. A control method of a radio communication system having a radio communication control device, a plurality of radio communication terminals and a voice storage device, comprising:

a method of controlling said radio communication control device or said radio communication terminals, comprising:

a discriminating step of making discrimination between a first wireless communication path and a second wireless communication path which are different from each other; and a transmitting step of transmitting a control signal to said voice storage device based on the discrimination made in said discriminating step and transmitting an information signal communicated via the first or second wireless communication path based on the discrimination made in said discriminating step, and a method of controlling said voice storage device comprising:

a receiving step of receiving the control signal and information signal transmitted by said radio communication control device or said radio communication terminals; and a storing step of storing the information signal communicated via the first or second wireless communication path, based on the control signal received in said receiving step, the voice storage device being separate from both the radio communication control device and the plurality of radio communication terminals.

170. The method according to claim 169, wherein, in said discriminating step, it is discriminated whether the wireless communication path is an outside line or an extension line, and;

in said transmitting step, in a case where the wireless communication path is the outside line, the control signal and the information signal are transmitted, and in a case where the wireless communication path is the extension line, the control signal and the information signal are not transmitted.

171. The method according to claim 169, wherein, in said discriminating step, it is discriminated whether the wireless communication path is an outside line or an extension line, and;

in said transmitting step, in a case where the wireless communication path is the extension line, the control signal and the information signal are transmitted, and in a case where the wireless communication path is the outside line, the control signal and the information signal are not transmitted.

172. The method according to claim 169, wherein said radio communication control device comprising a establishing step of establishing a wireless communication path discriminated in said discriminating step.

173. The method according to claim 169, wherein, in said reception step, the information signals transmitted from both said radio communication control device and one of said radio communication terminals is received, and, in said storing step, the information signal which is bi-directionally transmitted between said radio communication control device and one of said radio communication terminals is stored.

174. The method according to claim 169, wherein said information on signal is an audio signal.

175. The method according to claim 169, wherein a plurality of said receiving step can be executed in parallel, and in said storing step, information signals received in the plurality of receiving steps are stored.

176. The method according to claim 169, wherein in said storing step, the information signal received in said receiving step is stored based on a control signal transmitted by any of a first radio communication terminal and a second radio communication terminal.

177. The method according to claim 169, wherein the control signal is transmitted when said radio communication terminal starts communication.

178. The method according to claim 169, wherein the control method of said voice storage device further comprising:
a read-out step of reading out a signal stored in said storage step, and
said read-out step performs a read-out operation of the signal on the basis of the radio control signal received by said reception step.

179. The method according to claim 178, wherein said read-out step also ends the read-out operation on the basis of the radio control signal received by said reception step.

180. The method according to claim 178, wherein the signal read-out by said read-out step is transmitted to said radio communication terminal which has transmitted the radio control signal to the voice storage device.

181. The method according to claim 178, wherein the control method of said voice storage device further comprising a determination step of determining a radio communication terminal on the basis of the control signal received in said reception step,
said read-out step performs read-out operation of the signal on the basis of the determination of said determination step.

182. The method according to claim 169, wherein, in said discriminating step, it is discriminated whether the wireless communication path is an outside line or an extension line.

183. The method according to claim 182, in said transmitting step, in a case where the wireless communication path is the outside line, the control signal and the information signal are transmitted, and in a case where the wireless communication path is the extension line, the control signal and the information signal are not transmitted.

184. The method according to claim 182, in said transmitting step, in a case where the wireless communication path is the extension line, the control signal and the information signal are transmitted, and in a case where the wireless communication path is the outside line, the control signal and the information signal are not transmitted.

185. A radio communication system having a radio communication control device, a plurality of radio communication terminals and a voice storage device, said radio communication control device or said radio communication terminals comprising:
transmission means for transmitting a control signal and an information signal to said voice storage device, said voice storage device comprising:
reception means for receiving the control signal transmitted by said radio communication control device or said radio communication terminals and receiving the information signal transmitted by both of said radio communication control device and said radio communication terminals; and
voice storage means for storing information signal received by said reception means, based on the control signal received by said reception means, the voice storage means being separate from both the radio communication control device and the radio communication terminals.

186. The system according to claim 185, wherein said transmission means transmits the control signal and the information signal according to whether or not the wireless communication path is predetermined outside line, and, in a case where the wireless communication path is the predetermined outside line, said transmission means transmits the control signal and the information signal, and in a case where the wireless communication path is not the predetermined outside line, said transmission means does not transmit the control signal and the information signal.

187. The system according to claim 185, wherein said transmission means transmits the control signal and the information signal according to whether or not the wireless communication path is predetermined extension line, and, in a case where the wireless communication path is the predetermined extension line, said transmission means transmits the control signal and the information signal, and in a case where the wireless communication path is not the predetermined extension line, said transmission means does not transmit the control signal and the information signal.

188. The system according to claim 185, wherein said radio communication control device further comprising establish means to establish the wireless communication path.

189. The system according to claim 185, wherein said information signal is an audio signal.

190. The system according to claim 185, wherein there are a plurality of said reception means, and said voice storage means stores information signals received by the plurality of reception means.

191. The system according to claim 185, wherein said voice storage means stores the information signal received by said reception means, based on a control signal transmitted by any of a first radio communication terminal and a second radio communication terminal.

192. The system according to claim 185, wherein the control signal is transmitted when said radio communication terminal starts communication.

193. The system according to claim 185, wherein said voice storage device further comprises read-out means for reading out a signal stored in said voice storage means, and
said read-out means performs a read-out operation of the signal on the basis of the radio control signal received by said reception means.

194. The system according to claim 193, wherein said read-out means also ends the read-out operation on the basis of the control signal received by said reception means.

195. The system according to claim 193, wherein said read-out information signal is transmitted to said radio communication terminal which has transmitted the radio control signal to the voice storage device.

196. The system according to claim 193, further comprising determination means for determining a radio communication terminals on the basis of the control signal received by said reception means,
wherein said read-out means reads out a signal based upon the determination made by said determination means.

197. The system according to claim 185, wherein said transmission means transmits the control signal and the information signal according to whether the wireless communication path is an outside line or an extension line.

198. The system according to claim 197, wherein, in a case where the wireless communication path is the outside line, said transmission means transmits the control signal and the information signal, and in a case where the wireless communication path is an extension line, said transmission means does not transmit the control signal and the information signal.

199. The system according to claim 197, wherein, in a case where the wireless communication path is the extension line, said transmission means transmits the control signal and the information signal, and in a case where the wireless communication path is the outside line, said transmission means does not transmit the control signal and the information signal.

200. A voice storage device in a radio communication system having a radio communication control device, a plurality of radio communication terminals and the voice storage device, comprising:

reception means for receiving a control signal transmitted by said radio communication control device or said radio communication terminals, and receiving the information signal transmitted by both of said radio communication control device and said radio communication terminals; and voice storage means for storing the information signal received by said reception means, based on the control signal received by said reception means, the voice storage means being separate from both the radio communication control device and the radio communication terminals.

201. The device according to claim 200, wherein said reception means receive the control signal and the information signal according to whether or not a wireless communication path is a predetermined outside line, wherein in a case where the wireless communication path is the predetermined outside line, said reception means receive the control signal and the information signal, and in a case where the wireless communication path is not the predetermined outside line, said reception means do not receive the control signal and the information signal.

202. The device according to claim 200, wherein said reception means receive the control signal and information signal according to whether or not a wireless communication path is a predetermined extension line, wherein in a case where the wireless communication path is the predetermined extension line, said reception means receive the control signal and the information signal, and in a case where the wireless communication path is not the predetermined extension line, said reception means does not receive the control signal and the information signal.

203. The device according to claim 200, wherein the information signal is an audio signal.

204. The device according to claim 200, wherein there are a plurality of said reception means, and said voice storage means stores information signals received by the plurality of reception means.

205. The device according to claim 200, wherein said voice storage means stores the information signal received by said reception means, based on a control signal transmitted by any of a first radio communication terminal and a second radio communication terminal.

206. The device according to claim 200, wherein the control signal is transmitted when said radio communication terminal starts communication.

207. The device according to claim 200, wherein said voice storage device further comprises read-out means for reading out a signal stored in said voice storage means, and said read-out means performs read-out operation of the signal on the basis of the control signal received by said reception means.

208. The device according to claim 207, wherein said read-out means also ends the read-out operation on the basis of the control signal received by said reception means.

209. The device according to claim 207, wherein the signal read out by said read-out means is transmitted to one of the radio communication terminals which has transmitted the control signal.

210. The device according to claim 207, wherein said voice storage device further comprising determination means for determining a radio communication terminal based on the control signal received by said reception means, said read-out means performs read-out operation of the signal on the basis of the determination of said determination means.

211. The device according to claim 200, wherein said reception means receive the control signal and the information signal according to whether a wireless communication path is an outside line or an extension line.

212. The device according to claim 211, wherein, in a case where the wireless communication path is the outside line, said radio communication control device or said radio communication terminals transmit the control signal and the information signal, and in a case where the wireless communication path is the extension line, said radio communication control device or said radio communication terminals do not transmit the control signal and the information signal.

213. The device according to claim 211, wherein, in a case where the wireless communication path is the extension line, said radio communication control device or said radio communication terminals transmit the control signal and the information signal, and in a case where the wireless communication path is the outside line, said radio communication control device or said radio communication terminals do not transmit the control signal and the information signal.

214. A control method of a radio communication system having a radio communication control device, a plurality of radio communication terminals and a voice storage device, a method of controlling said radio communication control device or said radio communication terminals comprising:

a transmitting step of transmitting a control signal and an information signal to said voice storage device, a method of controlling said voice storage device comprising:

a receiving step of receiving the control signal transmitted by said radio communication control device or said radio communication terminals and receiving the information signal transmitted by both of said radio communication control device and said radio communication terminals; and a storing step of storing the information signal received in said receiving step, based on the control signal received in said receiving step, the voice storage device being separate from both the radio communication control device and the radio communication terminals.

215. The method according to claim 214, comprising an establishing step for establishing a wireless communication path.

216. The method according to claim 214, wherein said information signal is an audio signal.

217. The method according to claim 214, wherein a plurality of said receiving step can be executed in parallel, and in said storing step, information signals received in the plurality of receiving steps are stored.

218. The method according to claim 214, wherein in said storing step, the information signal received in said receiving step is stored based on a control signal transmitted by any of a first radio communication terminal and a second radio communication terminal.

219. The method according to claim 214, wherein the control signal is transmitted when said radio communication terminal starts communication.

220. The method according to claim 214, wherein said method of controlling the voice storage device further comprising a read-out step of reading out a signal stored in said storing step, and said read-out step performs a read-out operation of the signals on the basis of the radio control signal received by said reception step.

221. The method according to claim 220, wherein said read-out step also ends the read-out operation on the basis of the radio control signal received by said reception step.

222. The method according to claim 220, wherein said read-out information signal is transmitted to said radio communication terminal which has transmitted the radio control single to the voice storage device.

223. The method according to claim 220, wherein said method of controlling the voice storage device further comprising a determining step of determining a radio communication terminal based on the control signal received in said reception step, said read-out step performs read-out operation of the signal on the basis of the determination of said determination means.

224. The method according to claim 214, wherein, in said transmitting step, the control signal and the information signal are transmitted according to whether the wireless communication path is an outside line or an extension line.

225. The method according to claim 224, wherein, in said transmitting step, in a case where the wire less communication path is the outside line, the control signal and the information signal are transmitted, and in a case where the wireless communication path is the extension line, the control signal and the information signal are not transmitted.

226. The method according to claim 224, wherein, in said transmitting step, in a case where the wireless communication path is the extension line, the control signal and the information signal are transmitted, and in a case where the wireless communication path is the outside line, the control signal and the information signal are not transmitted.

227. The method according to claim 224, wherein, in said transmitting step, the control signal and the information signal are transmitted according to whether or not the wireless communication path is a predetermined outside line, and, in said transmitting step, in a case where the wireless communication path is the outside line, the control signal and the information signal are transmitted, and in a case where the wireless communication path is not the predetermined outside line, the control signal and the information signal are not transmitted.

228. The method according to claim 224, wherein, in said transmitting step, the control signal and the information signal are transmitted according to whether the wireless communication path is a predetermined extension line, and, in said transmitting step, in a case where the wireless communication path is the predetermined extension line, the control signal and the information signal are transmitted, and in a case where the wireless communication path is not the extension line, the control signal and the information signal are not transmitted.

229. A control method of a voice storage device in a radio communication system having a radio communication control device, a plurality of radio communication terminals and the voice storage device, comprising:

a receiving step of receiving a control signal transmitted by said radio communication control device or said radio communication terminals, and receiving the information signal transmitted by both of said radio communication control device and said radio communication terminals; and a storing step of storing the information signal received in said receiving step, based on the control signal received in said receiving step, the voice storage device being separate from both the radio communication control device and the radio communication terminals.

230. The method according to claim 229, wherein said method of controlling the voice storage device further comprising a read-out step of reading out a signal stored in said storing step, and said read-out step performs a read-out operation of the signals on the basis of the radio control signal received by said reception step.

231. The method according to claim 230, wherein the control signal is transmitted when said radio communication terminal starts communication.

232. The method according to claim 229, wherein said read-out step also ends the read-out operation on the basis of the radio control signal received by said reception step.

233. The method according to claim 230, wherein the read-out information signal is transmitted to said radio communication terminal which has transmitted the radio control signal to the voice storage device.

234. The method according to claim 230, wherein said method of controlling the voice storage device further comprising a determining step of determining a radio communication terminal based on the control signal received in said reception step, said read-out step performs read-out operation of the signal on the basis of the determination of said determination means.

235. The method according to claim 230, wherein said voice storage device further comprising a determining step of determining a radio communication terminal based on the control signal received in said reception step, said read-out step performs read-out operation of the signal on the basis of the determination of said determination means.

236. The method according to claim 229, wherein said receiving step receives the control signal and the information signal according to whether a wireless communication path is using an outside line or an extension line.

237. The method according to claim 236, wherein, in a case where the wireless communication path is the outside line, said radio communication control device or said radio communication terminals transmit the control signal and the information signal, and in a case where the wireless communication path is the extension line, said radio communication control device or said radio communication terminals do not transmit the control signal and the information signal.

238. The method according to claim 236, wherein, in a case where the wireless communication path is the extension line, said radio communication control device or said radio communication terminals transmit the control signal and the information signal, and in a case where the wireless communication path is the outside line, said radio communication control device or said radio communication terminals do not transmit the control signal and the information signal.

239. The method according to claim 229, wherein said receiving step receives the control signal and the information signal according to whether or not a wireless communication path is a predetermined outside line, wherein in a case where the wireless communication path is the predetermined outside line, the receiving step receives the control signal and the information signal, and in a case where the wireless communication path is not the predetermined outside line, the receiving step does not receive the control signal and the information signal.

240. The device according to claim 229, wherein said receiving step receives the control signal and the information signal according to whether or not a wireless communication path is a predetermined extension line, wherein in a case where the wireless communication path is the predetermined extension line, said receiving step receives the control signal and the information signal, and in a case where the wireless communication path is not the predetermined extension line, said receiving step does not receive the control signal and the information signal.

241. The method according to claim 229, wherein the information signal is an audio signal.

242. The method according to claim 229, wherein a plurality of said receiving step can be executed in parallel, and in said storing step, information signals received in the plurality of receiving steps are stored.

243. The method according to claim 229, wherein in said storing step, the information signal received in said receiving step is stored based on a control signal transmitted by any of a first radio communication terminal and a second radio communication terminal.

244. A system having a plurality of radio communication terminals, a voice storage device and a radio communication control device including at least one outside line and a plurality of extension lines for controlling communication between one of the plurality of terminals and the outside line or between two of the plurality of terminals, said radio communication control device comprising:

discrimination means for discriminating a communication between one of the plurality of communication terminals and the outside line from a communication between two of the plurality of terminals; and transmission means for transmitting a control signal corresponding to the discrimination made by said discrimination means to the voice storage device, and said voice storage device comprising:

voice storage means for receiving the control signal transmitted by said transmission means, and in a case where the communication is between one of the plurality of communication terminals and the outside line, storing an information signal from one of the plurality of communication terminals and information signal from the communication control device, and in a case where the communication is between two of the plurality of terminals, storing information signals transmitted from one of said two terminals and information from the communication control device, the voice storage device being separate from both the radio communication control device and the radio communication terminals.

\* \* \* \* \*